US011411441B2

(12) United States Patent
Woo

(10) Patent No.: US 11,411,441 B2
(45) Date of Patent: Aug. 9, 2022

(54) SYSTEMS AND METHODS OF PROTECTING WIRELESS POWER RECEIVERS USING MULTIPLE RECTIFIERS AND ESTABLISHING IN-BAND COMMUNICATIONS USING MULTIPLE RECTIFIERS

(71) Applicant: Energous Corporation, San Jose, CA (US)

(72) Inventor: Wayne Eumchan Woo, San Jose, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

(21) Appl. No.: 17/026,198

(22) Filed: Sep. 19, 2020

(65) Prior Publication Data
US 2021/0091602 A1 Mar. 25, 2021

Related U.S. Application Data

(60) Provisional application No. 62/907,234, filed on Sep. 27, 2019, provisional application No. 62/903,675, filed on Sep. 20, 2019.

(51) Int. Cl.
H02J 50/27 (2016.01)
H02J 50/23 (2016.01)

(52) U.S. Cl.
CPC .............. H02J 50/27 (2016.02); H02J 50/23 (2016.02)

(58) Field of Classification Search
CPC ........ H02J 50/20–27; B60L 53/12–126; H01F 38/14; H04B 1/14; H04B 1/18
See application file for complete search history.

(56) References Cited

U.S. PATENT DOCUMENTS 787,412 A 4/1905 Tesla
2,811,624 A 10/1957 Haagensen
(Continued)

FOREIGN PATENT DOCUMENTS

CN 201278367 Y 7/2009
CN 102227884 A 10/2011
(Continued)

OTHER PUBLICATIONS

Energous Corp., IPRP, PCT/US2014/040697, Dec. 8, 2015, 9 pgs.
(Continued)

Primary Examiner — Rexford N Barnie
Assistant Examiner — David A Shiao
(74) Attorney, Agent, or Firm — Morgan, Lewis & Bockius LLP

(57) ABSTRACT

A wireless-power receiver includes an antenna coupled to a rectifier, and a depletion-mode switch coupled to the rectifier. The depletion-mode switch can create an impedance mismatch or an impedance match between the rectifier and the antenna. While the depletion-mode switch is in a default-closed state, it creates an impedance mismatch between the rectifier and the antenna. A first amount of alternating current received by the antenna as radio frequency (RF) signals is reflected away from the rectifier's input due to the impedance mismatch. A second amount of the alternating current causes the depletion-mode switch to begin transitioning to an open state, creating an impedance match between the rectifier and the antenna. While the depletion-mode switch is in the open state, creating an impedance match between the rectifier and the antenna, alternating current received by the antenna flows through the rectifier's input to be converted into direct current.

26 Claims, 18 Drawing Sheets

(56) References Cited

U.S. PATENT DOCUMENTS

| | | |
|---|---|---|
| 2,863,148 A | 12/1958 | Gammon et al. |
| 3,167,775 A | 1/1965 | Guertler |
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,142,292 A | 8/1992 | Chang |
| 5,200,759 A | 4/1993 | McGinnis |
| 5,211,471 A | 5/1993 | Rohrs |
| 5,276,455 A | 1/1994 | Fitzsimmons et al. |
| 5,548,292 A | 8/1996 | Hirshfield et al. |
| 5,556,749 A | 9/1996 | Mitsuhashi et al. |
| 5,568,088 A | 10/1996 | Dent et al. |
| 5,631,572 A | 5/1997 | Sheen et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,176,433 B1 | 1/2001 | Uesaka et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,012,572 B1 | 3/2006 | Schaffner et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,049,676 B2 | 11/2011 | Yoon et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,184,454 B2 | 5/2012 | Mao |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,655,272 B2 | 2/2014 | Saunamaki |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |

(56) References Cited

U.S. PATENT DOCUMENTS

| | | |
|---|---|---|
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,532,748 B2 | 1/2017 | Denison et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,692 B1 | 12/2017 | Bell et al. |
| 9,859,756 B2 | 1/2018 | Leabman et al. |
| 9,859,758 B1 | 1/2018 | Leabman |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,876,648 B2 | 1/2018 | Bell |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 | 2/2018 | Contopanagos et al. |
| 9,899,844 B1 | 2/2018 | Bell et al. |
| 9,899,861 B1 | 2/2018 | Leabman et al. |
| 9,899,873 B2 | 2/2018 | Bell et al. |
| 9,912,199 B2 | 3/2018 | Leabman et al. |
| 9,916,485 B1 | 3/2018 | Lilly et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,008,777 B1 | 6/2018 | Broyde et al. |
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,714 B2 | 10/2018 | Bohn et al. |
| 10,090,886 B1 | 10/2018 | Bell et al. |
| 10,103,552 B1 | 10/2018 | Leabman et al. |
| 10,103,582 B2 | 10/2018 | Leabman et al. |
| 10,110,046 B1 | 10/2018 | Esquibel et al. |
| 10,122,219 B1 | 11/2018 | Hosseini et al. |
| 10,122,415 B2 | 11/2018 | Bell et al. |
| 10,124,754 B1 | 11/2018 | Leabman |
| 10,128,686 B1 | 11/2018 | Leabman et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,153,645 B1 | 12/2018 | Bell et al. |
| 10,153,653 B1 | 12/2018 | Bell et al. |

(56) References Cited

U.S. PATENT DOCUMENTS

| | | |
|---|---|---|
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Bell |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,333,332 B1 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,483,768 B2 | 11/2019 | Bell et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Komaros et al. |
| 10,511,196 B2 | 12/2019 | Hosseini |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,594,165 B2 | 3/2020 | Hosseini |
| 10,615,647 B2 | 4/2020 | Johnston et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,840,743 B2 | 11/2020 | Johnston et al. |
| 10,879,740 B2 | 12/2020 | Hosseini |
| 10,923,954 B2 | 2/2021 | Leabman |
| 10,958,095 B2 | 3/2021 | Leabman et al. |
| 10,985,617 B1 | 4/2021 | Johnston et al. |
| 11,011,942 B2 | 5/2021 | Liu |
| 2002/0065052 A1 | 5/2002 | Pande et al. |
| 2002/0103447 A1 | 8/2002 | Terry |
| 2002/0171594 A1 | 11/2002 | Fang |
| 2003/0038750 A1 | 2/2003 | Chen |
| 2003/0058187 A1 | 3/2003 | Billiet et al. |
| 2004/0020100 A1 | 2/2004 | O'Brian et al. |
| 2004/0130425 A1 | 7/2004 | Dayan et al. |
| 2004/0130442 A1 | 7/2004 | Breed |
| 2004/0145342 A1 | 7/2004 | Lyon |
| 2004/0155832 A1 | 8/2004 | Yuanzhu |
| 2004/0207559 A1 | 10/2004 | Milosavljevic |
| 2004/0259604 A1 | 12/2004 | Mickle et al. |
| 2005/0007276 A1 | 1/2005 | Barrick et al. |
| 2005/0116683 A1 | 6/2005 | Cheng |
| 2005/0117660 A1 | 6/2005 | Vialle et al. |
| 2005/0134517 A1 | 6/2005 | Gottl |
| 2005/0227619 A1 | 10/2005 | Lee et al. |
| 2005/0237258 A1 | 10/2005 | Abramov et al. |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0160517 A1 | 7/2006 | Yoon |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0284593 A1 | 12/2006 | Nagy et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0229261 A1 | 10/2007 | Zimmerman et al. |
| 2007/0240297 A1 | 10/2007 | Yang et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0122297 A1 | 5/2008 | Arai |
| 2008/0123383 A1 | 5/2008 | Shionoiri |
| 2008/0169910 A1 | 7/2008 | Greene et al. |
| 2008/0197802 A1 | 8/2008 | Onishi |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |

(56) References Cited

U.S. PATENT DOCUMENTS

| | | |
|---|---|---|
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0174604 A1 | 7/2009 | Keskitalo |
| 2009/0200985 A1 | 8/2009 | Zane et al. |
| 2009/0206791 A1 | 8/2009 | Jung |
| 2009/0207092 A1 | 8/2009 | Nysen et al. |
| 2009/0218884 A1 | 9/2009 | Soar |
| 2009/0218891 A1 | 9/2009 | McCollough |
| 2009/0243397 A1 | 10/2009 | Cook et al. |
| 2009/0256752 A1 | 10/2009 | Akkermans et al. |
| 2009/0264069 A1 | 10/2009 | Yamasuge |
| 2009/0271048 A1 | 10/2009 | Wakamatsu |
| 2009/0281678 A1 | 11/2009 | Wakamatsu |
| 2009/0284082 A1 | 11/2009 | Mohammadian |
| 2009/0284220 A1 | 11/2009 | Toncich et al. |
| 2009/0284227 A1 | 11/2009 | Mohammadian et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0312046 A1 | 12/2009 | Clevenger et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019908 A1 | 1/2010 | Cho et al. |
| 2010/0033021 A1 | 2/2010 | Bennett |
| 2010/0034238 A1 | 2/2010 | Bennett |
| 2010/0044123 A1 | 2/2010 | Perlman et al. |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0079011 A1 | 4/2010 | Hyde et al. |
| 2010/0087227 A1 | 4/2010 | Francos et al. |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0244576 A1 | 9/2010 | Hillan et al. |
| 2010/0253281 A1 | 10/2010 | Li |
| 2010/0256831 A1 | 10/2010 | Abramo et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0279606 A1 | 11/2010 | Hillan et al. |
| 2010/0289341 A1* | 11/2010 | Ozaki .................. H04B 5/0093 307/104 |
| 2010/0295372 A1 | 11/2010 | Hyde et al. |
| 2010/0309088 A1 | 12/2010 | Hyvonen et al. |
| 2010/0315045 A1 | 12/2010 | Zeine |
| 2010/0328044 A1 | 12/2010 | Waffenschmidt et al. |
| 2011/0009057 A1 | 1/2011 | Saunamäki |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0053500 A1* | 3/2011 | Menegoli ............. H04B 5/0037 455/41.1 |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0109167 A1 | 5/2011 | Park et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133691 A1 | 6/2011 | Hautanen |
| 2011/0151789 A1 | 6/2011 | Viglione et al. |
| 2011/0154429 A1 | 6/2011 | Stantchev |
| 2011/0156493 A1 | 6/2011 | Bennett |
| 2011/0156494 A1 | 6/2011 | Mashinsky |
| 2011/0156640 A1 | 6/2011 | Moshfeghi |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0227725 A1 | 9/2011 | Muirhead |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |

(56) References Cited

U.S. PATENT DOCUMENTS

| | | |
|---|---|---|
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0025622 A1 | 2/2012 | Kim et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0075072 A1 | 3/2012 | Pappu |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0270592 A1 | 10/2012 | Ngai |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0294054 A1 | 11/2012 | Kim et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306284 A1 | 12/2012 | Lee et al. |
| 2012/0306433 A1 | 12/2012 | Kim et al. |
| 2012/0306572 A1 | 12/2012 | Hietala et al. |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0307873 A1 | 12/2012 | Kim et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313446 A1 | 12/2012 | Park et al. |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0005252 A1 | 1/2013 | Lee et al. |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0062959 A1 | 3/2013 | Lee et al. |
| 2013/0063082 A1 | 3/2013 | Lee et al. |
| 2013/0063143 A1 | 3/2013 | Adalsteinsson et al. |
| 2013/0063266 A1 | 3/2013 | Yunker et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |

(56) References Cited

U.S. PATENT DOCUMENTS

| | | |
|---|---|---|
| 2013/0120052 A1 | 5/2013 | Siska |
| 2013/0120205 A1 | 5/2013 | Thomson et al. |
| 2013/0120206 A1 | 5/2013 | Biancotto et al. |
| 2013/0120217 A1 | 5/2013 | Ueda et al. |
| 2013/0130621 A1 | 5/2013 | Kim et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0249682 A1 | 9/2013 | Van Wiemeersch et al. |
| 2013/0250102 A1 | 9/2013 | Scanlon et al. |
| 2013/0253612 A1* | 9/2013 | Chow ............... H02J 50/20 607/60 |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0300356 A1 | 11/2013 | Yang |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2013/0343585 A1 | 12/2013 | Bennett et al. |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0063666 A1* | 3/2014 | Kallal ............... H02H 9/04 361/56 |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0111153 A1 | 4/2014 | Kwon et al. |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0183964 A1 | 7/2014 | Walley |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0191818 A1 | 7/2014 | Waffenschmidt et al. |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0203629 A1 | 7/2014 | Hoffman et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |

(56) References Cited

U.S. PATENT DOCUMENTS

| | | | |
|---|---|---|---|
| 2014/0273819 A1 | 9/2014 | Nadakuduti et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0292451 A1 | 10/2014 | Zimmerman |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0035378 A1 | 2/2015 | Calhoun et al. |
| 2015/0035709 A1 | 2/2015 | Lim |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102942 A1 | 4/2015 | Houser et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0116153 A1 | 4/2015 | Chen et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0145350 A1* | 5/2015 | Hajimiri ............... H02J 5/00 307/149 |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171512 A1 | 6/2015 | Chen et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0180284 A1 | 6/2015 | Kang et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0236877 A1 | 8/2015 | Peng et al. |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0260835 A1 | 9/2015 | Widmer et al. |
| 2015/0262465 A1 | 9/2015 | Pritchett |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0278558 A1 | 10/2015 | Priev et al. |
| 2015/0280429 A1 | 10/2015 | Makita et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0339497 A1 | 11/2015 | Kurian |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013560 A1 | 1/2016 | Daniels |
| 2016/0013661 A1 | 1/2016 | Kurs et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0028403 A1 | 1/2016 | McCaughan et al. |
| 2016/0033254 A1 | 2/2016 | Zeine et al. |
| 2016/0042206 A1 | 2/2016 | Pesavento et al. |
| 2016/0043562 A1 | 2/2016 | Lisi et al. |
| 2016/0043571 A1 | 2/2016 | Kesler et al. |
| 2016/0043572 A1 | 2/2016 | Cooper et al. |
| 2016/0054440 A1 | 2/2016 | Younis |
| 2016/0056635 A1 | 2/2016 | Bell |
| 2016/0056640 A1 | 2/2016 | Mao |
| 2016/0065005 A1 | 3/2016 | Won et al. |
| 2016/0079799 A1 | 3/2016 | Khlat |

(56) References Cited

U.S. PATENT DOCUMENTS

| | | |
|---|---|---|
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099611 A1 | 4/2016 | Leabman et al. |
| 2016/0099612 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126749 A1 | 5/2016 | Shichino et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0174162 A1 | 6/2016 | Nadakuduti et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0197522 A1 | 7/2016 | Zeine et al. |
| 2016/0202343 A1 | 7/2016 | Okutsu |
| 2016/0204642 A1 | 7/2016 | Oh |
| 2016/0218545 A1 | 7/2016 | Schroeder et al. |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0322868 A1 | 11/2016 | Akuzawa et al. |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0344098 A1 | 11/2016 | Ming |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025887 A1 | 1/2017 | Hyun et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0063168 A1 | 3/2017 | Uchida |
| 2017/0077733 A1 | 3/2017 | Jeong et al. |
| 2017/0077765 A1 | 3/2017 | Bell et al. |
| 2017/0077979 A1 | 3/2017 | Papa et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110886 A1 | 4/2017 | Reynolds et al. |
| 2017/0110910 A1 | 4/2017 | Zeine et al. |
| 2017/0127196 A1 | 5/2017 | Blum et al. |
| 2017/0134686 A9 | 5/2017 | Leabman |
| 2017/0141582 A1 | 5/2017 | Adolf et al. |
| 2017/0141583 A1 | 5/2017 | Adolf et al. |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0214422 A1 | 7/2017 | Na et al. |
| 2017/0274787 A1 | 9/2017 | Salter et al. |
| 2017/0338695 A1 | 11/2017 | Port |
| 2018/0006611 A1 | 1/2018 | de Jong et al. |
| 2018/0040929 A1 | 2/2018 | Chappelle |
| 2018/0048178 A1 | 2/2018 | Leabman |
| 2018/0090992 A1 | 3/2018 | Shrivastava et al. |
| 2018/0102675 A1* | 4/2018 | Wheeland ............... H02M 7/21 |
| 2018/0212523 A1 | 7/2018 | Leabman |
| 2018/0226840 A1 | 8/2018 | Leabman |
| 2018/0241255 A1 | 8/2018 | Leabman |
| 2018/0262050 A1 | 9/2018 | Yankowitz |
| 2018/0301934 A1 | 10/2018 | Prabhala et al. |
| 2018/0309314 A1* | 10/2018 | White, II ............... H02J 7/0029 |
| 2018/0343040 A1 | 11/2018 | Luzinski et al. |
| 2018/0375368 A1 | 12/2018 | Leabman et al. |
| 2018/0376235 A1 | 12/2018 | Leabman |
| 2019/0052979 A1 | 2/2019 | Chen et al. |
| 2019/0074728 A1 | 3/2019 | Leabman |
| 2019/0074862 A1 | 3/2019 | Wang et al. |
| 2019/0131827 A1 | 5/2019 | Johnston |
| 2019/0180157 A1* | 6/2019 | Yase ....................... H02J 50/20 |
| 2019/0245389 A1* | 8/2019 | Johnston ................ H02J 50/60 |
| 2019/0288524 A1 | 9/2019 | Leabman et al. |
| 2019/0296586 A1 | 9/2019 | Moshfeghi |
| 2019/0326782 A1 | 10/2019 | Graham et al. |
| 2019/0372384 A1 | 12/2019 | Hosseini et al. |
| 2019/0386522 A1 | 12/2019 | Park et al. |
| 2019/0393729 A1 | 12/2019 | Contopanagos et al. |
| 2019/0393928 A1 | 12/2019 | Leabman |
| 2020/0006988 A1 | 1/2020 | Leabman |
| 2020/0021128 A1 | 1/2020 | Bell et al. |
| 2020/0091608 A1 | 3/2020 | Alpman et al. |
| 2020/0112204 A1 | 4/2020 | Hosseini et al. |
| 2020/0153117 A1 | 5/2020 | Papio-Toda et al. |
| 2020/0203837 A1 | 6/2020 | Komaros et al. |
| 2020/0235614 A1 | 7/2020 | Swan et al. |
| 2020/0244104 A1 | 7/2020 | Katajamaki et al. |
| 2020/0244111 A1 | 7/2020 | Johnston et al. |
| 2020/0252141 A1 | 8/2020 | Sarajedini |
| 2020/0274397 A1 | 8/2020 | Hwang et al. |
| 2020/0313642 A1* | 10/2020 | Mimino ............... H04B 5/0087 |
| 2021/0091602 A1 | 3/2021 | Woo |

FOREIGN PATENT DOCUMENTS

| | | |
|---|---|---|
| CN | 102292896 A | 12/2011 |
| CN | 102860037 A | 1/2013 |
| CN | 103151848 A | 6/2013 |
| CN | 103348563 A | 10/2013 |
| CN | 203826555 U | 9/2014 |
| CN | 104090265 A | 10/2014 |
| CN | 104167773 A | 11/2014 |
| CN | 104347915 A | 2/2015 |
| CN | 105765821 A | 7/2016 |
| CN | 106329116 A | 1/2017 |
| CN | 103380561 B | 9/2017 |
| DE | 20016655 U1 | 2/2002 |
| DE | 102013216953 A1 | 2/2015 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 2747195 A1 | 6/2014 |
| EP | 3067983 A1 | 9/2016 |
| EP | 3118970 A1 | 1/2017 |
| EP | 3145052 A1 | 3/2017 |
| GB | 2404497 A | 2/2005 |
| GB | 2556620 A | 6/2018 |
| JP | 2000323916 A | 11/2000 |
| JP | 2002319816 A | 10/2002 |
| JP | 2006157586 A | 6/2006 |
| JP | 2007043432 A | 2/2007 |
| JP | 2008167017 A | 7/2008 |
| JP | 2009525715 A | 7/2009 |
| JP | 2009201328 A | 9/2009 |
| JP | 2012016171 A | 1/2012 |
| JP | 2012095226 A | 5/2012 |
| JP | 2012157167 A | 8/2012 |
| JP | 2013099249 A | 5/2013 |
| JP | 2013162624 A | 8/2013 |
| JP | 2014075927 A | 4/2014 |
| JP | 2014112063 A | 6/2014 |
| JP | 2014176131 A | 9/2014 |
| JP | 2015027345 A | 2/2015 |
| JP | 2015128349 A | 7/2015 |

(56) References Cited

FOREIGN PATENT DOCUMENTS

| | | | |
|---|---|---|---|
| JP | 2015128370 A | 7/2015 | |
| JP | WO2015177859 A1 | 4/2017 | |
| KR | 20060061776 A | 6/2006 | |
| KR | 20070044302 A | 4/2007 | |
| KR | 100755144 B1 | 9/2007 | |
| KR | 20110132059 A | 2/2011 | |
| KR | 20110135540 A1 | 12/2011 | |
| KR | 20120009843 A | 2/2012 | |
| KR | 20120108759 A | 10/2012 | |
| KR | 20130026977 A | 3/2013 | |
| KR | 20140023409 A | 2/2014 | |
| KR | 20140023410 A | 3/2014 | |
| KR | 20140085200 A | 7/2014 | |
| KR | 20150077678 A | 7/2015 | |
| KR | 20170050971 A | 5/2017 | |
| RU | 2658332 C1 | 6/2018 | |
| WO | WO 199508125 A1 | 3/1995 | |
| WO | WO 199831070 A1 | 7/1998 | |
| WO | WO 199952173 A1 | 10/1999 | |
| WO | WO 2000111716 A1 | 2/2001 | |
| WO | WO 2003091943 A1 | 11/2003 | |
| WO | WO 2004077550 A1 | 9/2004 | |
| WO | WO 2006122783 A2 | 11/2006 | |
| WO | WO 2007070571 A2 | 6/2007 | |
| WO | WO 2008024993 A2 | 2/2008 | |
| WO | WO 2008156571 A2 | 12/2008 | |
| WO | WO 2010022181 A1 | 2/2010 | |
| WO | WO 2010039246 A1 | 4/2010 | |
| WO | WO 2010138994 A1 | 12/2010 | |
| WO | WO 2011112022 A2 | 9/2011 | |
| WO | WO 2012177283 A1 | 12/2012 | |
| WO | WO 2013031988 A1 | 3/2013 | |
| WO | WO 2013035190 A1 | 3/2013 | |
| WO | WO 2013038074 A2 | 3/2013 | |
| WO | WO 2013042399 A1 | 3/2013 | |
| WO | WO 2013052950 A1 | 4/2013 | |
| WO | WO 2013105920 A2 | 7/2013 | |
| WO | WO 2013175596 A1 | 11/2013 | |
| WO | WO 2014068992 A1 | 5/2014 | |
| WO | WO 2014075103 A1 | 5/2014 | |
| WO | WO 2014113093 A1 | 7/2014 | |
| WO | WO 2014132258 A1 | 9/2014 | |
| WO | WO 2014134996 A1 | 9/2014 | |
| WO | WO 2014182788 A2 | 11/2014 | |
| WO | WO 2014182788 A3 | 11/2014 | |
| WO | WO 2014197472 A1 | 12/2014 | |
| WO | WO 2014209587 A1 | 12/2014 | |
| WO | WO 2015038773 A1 | 3/2015 | |
| WO | WO 2015097809 A1 | 7/2015 | |
| WO | WO 2015130902 A1 | 9/2015 | |
| WO | WO 2015161323 A1 | 10/2015 | |
| WO | WO 2016024869 A1 | 2/2016 | |
| WO | WO 2016048512 A1 | 3/2016 | |
| WO | WO 2016088261 A1 | 6/2016 | |
| WO | WO 2016187357 A1 | 11/2016 | |

OTHER PUBLICATIONS

Energous Corp., IPRP, PCT/US2014/040705, Dec. 8, 2015, 6 pgs.
Energous Corp., IPRP, PCT/US2014/045119, Jan. 12, 2016, 9 pgs.
Energous Corp., IPRP, PCT/US2014/048002, Feb. 12, 2015, 8 pgs.
Energous Corp., IPRP, PCT/US2014/049669, Feb. 9, 2016, 8 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/068282, Jun. 7, 2016, 10 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068551, Jun. 26, 2018, 6 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2017/046800, Feb. 12, 2019, 10 pgs.
Energous Corp., IPRP, PCT/US2017/065886, Jun. 18, 2019, 10 pgs.
Energous Corp., IPRP, PCT/US2018/012806, Jul. 9, 2019, 6 pgs.
Energous Corp., IPRP, PCT/US2018/025465, Oct. 1, 2019, 8 pgs.
Energous Corp., IPRP, PCT/US2018/031768, Nov. 12, 2019, 8 pgs.
Energous Corp., IPRP, PCT/US2018/031786, Apr. 14, 2020, 7 pgs.
Energous Corp., IPRP, PCT/US2018/039334, Dec. 24, 2019, 8 pgs.
Energous Corp., IPRP, PCT/US2018/051082, Mar. 17, 2020, 9 pgs.
Energous Corp., IPRP, PCT/US2018/058178, May 5, 2020, 7 pgs.
Energous Corp., IPRP, PCT/US2019/015 820, Aug. 4, 2020, 7 pgs.
Energous Corp., IPRP, PCT/US2019/021817, Sep. 15, 2020, 7 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.
Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.

(56) References Cited

OTHER PUBLICATIONS

Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/025465, Jun. 22, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/039334, Sep. 11, 2018, 9 pgs.
Energous Corp., ISRWO, PCT/US2018/051082, Dec. 12, 2018, 9 pgs.
Energous Corp., ISRWO, PCT/US2018/058178, Mar. 13, 2019, 10 pgs.
Energous Corp., ISRWO, PCT/US2018/064289, Apr. 25, 2019, 12 pgs.
Energous Corp., ISRWO, PCT/US2019/015 820, May 14, 2019, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Energous Corp., ISRWO, PCT/US2019/061445, Jan. 7, 2020, 19 pgs.
Energous Corp., ISRWO, PCT/US2020/051693, Jan. 7, 2021, 18 pgs.
Order Granting Reexamination Request, U.S. Appl. No. 90/013,793 dated Aug. 31, 2016, 23 pgs.
Notice of Intent to Issue Reexam Certificate: U.S. Appl. No. 90/013,793 dated Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023-Institution Decision, Nov. 29, 2016, 29 pgs.
*Ossia Inc.* vs *Energous Corp.*, PGR2016-00024-Institution Decision, Nov. 29, 2016, 50 pgs.
*Ossia Inc.* vs *Energous Corp.*, PGR2016-00024-Judgement-Adverse, Jan. 20, 2017, 3 pgs.
Adamiuk et al. "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al. "A System for Change Detection and Human Recognition in Voxel Space using the Microsoft Kinect Sensor," 2011 IEEE Applied Imagery Pattern Recognition Workshop. 8 pgs.
Han et al. Enhanced Computer Vision with Microsoft Kinect Sensor: A Review, IEEE Transactions on Cybernetics vol. 43, No. 5, pp. 1318-1334, Oct. 3, 2013.
Hsieh et al. "Development of a Retrodirective Wireless Microwave Power Transmission System", IEEE, 2003 pp. 393-396.
Leabman "Adaptive Band-partitioning for Interference Cancellation in Communication System," Thesis Massachusetts Institute of Technology, Feb. 1997, pp. 1-70.
Li et al. High-Efficiency Switching-Mode Charger System Design Considerations with Dynamic Power Path Management, Mar./Apr. 2012 Issue, 8 pgs.

(56) References Cited

OTHER PUBLICATIONS

Mao et al. "BeamStar: An Edge-Based Approach to Routing in Wireless Sensors Networks", IEEE Transactions on Mobile Computing, IEEE Service Center, Los Alamitos, CA US, vol. 6, No. 11, Nov. 1, 2007, 13 pgs.

Mascarenas et al. "Experimental Studies of Using Wireless Energy Transmission for Powering Embedded Sensor Nodes," Nov. 28, 2009, Journal of Sound and Vibration, 13 pgs.

Mishra et al. "SIW-based Slot Array Antenna and Power Management Circuit for Wireless Energy Harvesting Applications", IEEE APSURSI, Jul. 2012, 2 pgs.

Nenzi et al. "U-Helix: On-Chip Short Conical Antenna", 2013 7th European Conference on Antennas and Propagation (EUCAP), ISBN:978-1-4673-2187-7, IEEE, Apr. 8, 2013, 5 pgs.

Qing et al. "UHF Near-Field Segmented Loop Antennas with Enlarged Interrogation Zone," 2012 IEEE International Workshop on Antenna Technology (iWAT), Mar. 1, 2012, pp. 132-135, XP055572059, ISBN: 978-1-4673-0035-3.

Singh "Wireless Power Transfer Using Metamaterial Bonded Microstrip Antenna for Smart Grid WSN", Fourth International Conference on Advances in Computing and Communications (ICACC), Aug. 27-29, 2014, Abstract 1 pg.

Smolders "Broadband Microstrip Array Antennas" Institute of Electrical 1-15 and Electronics Engineers, Digest of the Antennas and Propagation Society International Symposium. Seattle, WA, Jun. 19-24, 1994, Abstract 3 pgs.

Van Veen et al., "Beamforming: A Versatile Approach to Spatial Filtering", IEEE, ASSP Magazine, Apr. 1988, pp. 4-24.

Wei et al. "Design of a Wideband Horizontally Polarized Omnidirectional Printed Loop Antenna," IEEE Antennas and Wireless Propagation Letters, vol. 11, Jan. 3, 2012, 4 pgs.

Zeng et al. "A Compact Fractal Loop Rectenna for RF Energy Harvesting," IEEE Antennas and Wireless Propagation Letters, vol. 16, Jun. 26, 2017, 4 pgs.

Zhai et al. "A Practical Wireless Charging System Based on Ultra-Wideband Retro-Reflective Beamforming" 2010 IEEE Antennas and Propagation Society International Symposium, Toronto, ON 2010, 4 pgs.

\* cited by examiner

Wireless Power Transmission Environment 100

SYSTEMS AND METHODS OF PROTECTING WIRELESS POWER RECEIVERS USING MULTIPLE RECTIFIERS AND ESTABLISHING IN-BAND COMMUNICATIONS USING MULTIPLE RECTIFIERS

RELATED APPLICATIONS

This application claims priority to U.S. Provisional Application Ser. No. 62/907,234, filed Sep. 27, 2019, and to U.S. Provisional Application Ser. No. 62/903,675, filed Sep. 20, 2019. Each of these applications is hereby incorporated by reference.

TECHNICAL FIELD

The embodiments herein generally relate to antennas, software, and devices used in wireless power transmission systems and, more specifically, to systems and methods of receivers with rectifiers capable of being used for communicating, warning of power fluctuations, and protecting against power surges.

BACKGROUND

Conventional wireless power transmission systems, such as charging pads, utilize both RF signals and induction to generate a magnetic field that is used to charge a device. These charging pads (i.e., transmitters) have to communicate with receivers to ensure that the device to be charge is not damaged by an unexpected surge in power or a power loss. To overcome such issues, the current approach has been to add a wireless communication chip (e.g., a Bluetooth radio) to both the transmitter and the receiver, which allows the devices to communicate with each other. However, the addition on these communication chips can be costly, which increases the cost of the wireless power transmission systems. In addition, in electronic devices where space is at a premium, the wireless communication chips occupy valuable shape.

Furthermore, establishing a communication connection between the transmitter and the receiver takes time, which can slow the time to start sending power from the transmitter to a receiver. Such a result is undesirable, because the wireless transmission of power is intended to be less involved than plugging in a device into a power source.

SUMMARY

Accordingly, there is a need for wireless charging systems (e.g., radio frequency (RF) charging pads) that address the problems identified above. To this end, systems and methods are described herein that are capable of allowing receivers to communicate and prepare for changes in power without having a dedicated communication chip (e.g., a Bluetooth radio). In some embodiments, such system and methods use to two rectifiers to solve the identified problems. It is also understood that in a two rectifier embodiment, a first rectifier is used to convert RF power to useable direct current (DC) to charge an electronic device while a second rectifier is configured to receive a smaller portion of power than the first rectifier, whereby this smaller portion of power is not used to charge the electronic device.

Typically, outputs of rectifiers are coupled to capacitors capable of reducing ripple. These capacitors are sized to match the outputted direct current, and the larger the direct current, the larger the capacitor needs to be to reduce ripple. However, these capacitors delay the detection (by either not charging or discharging fast enough) in incoming power. As a result, a second smaller rectifier that receives a smaller portion of power is capable of detecting changes in power faster than the components coupled to the first (i.e., larger power handling) rectifier. And once the second (i.e. smaller power handling) rectifier detects the change in power, it can communicate with the components coupled to the output of the first rectifier, and warn them that a power change has occurred.

In another aspect, this two rectifier embodiment allows for the second rectifier to adjust the impedance of the receiver causing a portion of the received RF power to be reflected back to the wireless power transmitter. By adjusting this impedance, the wireless power receiver can communicate with the wireless power transmitter. In one example, the wireless power transmitter can modulate its impedance (e.g., through control of the second rectifier) to signal the wireless power transmitter that a reduction in power is required by the wireless power receiver, or simply that power is no longer required.

(A1) In some embodiments, the solution explained above can be implemented on a wireless power receiver that includes a wireless-power-receiving antenna configured to receive radio frequency (RF) power signals, and convert energy from the received RF signals into an alternating current. The wireless power receiver also includes a primary rectifier that is configured to: (i) receive a first portion of the alternating current, and (ii) rectify the first portion of the alternating current into primary direct current having a first power level, the primary direct current used to provide power or charge to an electronic device. The wireless power receiver also includes a secondary rectifier that is configured to: (i) receive a second portion of the alternating current, and (ii) rectify the second portion of the alternating current into a secondary direct current having a second power level. The second power level of the secondary direct current is less than the first power level of the primary direct current. While a first voltage associated with the primary direct current and a second voltage associated with the secondary direct current can be similar, the power levels (the first and second power levels above) differ because load resistances for the primary and secondary direct currents are different.

(A2) In some embodiments of A1, the second power level of the secondary direct current indicates whether the antenna is receiving RF signals from a wireless-power-transmitting device.

(A3) In some embodiments of A2, an RF coupler is coupled to the antenna, and the RF coupler includes distinct first and second outputs. Furthermore, the primary rectifier is coupled to the first output of the RF coupler and the secondary rectifier is coupled to the second output of the RF coupler.

(A4) In some embodiments of A3, at least one impedance matching network is positioned between and coupled to the first output of the RF coupler and the secondary rectifier, whereby the at least one matching network is configured to match an impedance of a source of the RF signals.

(A5) In some embodiments of A3, at least one impedance matching network is positioned between and coupled to an input of the RF coupler and the antenna, whereby the at least one matching network is configured to match an impedance of a source of the RF signals.

(A6) In some embodiments of A3, the wireless power receiver also includes (i) one or more additional electrical components that are used to deliver the primary direct current that is used to power or charge to the electronic device and (ii) a controller configured to: (a) detect that the second power level of the secondary direct current satisfies one or more power-detection thresholds that indicate that the antenna is receiving RF signals from a wireless-power-transmitting device and (b) in response to detecting that the second direct current satisfies the one or more power-detection thresholds, send a signal that causes each of the one or more additional electrical components to prepare for receiving the primary direct current.

(A7) In some embodiments of A6, the one or more power-detection thresholds are satisfied when a voltage of the secondary direct current is in a range of approximately 5 volts to 30 volts. In some circumstances, the range can be either broadened (e.g., to be 1 volts to 40 volts), or narrowed (e.g., to be 5 volts to 10 volts).

(A8) In some embodiments of A7, detecting that the second power level of the secondary direct current satisfies one or more power-detection thresholds is performed by comparing the second power level to a respective power-detection threshold of the one or more power-detection thresholds at a first measurement point, a second measurement point, or both the first and second measurement points.

(A9) In some embodiments of A8, the first measurement point is located before a voltage divider that is configured to step down the voltage of the secondary direct current, and the second measurement point is located after the voltage divider.

(A10) In some embodiments of A6, the second portion of the alternating current is approximately less than 1% of the alternating current. In some embodiments, having the alternating current less than 1% minimizes impact on overall RF to DC conversion efficiency.

(A11) In some embodiments of A6, the wireless power receiver also includes: (i) a first storage component and (ii) a second storage component having a lower storage capacity that is less than the first storage component. Furthermore, the first storage component is coupled to an output of the primary rectifier while the second storage component is coupled to an output of the secondary rectifier. Moreover, the second storage component, due to its lower storage capacity, is configured to discharge faster than the first storage component, whereby discharge of the second storage component indicates to the wireless power receiver that RF signals are no longer being received at the antenna.

(A12) In some embodiments of any of A1-A11, the secondary rectifier is composed of: (i) an input configured to receive the second portion of the alternating current, (ii) a first diode, and (iii) a second diode. The input of the secondary rectifier is coupled to: a cathode of a first diode, wherein an anode of the first diode is coupled to a ground; and an anode of a second diode, wherein a cathode of the second diode is coupled to an output of the secondary rectifier.

(A13) In some embodiments of any of A1-A12, the secondary rectifier is composed of: (i) an input configured to receive the second portion of the alternating current, (ii) a first diode-connected transistor, and (iii) a second diode-connected transistor. The input of the secondary rectifier is coupled to: (i) a first diode-connected transistor, wherein the first diode-connected transistor is connected to a ground; and (ii) a second diode-connected transistor, wherein the second diode-connected transistor is connected to an output of the secondary rectifier.

(A14) In some embodiments of any of A3-A13, the RF coupler is a directional coupler.

(A15) In some embodiments of any of A3-A13, the RF coupler is a capacitive coupler.

(A16) In some embodiments of any of A3-A13, the RF coupler is a resistive coupler.

(B1) In another aspect, a method of communication between a wireless power receiver to a wireless power transmitter is performed. In some embodiments, the method includes receiving, by an antenna of the wireless power receiver, radio frequency (RF) signals from the wireless power transmitter, whereby the wireless power receiver substantially matches an impedance of the wireless power transmitter. The method also includes, while receiving the RF signals from the wireless power transmitter: (i) determining whether a communication criterion is satisfied, and (ii) in accordance with a determination that the communication criterion is satisfied, introducing an impedance mismatch between the wireless power receiver and the wireless power transmitter that causes a portion of the RF signals to be reflected by the antenna as a modulated signal. The transmitter is configured to receive and interpret the modulated signal without using a separate communication radio.

(B2) In some embodiments of B1, introducing the impedance mismatch includes creating one or more impedance mismatches between the wireless power receiver and the wireless power transmitter interspersed with one or more impedance matches between the wireless power receiver and the wireless power transmitter forming the modulated signal.

(B3) In some embodiments of B2, the wireless power transmitter interprets the modulated signal as an instruction to cease sending the RF signals to the wireless power receiver.

(B4) In some embodiments of B2, the wireless power transmitter interprets the modulated signal as an instruction to adjust transmission characteristics of the RF signals to the wireless power receiver.

(B5) In some embodiments of any of B1-B4, the method further includes, after introducing the impedance mismatch and while continuing to receive the RF signals from the wireless power transmitter, matching the impedance between the wireless power receiver and the wireless power transmitter, which stops reflection of the portion of the RF signals by the antenna.

(B6) In some embodiments of any of B1-B5, the wireless power transmitter ceases to transmit the RF signals to the wireless power receiver in response to receiving the modulated signal.

(B7) In some embodiments of any of B1-B6, the wireless power receiver includes an auxiliary rectifier, coupled to the antenna that receives some of the RF signals. Furthermore, introducing the impedance mismatch between the wireless power receiver and the wireless power transmitter includes adjusting a load of the auxiliary rectifier.

(B8) In some embodiments of B7, the wireless power receiver includes an auxiliary matching network coupled to and positioned between the antenna and the auxiliary rectifier. Furthermore, adjusting the load of the auxiliary rectifier causes an impedance mismatch between the auxiliary matching network of the wireless power receiver and the wireless power transmitter, which results the portion of the RF signals being reflected by the antenna.

(B9) In some embodiments of B7, the wireless power receiver includes a switch coupled to a load-adjusting mechanism, and the load-adjusting mechanism is coupled to the auxiliary rectifier. Moreover, the toggling the switch, which causes a change within the load-adjusting mechanism that produces a change in the load of the receiver, which results in the impedance mismatch between the wireless power receiver and the wireless power transmitter.

(B10) In another aspect, a wireless power receiver (e.g., receiver 120, FIG. 3) is provided. In some embodiments, the wireless power receiver includes: an antenna, a rectifier coupled to the antenna, a switch coupled to the rectifier, the switch being configured to create an impedance mismatch or match before an input of the rectifier, one or more processors; and memory storing one or more programs, which when executed by the one or more processors cause the transmitter to perform the method described in any one of B1-B9.

(B11) In yet another aspect, a wireless power receiver is provided and the wireless power receiver (e.g., receiver 120, FIG. 3) includes means for performing the method described in any one of B1-B9.

(B12) In still another aspect, a non-transitory computer-readable storage medium is provided. The non-transitory computer-readable storage medium stores executable instructions that, when executed by the wireless power receiver with one or more processors/cores, cause the wireless power receiver to perform the method described in any one of B1-B9.

(C1) In yet another aspect, a method of power surge protection for a wireless power receiver is performed. In some embodiments, this method is performed at a wireless power receiver that includes: (i) an antenna, (ii) a rectifier coupled to the antenna, and (iii) a switch coupled to the rectifier, the switch configured to create an impedance mismatch or match before an input of the rectifier. Further, the method includes, while the switch is in a default-closed state that grounds the switch and creates an impedance mismatch before an input of the rectifier: (i) receiving, by the antenna of the wireless power receiver, radio frequency (RF) signals as an alternating current, whereby a first portion of the alternating current is reflected away from the input of the rectifier due to the impedance mismatch between the wireless power receiver and the wireless power transmitter, and a second portion of the alternating current flows through the switch and to ground, and (ii) while the switch is in an open state that creates an impedance match between the wireless power receiver and the wireless power transmitter at the input of the rectifier: the first portion of the alternating current flows through the input of the rectifier, allowing the first portion of the alternating current to be converted into direct current that is used to charge or power a wireless electronic device. Moreover, the second portion of the alternating current flows through the switch and to the input of the rectifier, allowing the second portion of the alternating current to be converted into direct current that is used to charge or power a wireless electronic device.

(C2) In some embodiments of C1, a negative voltage generator is placed to drive the switch. For example, the negative voltage generator may be placed before the switch to drive the switch.

(C3) In some embodiments of any of C1-C2, the switch transitions from the default-closed state to the open state gradually over a period of time, and during the period of time, a part of the first portion of the alternating current continues to be reflected away from the input of the rectifier.

(C4) In some embodiments of C3, the switch transitions from default-closed to open state by using a Gallium Nitride (GaN) switch or a depletion mode metal oxide semiconductor (MOS) switch.

(C5) In some embodiments of C3, the method also includes, dynamically adjusting the period of time based on a detected voltage of the alternating current.

(C6) In some embodiments of C5, dynamically adjusting includes reducing the period of time based on a determination that the detected voltage does not satisfy a defined threshold value.

(C7) In some embodiments of C5, dynamically adjusting includes increasing the period of time based on a determination that the detected voltage satisfies a defined threshold value.

(C8) In some embodiments of any of C1-C7, the switch has a voltage threshold that is met before it enters the open fully open.

(C9) In some embodiments of C8, the voltage threshold is zero volts.

(C10) In some embodiments of any of C1-C9, the method further includes, while the switch is in the open state, ceasing to receive the RF signals by the antenna of the wireless power receiver. Ceasing to receive the RF signals causes the switch to transition back to the default-closed state from the open state.

(C11) In some embodiments of any of C1-C10, the wireless power receiver includes a coupling mechanism that is coupled to the antenna, the coupling mechanism including a first output and a second output. The first output of the coupling mechanism is coupled to the rectifier and the second output of the coupling mechanism is coupled to the switch.

(C12) In some embodiments of C11, the coupling mechanism partitions the alternating current. Further, the coupling mechanism: (i) directs a first portion of the alternating current to the first output of the coupling mechanism and (ii) directs a second portion of the alternating current to the second output of the coupling mechanism.

(C13) In some embodiments of C1-C12, the switch is coupled to an output of the rectifier.

(C14) In some embodiments of C1-C12, wherein the wireless power receiver also includes a matching network having (i) an input coupled to the first output of the coupling mechanism and (ii) an output coupled to the rectifier.

(C15) In some embodiments of C14, the switch is coupled to the matching network and the rectifier.

(C16) In another aspect, a wireless power receiver (e.g., receiver 120, FIG. 3) is provided. In some embodiments, the wireless power receiver includes: an antenna, a rectifier coupled to the antenna, a switch coupled to the rectifier, the switch being configured to create an impedance mismatch or match before an input of the rectifier, one or more processors; and memory storing one or more programs, which when executed by the one or more processors cause the transmitter to perform the method described in any one of C1-C15.

(C17) In yet another aspect, a wireless power receiver is provided and the receiver (e.g., receiver 120, FIG. 3) includes means for performing the method described in any one of C1-C15.

(C18) In still another aspect, a non-transitory computer-readable storage medium is provided. The non-transitory computer-readable storage medium stores executable instructions that, when executed by the wireless power receiver with one or more processors/cores, cause the wireless power receiver to perform the method described in any one of C1-C15.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and not intended to circumscribe or limit the inventive subject matter.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 1A:
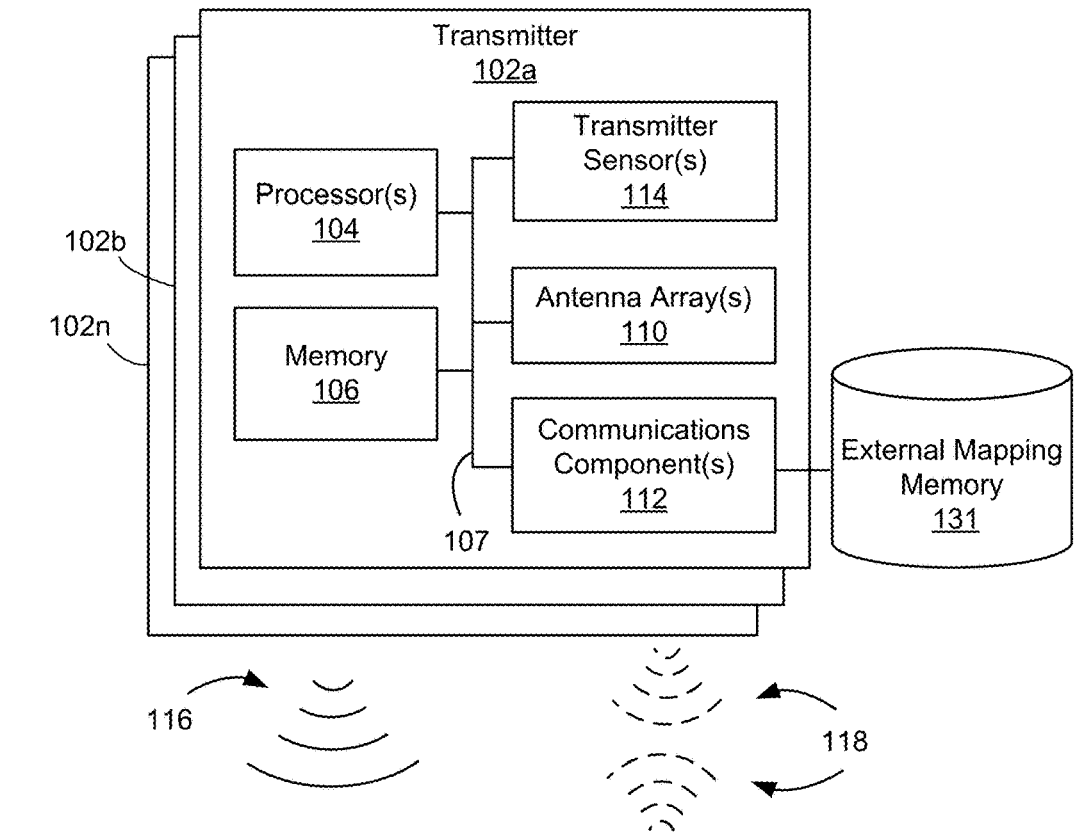
FIG. 1A is a block diagram of an RF wireless power transmission system, in accordance with some embodiments.
Figure 1A:
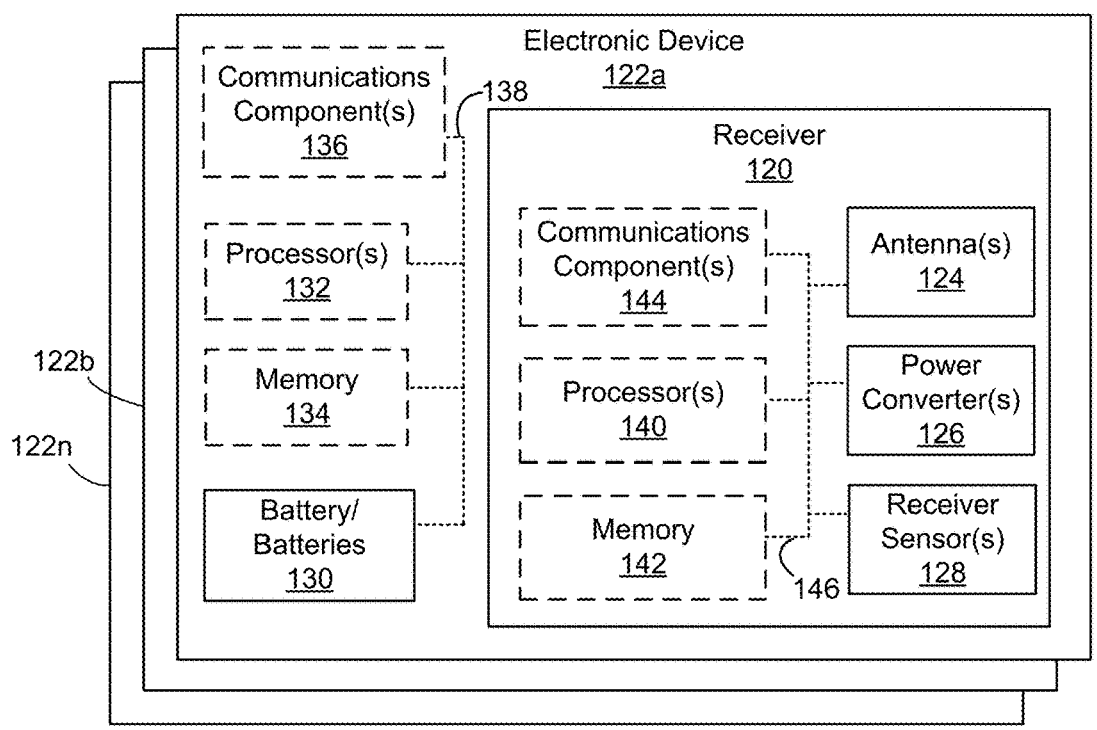

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIG. 1A is a block diagram of components of wireless power transmission environment 100, in accordance with some embodiments. Wireless power transmission environment 100 includes, for example, transmitters 102 (e.g., transmitters 102a, 102b ... 102n) and one or more receivers 120 (e.g., receivers 120a, 120b ... 120n). In some embodiments, each respective wireless power transmission environment 100 includes a number of receivers 120, each of which is associated with a respective electronic device 122. In some instances, the transmitter 102 is referred to herein as a "wireless-power-transmitting device" or a "wireless power transmitter." Additionally, in some instances, the receiver 120 is referred to herein as a "wireless-power-receiving device" or a "wireless power receiver."

An example transmitter 102 (e.g., transmitter 102a) includes, for example, one or more processor(s) 104, a memory 106, one or more antenna arrays 110, one or more communications components 112 (also referred to herein as a "wireless communications radio," a "communications radio" or simply a "radio"), and/or one or more transmitter sensors 114. In some embodiments, these components are interconnected by way of a communications bus 107. References to these components of transmitters 102 cover embodiments in which one or more of these components (and combinations thereof) are included. The components are discussed in further detail below with reference to FIG. 2.

In some embodiments, a single processor 104 (e.g., processor 104 of transmitter 102a) executes software modules for controlling multiple transmitters 102 (e.g., transmitters 102b ... 102n). In some embodiments, a single transmitter 102 (e.g., transmitter 102a) includes multiple processors 104, such as one or more transmitter processors (configured to, e.g., control transmission of signals 116 by antenna array 110), one or more communications component processors (configured to, e.g., control communications transmitted by communications component 112 and/or receive communications by way of communications component 112) and/or one or more sensor processors (configured to, e.g., control operation of transmitter sensor 114 and/or receive output from transmitter sensor 114).

The wireless power receiver 120 receives power transmission signals 116 and/or communication signals 118 transmitted by transmitters 102. In some embodiments, the receiver 120 includes one or more antennas 124 (e.g., an antenna array including multiple antenna elements), power converter 126, receiver sensor 128, and/or other components or circuitry (e.g., processor(s) 140, memory 142, and/or communication component(s) 144. In some embodiments, these components are interconnected by way of a communications bus 146. References to these components of receiver 120 cover embodiments in which one or more of these components (and combinations thereof) are included.

The receiver 120 converts energy from received signals 116 (also referred to herein as RF power transmission signals, or simply, RF signals, RF waves, power waves, or power transmission signals) into electrical energy to power and/or charge electronic device 122. For example, the receiver 120 uses the power converter 126 to convert energy derived from power waves 116 to alternating current (AC) electricity or direct current (DC) electricity to power and/or charge the electronic device 122. Non-limiting examples of the power converter 126 include rectifiers, rectifying circuits, voltage conditioners, among suitable circuitry and devices.

In some embodiments, the receiver 120 is a standalone device that is detachably coupled to one or more electronic devices 122. For example, the electronic device 122 has processor(s) 132 for controlling one or more functions of the electronic device 122, and the receiver 120 has processor(s) 140 for controlling one or more functions of the receiver 120.

In some embodiments, the receiver 120 is a component of the electronic device 122. For example, processors 132 control functions of the electronic device 122 and the receiver 120. In addition, in some embodiments, the receiver 120 includes one or more processors 140, which communicates with processors 132 of the electronic device 122.

In some embodiments, the electronic device 122 includes one or more processors 132, memory 134, one or more communication components 136, and/or one or more batteries 130. In some embodiments, these components are interconnected by way of a communications bus 138. In some embodiments, communications between electronic device 122 and receiver 120 occur via communications component(s) 136 and/or 144. In some embodiments, communications between the electronic device 122 and the receiver 120 occur via a wired connection between communications bus 138 and communications bus 146. In some embodiments, the electronic device 122 and the receiver 120 share a single communications bus.

In some embodiments, the receiver 120 receives one or more power waves 116 directly from the transmitter 102 (e.g., via one or more antennas 124). In some embodiments, the receiver 120 harvests power waves from one or more pockets of energy created by one or more power waves 116 transmitted by the transmitter 102. In some embodiments, the transmitter 102 is a near-field transmitter that transmits the one or more power waves 116 within a near-field distance (e.g., less than approximately six inches away from the transmitter 102). In other embodiments, the transmitter 102 is a far-field transmitter that transmits the one or more power waves 116 within a far-field distance (e.g., more than approximately six inches away from the transmitter 102).

After the power waves 116 are received and/or energy is harvested from them, circuitry (e.g., integrated circuits, amplifiers, rectifiers, and/or voltage conditioner) of the receiver 120 converts the energy of the power waves to usable power (i.e., electricity), which powers the electronic device 122 and/or is stored to battery 130 of the electronic device 122. In some embodiments, a rectifying circuit of the receiver 120 translates the electrical energy from AC to DC for use by the electronic device 122. In some embodiments, a voltage conditioning circuit increases or decreases the voltage of the electrical energy as required by the electronic device 122. In some embodiments, an electrical relay conveys electrical energy from the receiver 120 to the electronic device 122.

In some embodiments, the electronic device 122 obtains power from multiple transmitters 102 and/or using multiple receivers 120. In some embodiments, the wireless power transmission environment 100 includes a plurality of electronic devices 122, each having at least one respective receiver 120 that is used to harvest power waves from the transmitters 102 into power for charging the electronic devices 122.

In some embodiments, the one or more transmitters 102 adjust values of one or more characteristics (e.g., waveform characteristics, such as phase, gain, direction, amplitude, polarization, and/or frequency) of power waves 116. For example, a transmitter 102 selects a subset of one or more antenna elements of antenna array 110 to initiate transmission of power waves 116, cease transmission of power waves 116, and/or adjust values of one or more characteristics used to transmit power waves 116. In some embodiments, the one or more transmitters 102 adjust power waves 116 such that trajectories of power waves 116 converge at a predetermined location within a transmission field (e.g., a location or region in space), resulting in controlled constructive or destructive interference patterns. The transmitter 102 may adjust values of one or more characteristics for transmitting the power waves 116 to account for changes at the wireless power receiver that may negatively impact transmission of the power waves 116.

Note that, in some embodiments, the transmitter 102 utilizes beamforming techniques to wirelessly transfer power to a receiver 120, while in other embodiments, the transmitter 102 does not utilize beamforming techniques to wirelessly transfer power to a receiver 120 (e.g., in circumstances in which no beamforming techniques are used, the transmitter controller IC 160 discussed below might be designed without any circuitry to allow for use of beamforming techniques, or that circuitry may be present, but might be deactivated to eliminate any beamforming control capability).

In some embodiments, respective antenna arrays 110 of the one or more transmitters 102 may include a set of one or more antennas configured to transmit the power waves 116 into respective transmission fields of the one or more transmitters 102. Integrated circuits (FIG. 1C) of the respective transmitter 102, such as a controller circuit (e.g., a radio frequency integrated circuit (RFIC)) and/or waveform generator, may control the behavior of the antennas. For example, based on the information received from the receiver 120 by way of the communication signal 118, a controller circuit (e.g., processor 104 of the transmitter 102, FIG. 1A) may determine values of the waveform characteristics (e.g., amplitude, frequency, trajectory, direction, phase, polarization, among other characteristics) of power waves 116 that would effectively provide power to the receiver 120, and in turn, the electronic device 122. The controller circuit may also identify a subset of antennas from the antenna arrays 110 that would be effective in transmitting the power waves 116. In some embodiments, a waveform generator circuit (not shown in FIG. 1A) of the respective transmitter 102 coupled to the processor 104 may convert energy and generate the power waves 116 having the specific values for the waveform characteristics identified by the processor 104/controller circuit, and then provide the power waves to the antenna arrays 110 for transmission.

In some embodiments, the communications component 112 transmits communication signals 118 by way of a wired and/or wireless communication connection to the receiver 120. In some embodiments, the communications component 112 generates communication signals 118 used for triangulation of the receiver 120 (e.g., test signals). In some embodiments, the communication signals 118 are used to convey information between the transmitter 102 and receiver 120 for adjusting values of one or more waveform characteristics used to transmit the power waves 116 (e.g., convey amounts of power derived from RF test signals). In some embodiments, the communication signals 118 include information related to status, efficiency, user data, power consumption, billing, geo-location, and other types of information.

In some embodiments, the communications component 112 transmits communication signals 118 to the receiver 120 by way of the electronic device 122a. For example, the communications component 112 may convey information to the communications component 136 of the electronic device 122a, which the electronic device 122a may in turn convey to the receiver 120 (e.g., via bus 138).

In some embodiments, the communications component 112 includes a communications component antenna for communicating with the receiver 120 and/or other transmitters 102 (e.g., transmitters 102b through 102n). In some embodiments, these communication signals 118 are sent using a first channel (e.g., a first frequency band) that is independent and distinct from a second channel (e.g., a second frequency band distinct from the first frequency band) used for transmission of the power waves 116.

In some embodiments, the receiver 120 includes a receiver-side communications component 144 configured to communicate various types of data with one or more of the transmitters 102, through a respective communication signal 118 generated by the receiver-side communications component (in some embodiments, a respective communication signal 118 is referred to as an advertising signal). The data may include location indicators for the receiver 120 and/or electronic device 122, a power status of the device 122, status information for the receiver 120, status information for the electronic device 122, status information about the power waves 116, and/or status information for pockets of energy. In other words, the receiver 120 may provide data to the transmitter 102, by way of the communication signal 118, regarding the current operation of the system 100, including: information identifying a present location of the receiver 120 or the device 122, an amount of energy (i.e., usable power) received by the receiver 120, and an amount of power received and/or used by the electronic device 122, among other possible data points containing other types of information.

In some embodiments, the data contained within communication signals 118 is used by the electronic device 122, the receiver 120, and/or the transmitters 102 for determining adjustments to values of one or more waveform characteristics used by the antenna array 110 to transmit the power waves 116. Using a communication signal 118, the transmitter 102 communicates data that is used, e.g., to identify receivers 120 within a transmission field, identify electronic devices 122, determine safe and effective waveform characteristics for power waves, and/or hone the placement of pockets of energy. In some embodiments, the receiver 120 uses a communication signal 118 to communicate data for, e.g., alerting transmitters 102 that the receiver 120 has entered or is about to enter a transmission field(e.g., come within wireless-power-transmission range of a transmitter 102), provide information about the electronic device 122, provide user information that corresponds to the electronic device 122, indicate the effectiveness of received power waves 116, and/or provide updated characteristics or transmission parameters that the one or more transmitters 102 use to adjust transmission of the power waves 116.

In some embodiments, the receiver 120 does not include a distinct communications component 144. Rather, the receiver 120 is configured to reflect RF signals transmitted by the transmitter 102 at the one or more antennas 124 and, importantly, modulate the reflected RF signals to convey data (or a message) to transmitter 102. In such embodiments, the transmitter 102 may also lack a distinct communications component. Instead, the transmitter 102 may receive the reflected RF signals at the one or more antenna arrays 110, and the transmitter 102 may demodulate the reflected RF signals in order to interpret them. Reflecting RF signals by the receiver 120 is discussed in further detail below with reference to FIGS. 6A-6C.

In some embodiments, transmitter sensor 114 and/or receiver sensor 128 detect and/or identify conditions of the electronic device 122, the receiver 120, the transmitter 102, and/or a transmission field. In some embodiments, data generated by the transmitter sensor 114 and/or receiver sensor 128 is used by the transmitter 102 to determine appropriate adjustments to values of one or more waveform characteristics used to transmit the power waves 116. Data from transmitter sensor 114 and/or receiver sensor 128 received by the transmitter 102 includes, e.g., raw sensor data and/or sensor data processed by a processor 104, such as a sensor processor. Processed sensor data includes, e.g., determinations based upon sensor data output. In some embodiments, sensor data received from sensors that are external to the receiver 120 and the transmitters 102 is also used (such as thermal imaging data, information from optical sensors, and others).

Figure 1B:
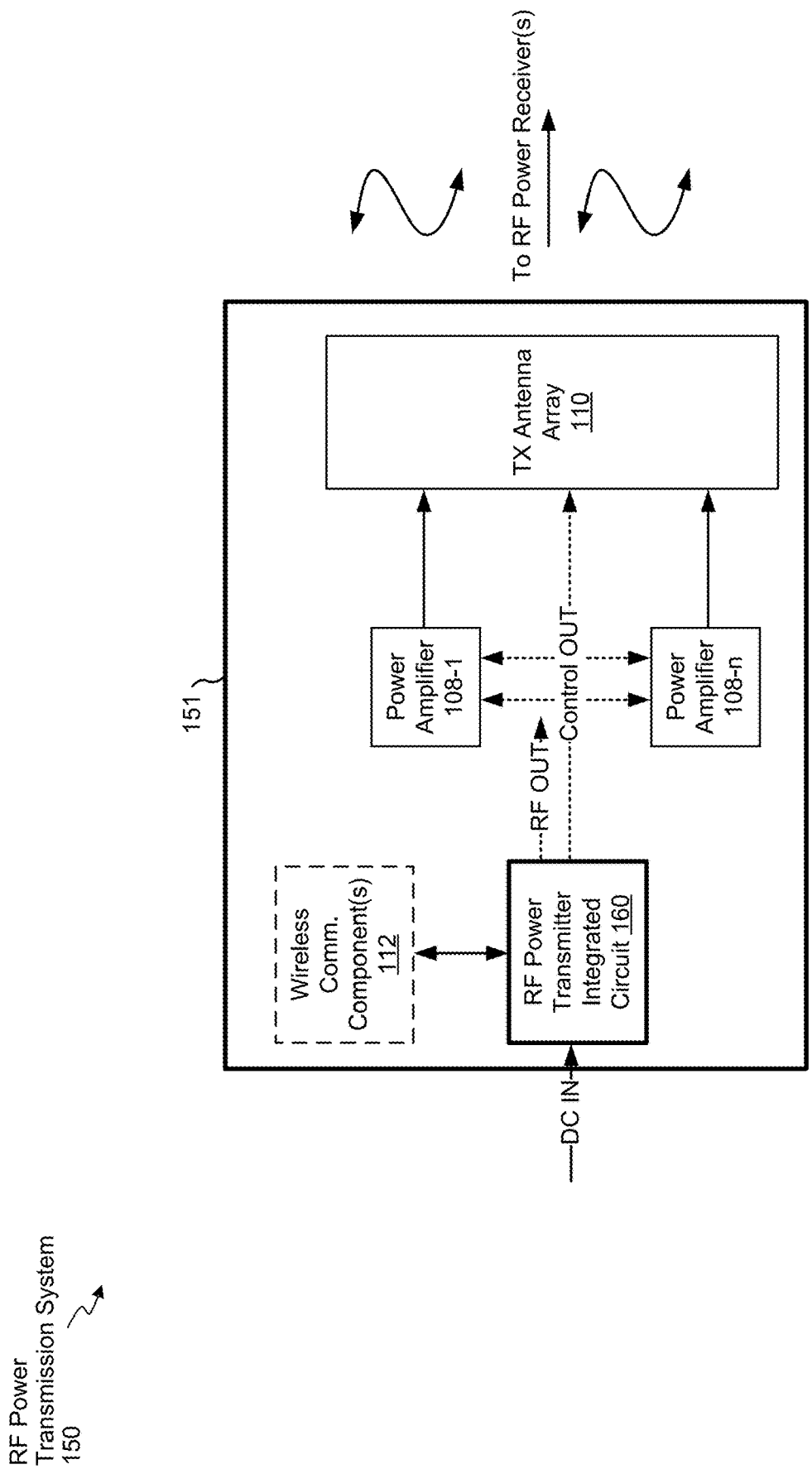
FIG. 1B is another block diagram of an RF wireless power transmission system, in accordance with some embodiments.

FIG. 1B is another block diagram of an RF wireless power transmission system 150 in accordance with some embodiments. In some embodiments, the RF wireless power transmission system 150 includes a far-field transmitter (not shown). In some embodiments, the RF wireless power transmission system 150 includes a RF charging pad 151 (also referred to herein as a near-field (NF) charging pad 151 or RF charging pad 151). The RF charging pad 151 may be an example of the transmitter 102 in FIG. 1A.

In some embodiments, the RF charging pad 151 includes an RF power transmitter integrated circuit 160 (described in more detail below). In some embodiments, the RF charging pad 151 includes one or more optional communications components 112 (e.g., wireless communication components, such as WI-FI or BLUETOOTH radios). Alternatively, in some embodiments, the RF charging pad 151 does not include the optional communications components 112. In such embodiments, the RF charging pad 151 includes alternative means for communicating with other devices (e.g., the RF charging pad 151 receives and interprets RF signals reflected by a receiver 120). In some embodiments, the RF charging pad 151 also connects to one or more power amplifier units 108-1, ... 108-*n* (PA or PA units) to control operation of the one or more power amplifier units when they drive external power-transfer elements (e.g., antennas 290). In some embodiments, RF power is controlled and modulated at the RF charging pad 151 via switch circuitry as to enable the RF wireless power transmission system to send RF power to one or more wireless receiving devices via the TX antenna array 110.

The optional communication component(s) 112 enable communication between the RF charging pad 151 and one or more communication networks, and are discussed in further detail above with reference to FIG. 1A. In some instances, the communication component(s) 112 are not able to communicate with wireless power receivers for various reasons, e.g., because there is no power available for the communication component(s) to use for the transmission of data signals or because the wireless power receiver 120 itself does not actually include any communication component of its own. As such, it is important to design near-field charging pads that are still able to uniquely identify different types of devices and, when a wireless power receiver is detected, figure out if that wireless power receiver is authorized to receive wireless power.

Figure 1C:
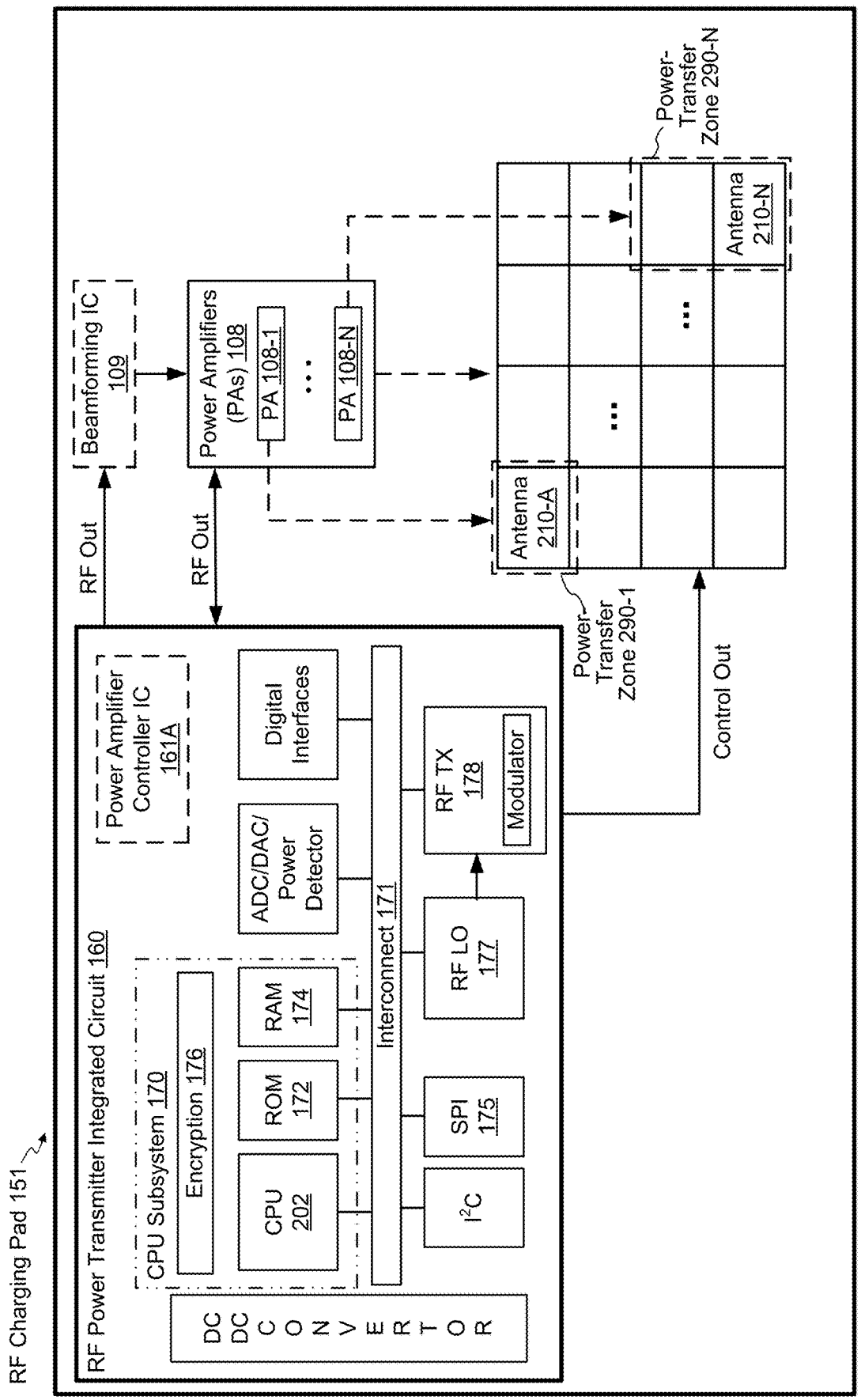
FIG. 1C is a block diagram showing components of an example RF charging pad that includes an RF power transmitter integrated circuit and antenna zones, in accordance with some embodiments.

FIG. 1C is a block diagram of the RF power transmitter integrated circuit 160 (the "integrated circuit") in accordance with some embodiments. In some embodiments, the integrated circuit 160 includes a CPU subsystem 170, an external device control interface, an RF subsection for DC to RF power conversion, and analog and digital control interfaces interconnected via an interconnection component, such as a bus or interconnection fabric block 171. In some embodiments, the CPU subsystem 170 includes a microprocessor unit (CPU) 202 with related Read-Only-Memory (ROM) 172 for device program booting via a digital control interface, e.g. an I$^2$C port, to an external FLASH containing the CPU executable code to be loaded into the CPU Subsystem Random Access Memory (RAM) 174 (e.g., memory 206, FIG. 2A) or executed directly from FLASH. In some embodiments, the CPU subsystem 170 also includes an encryption module or block 176 to authenticate and secure communication exchanges with external devices, such as wireless power receivers that attempt to receive wirelessly delivered power from the RF charging pad 150.

In some embodiments, the RF IC 160 also includes (or is in communication with) a power amplifier controller IC 161A (PA IC) that is responsible for controlling and managing operations of a power amplifier (or multiple power amplifiers), including for reading measurements of impedance at various measurement points within the power amplifier 108, whereby these measurements are used, in some instances, for detecting of foreign objects. The PA IC 161A may be on the same integrated circuit at the RF IC 160, or may be on its on integrated circuit that is separate from (but still in communication with) the RF IC 160. Additional details regarding the architecture and operation of the PA IC are provided in U.S. Provisional Application No. 62/903, 677, the disclosure of which is incorporated by reference herein in its entirety.

In some embodiments, executable instructions running on the CPU (such as those shown in the memory 106 in FIG. 2 and described below) are used to manage operation of the RF charging pad 151 and to control external devices through a control interface, e.g., SPI control interface 175, and the other analog and digital interfaces included in the RF power transmitter integrated circuit 160. In some embodiments, the CPU subsystem also manages operation of the RF subsection of the RF power transmitter integrated circuit 160, which includes an RF local oscillator (LO) 177 and an RF transmitter (TX) 178. In some embodiments, the RF LO 177 is adjusted based on instructions from the CPU subsystem 170 and is thereby set to different desired frequencies of operation, while the RF TX converts, amplifies, modulates the RF output as desired to generate a viable RF power level.

In the descriptions that follow, various references are made to antenna zones and power-transfer zones, which terms are used synonymously in this disclosure. In some embodiments the antenna/power-transfer zones may include antenna elements that transmit propagating radio frequency waves but, in other embodiments, the antenna/power transfer zones may instead include capacitive charging couplers that convey electrical signals but do not send propagating radio frequency waves.

In some embodiments, the RF power transmitter integrated circuit 160 provides the viable RF power level (e.g., via the RF TX 178) to an optional beamforming integrated circuit (IC) 109, which then provides phase-shifted signals to one or more power amplifiers 108. In some embodiments, the beamforming IC 109 is used to ensure that power transmission signals sent using two or more antennas 210 (e.g., each antenna 210 may be associated with a different antenna zone 290 or may each belong to a single antenna zone 290) to a particular wireless power receiver are transmitted with appropriate characteristics (e.g., phases) to ensure that power transmitted to the particular wireless power receiver is maximized (e.g., the power transmission signals arrive in phase at the particular wireless power receiver). In some embodiments, the beamforming IC 109 forms part of the RF power transmitter IC 160. In embodiments in which capacitive couplers (e.g., capacitive charging couplers 244) are used as the antennas 210, then optional beamforming IC 109 may not be included in the RF power transmitter integrated circuit 160.

In some embodiments, the RF power transmitter integrated circuit 160 provides the viable RF power level (e.g., via the RF TX 178) directly to the one or more power amplifiers 108 and does not use the beamforming IC 109 (or bypasses the beamforming IC if phase-shifting is not required, such as when only a single antenna 210 is used to transmit power transmission signals to a wireless power receiver). In some embodiments, the PA IC 161A receives the viable RF power level and provides that to the one or more power amplifiers 108.

In some embodiments, the one or more power amplifiers 108 then provide RF signals to the antenna zones 290 (also referred to herein as "power-transfer zones") for transmission to wireless power receivers that are authorized to receive wirelessly delivered power from the RF charging pad 151. In some embodiments, each antenna zone 290 is coupled with a respective PA 108 (e.g., antenna zone 290-1 is coupled with PA 108-1 and antenna zone 290-N is coupled with PA 108-N). In some embodiments, multiple antenna zones are each coupled with a same set of PAs 108 (e.g., all PAs 108 are coupled with each antenna zone 290). Various arrangements and couplings of PAs 108 to antenna zones 290 allow the RF charging pad 151 to sequentially or selectively activate different antenna zones in order to determine the most efficient antenna zone 290 to use for transmitting wireless power to a wireless power receiver. In some embodiments, the one or more power amplifiers 108 are also in communication with the CPU subsystem 170 to allow the CPU 202 to measure output power provided by the PAs 108 to the antenna zones 110 of the RF charging pad 151.

FIG. 1C also shows that, in some embodiments, the antenna zones 290 of the RF charging pad 151 may include one or more antennas 210A-N. In some embodiments, each antenna zone of the plurality of antenna zones 290 includes one or more antennas 210 (e.g., antenna zone 290-1 includes one antenna 210-A and antenna zones 290-N includes multiple antennas 210). In some embodiments, a number of antennas included in each of the antenna zones is dynamically defined based on various parameters, such as a location of a wireless power receiver on the RF charging pad 151. In some embodiments, each antenna zone 290 may include antennas of different types, while in other embodiments each antenna zone 290 may include a single antenna of a same type, while in still other embodiments, the antennas zones may include some antenna zones that include a single antenna of a same type and some antenna zones that include antennas of different types. In some embodiments the antenna/power-transfer zones may also or alternatively include capacitive charging couplers that convey electrical signals but do not send propagating radio frequency waves.

In some embodiments, the RF charging pad 151 may also include a temperature monitoring circuit that is in communication with the CPU subsystem 170 to ensure that the RF charging pad 151 remains within an acceptable temperature range. For example, if a determination is made that the RF charging pad 151 has reached a threshold temperature, then operation of the RF charging pad 151 may be temporarily suspended until the RF charging pad 151 falls below the threshold temperature.

By including the components shown for RF power transmitter circuit 160 (FIG. 1C) on a single chip, such transmitter chips are able to manage operations at the transmitter chips more efficiently and quickly (and with lower latency), thereby helping to improve user satisfaction with the charging pads that are managed by these transmitter chips. For example, the RF power transmitter circuit 160 is cheaper to construct, has a smaller physical footprint, and is simpler to install.

Figure 1D:
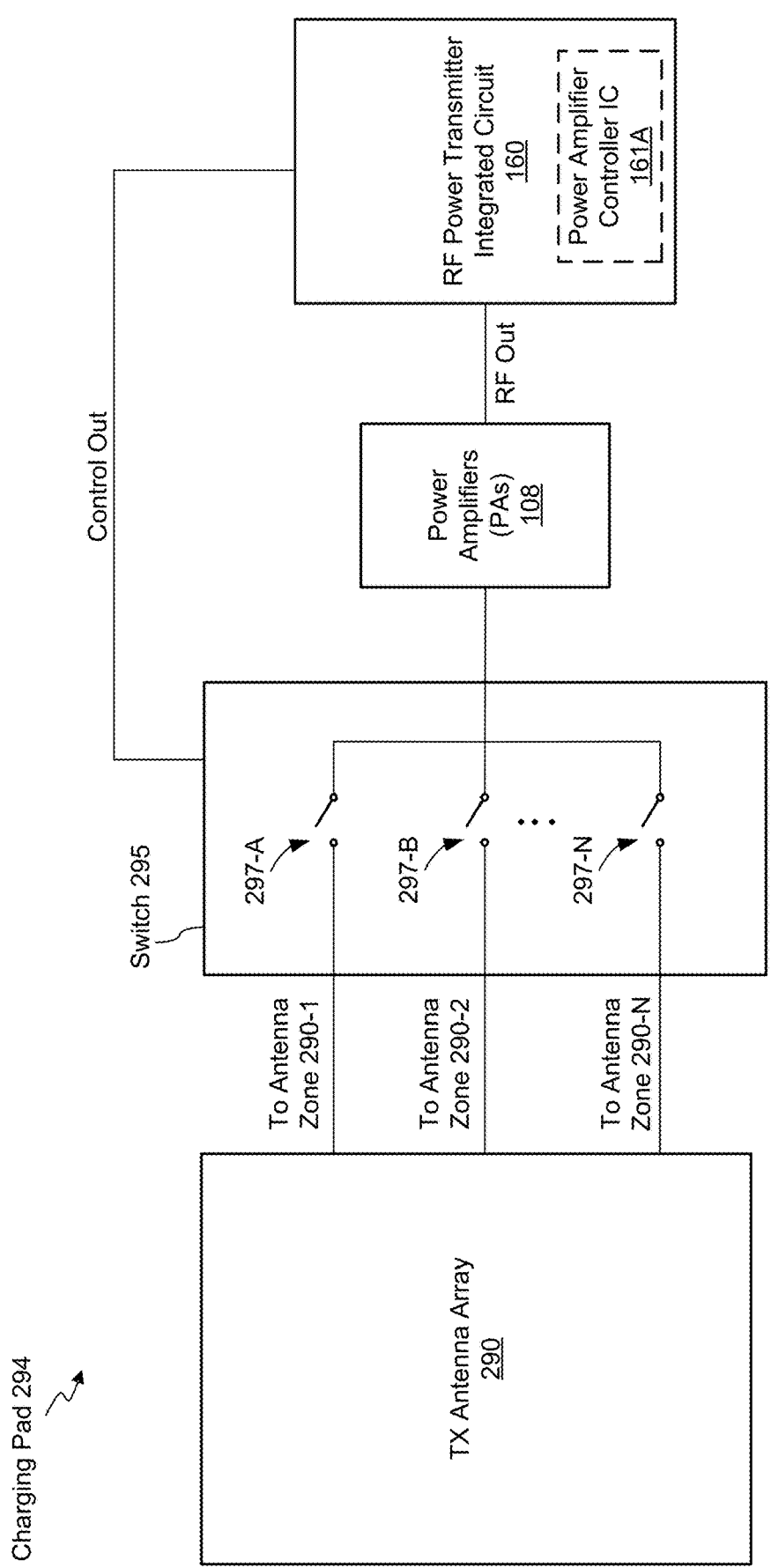
FIG. 1D is a block diagram showing components of an example RF charging pad that includes an RF power transmitter integrated circuit coupled to a switch, in accordance with some embodiments.

FIG. 1D is a block diagram of a charging pad 294 in accordance with some embodiments. The charging pad 294 is an example of the charging pad 151 (FIG. 1B), however, one or more components included in the charging pad 151 are not included in the charging pad 294 for ease of discussion and illustration.

The charging pad 294 includes an RF power transmitter integrated circuit 160, one or more power amplifiers 108, a PA IC 161A (which may be on the same or a separate IC from the RF power transmitter IC 160), and a transmitter antenna array 290 having multiple antenna zones. Each of these components is described in detail above with reference to FIGS. 1A-1C. Additionally, the charging pad 294 includes a switch 295 (i.e., transmitter-side switch), positioned between the power amplifiers 108 and the antenna array 290, having a plurality of switches 297-A, 297-B, . . . 297-N. The switch 295 is configured to switchably connect one or more power amplifiers 108 with one or more antenna zones of the antenna array 290 in response to control signals provided by the RF power transmitter integrated circuit 160.

To accomplish the above, each switch 297 is coupled with (e.g., provides a signal pathway to) a different antenna zone of the antenna array 290. For example, switch 297-A may be coupled with a first antenna zone 290-1 (FIG. 1C) of the antenna array 290, switch 297-B may be coupled with a second antenna zone 290-2 of the antenna array 290, and so on. Each of the plurality of switches 297-A, 297-B, . . . 297-N, once closed, creates a unique pathway between a respective power amplifier 108 (or multiple power amplifiers 108) and a respective antenna zone of the antenna array 290. Each unique pathway through the switch 295 is used to selectively provide RF signals to specific antenna zones of the antenna array 290. It is noted that two or more of the plurality of switches 297-A, 297-B, . . . 297-N may be closed at the same time, thereby creating multiple unique pathways to the antenna array 290 that may be used simultaneously.

In some embodiments, the RF power transmitter integrated circuit 160 (or the PA IC 161A, or both) is (are) coupled to the switch 295 and is configured to control operation of the plurality of switches 297-A, 297-B, . . . 297-N (illustrated as a "control out" signal in FIGS. 1B and 1D). For example, the RF power transmitter integrated circuit 160 may close a first switch 297-A while keeping the other switches open. In another example, the RF power transmitter integrated circuit 160 may close a first switch 297-A and a second switch 297-B, and keep the other switches open (various other combinations and configurations are possible). Moreover, the RF power transmitter integrated circuit 160 is coupled to the one or more power amplifiers 108 and is configured to generate a suitable RF signal (e.g., the "RF Out" signal) and provide the RF signal to the one or more power amplifiers 108. The one or more power amplifiers 108, in turn, are configured to provide the RF signal to one or more antenna zones of the antenna array 290 via the switch 295, depending on which switches 297 in the switch 295 are closed by the RF power transmitter integrated circuit 160.

In some embodiments, the charging pad is configured to transmit test power transmission signals and/or regular power transmission signals using different antenna zones, e.g., depending on a location of a receiver on the charging pad. Accordingly, when a particular antenna zone is selected for transmitting test signals or regular power signals, a control signal is sent to the switch 295 from the RF power transmitter integrated circuit 160 to cause at least one switch 297 to close. In doing so, an RF signal from at least one power amplifier 108 can be provided to the particular antenna zone using a unique pathway created by the now-closed at least one switch 297.

In some embodiments, the switch 295 may be part of (e.g., internal to) the antenna array 290. Alternatively, in some embodiments, the switch 295 is separate from the antenna array 290 (e.g., the switch 295 may be a distinct component, or may be part of another component, such as the power amplifier(s) 108). It is noted that any switch design capable of accomplishing the above may be used, and the design of the switch 295 illustrated in FIG. 1D is merely one example.

Figure 2:
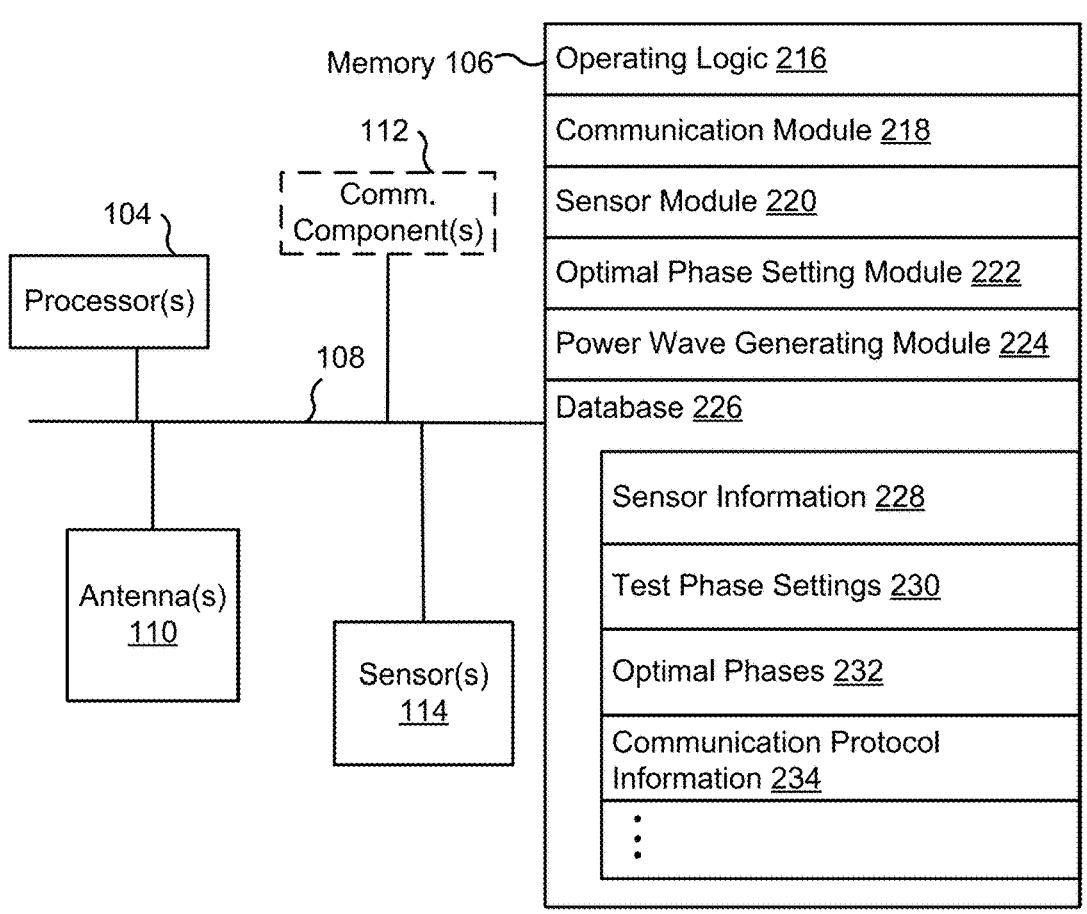
FIG. 2 is a block diagram showing components of an example RF transmitter, in accordance with some embodiments.

FIG. 2 is a block diagram illustrating a representative transmitter device 102 (also sometimes referred to herein as a transmitter 102, a wireless power transmitter 102, and a wireless-power-transmitting device 102) in accordance with some embodiments. In some embodiments, the transmitter device 102 includes one or more processors 104 (e.g., CPUs, ASICs, FPGAs, microprocessors, and the like), one or more optional communication components 112 (e.g., radios), memory 106, one or more antennas 110, and one or more communication buses 108 for interconnecting these components (sometimes called a chipset). In some embodiments, the transmitter device 102 includes one or more sensors 114 as described above with reference to FIG. 1A. In some embodiments, the transmitter device 102 includes one or more output devices such as one or more indicator lights, a sound card, a speaker, a small display for displaying textual information and error codes, etc. In some embodiments, the transmitter device 102 includes a location detection device, such as a GPS (global positioning satellite) or other geolocation receiver, for determining the location of the transmitter device 102.

The communication components 112 enable communication between the transmitter 102 and the receiver 120 (e.g., one or more communication networks). In some embodiments, the communication components 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

The memory 106 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 106, or alternatively the non-volatile memory within memory 106, includes a non-transitory computer-readable storage medium. In some embodiments, the memory 106, or the non-transitory computer-readable storage medium of the memory 106, stores the following programs, modules, and data structures, or a subset or superset thereof:

- operating logic 216 including procedures for handling various basic system services and for performing hardware dependent tasks;
- communication module 218 for coupling to and/or communicating with remote devices (e.g., remote sensors, transmitters, receivers, servers, etc.), in conjunction with communication component(s) 112 and/or antenna(s) 110;
- sensor module 220 for obtaining and processing sensor data (e.g., in conjunction with sensor(s) 114) to, for example, determine the presence, velocity, and/or positioning of object in the vicinity of the transmitter 102;
- optimal phase setting module 222 for determining an optimal phase antenna for respective antennas in the transmitter's antenna array 110. In some embodiments, as discussed below with reference to FIGS. 5A-5C, the optimal phase setting module 222 determines the optimal phase setting using either a binary search method or a least squares method, or some combination thereof;
- power wave generating module 224 for generating and transmitting (e.g., in conjunction with antenna(s) 110) power waves. In some embodiments, the power wave generating module 224 is associated with (or includes) the optimal phase setting module 222 is used to determine the optimal phase; and
- database 226, including but not limited to:
    - sensor information 228 for storing and managing data received, detected, and/or transmitted by one or more sensors (e.g., sensors 114 and/or one or more remote sensors);
    - test phases 230 for storing and managing predetermined test phases of test signals transmitted by the power wave generating module 224. In some embodiments, as discussed below with reference to FIGS. 5A-5C, the test phases are separated by a predetermined interval corresponding to known characteristics of a pure sinusoidal wave;
    - optimal phases 232 for storing and managing optimal antenna phases determined by the optimal phase setting module 222 for one or more antennas 110; and
    - communication protocol information 234 for storing and managing protocol information for one or more protocols (e.g., custom or standard wireless protocols, such as ZigBee, Z-Wave, etc., and/or custom or standard wired protocols, such as Ethernet).

Each of the above-identified elements (e.g., modules stored in memory 106 of the transmitter 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 106, optionally, stores a subset of the modules and data structures identified above. Furthermore, the memory 106, optionally, stores additional modules and data structures not described above, such as a tracking module for tracking the movement and positioning of objects within a transmission field.

Figure 3:
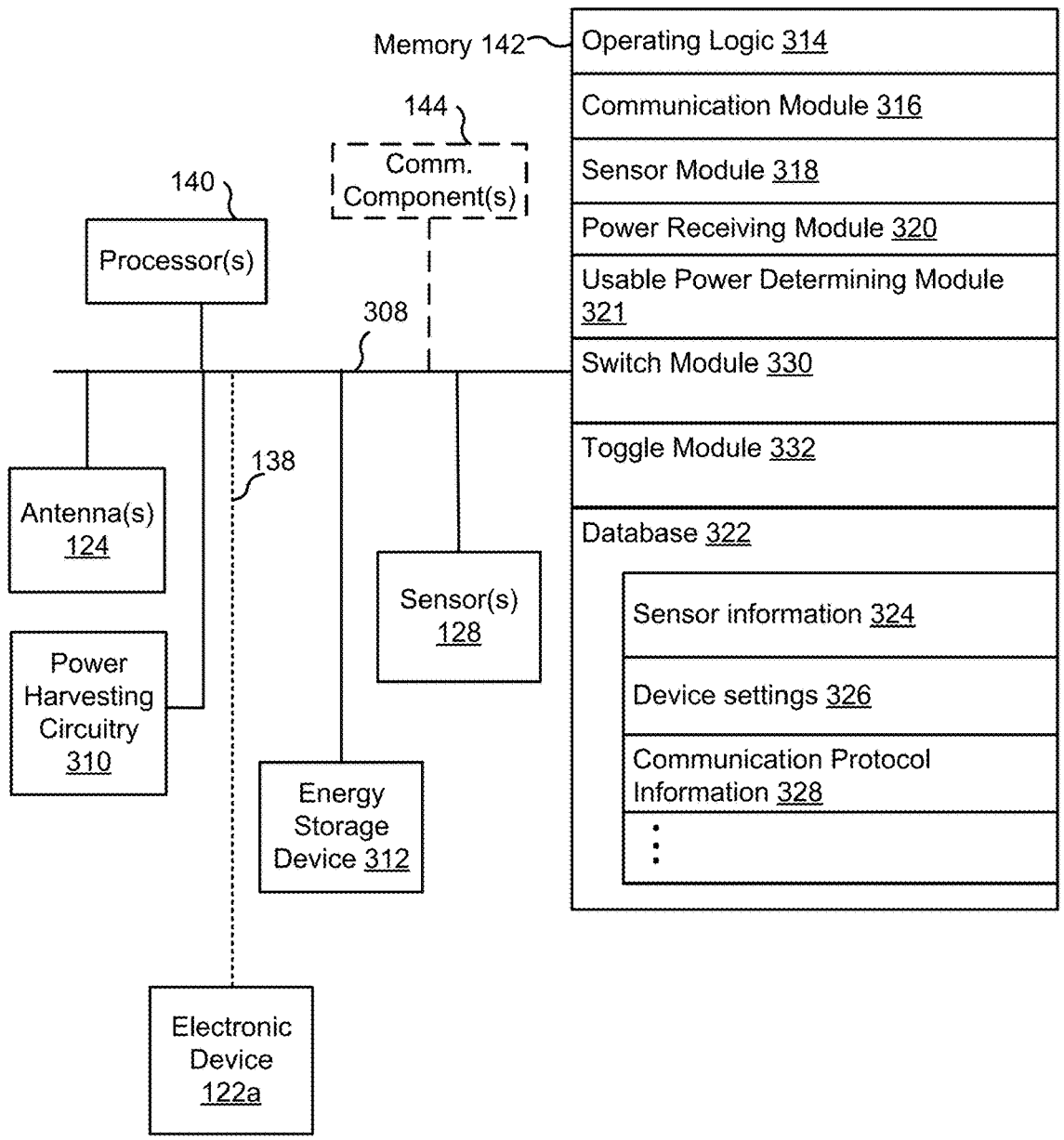
FIG. 3 is a block diagram showing components of an example RF receiver, in accordance with some embodiments.

FIG. 3 is a block diagram illustrating a representative receiver device 120 (also referred to herein as a receiver 120, a wireless power receiver 120, and a wireless-power-receiving device 120) in accordance with some embodiments. In some embodiments, the receiver device 120 includes one or more processors 140 (e.g., CPUs, ASICs, FPGAs, microprocessors, and the like), one or more optional communication components 144, memory 142, one or more antennas 124, power harvesting circuitry 310, and one or more communication buses 308 for interconnecting these components (sometimes called a chipset). In some embodiments, the receiver device 120 includes one or more sensors 128 such as one or sensors described above with reference to FIG. 1A. In some embodiments, the receiver device 120 includes an energy storage device 312 for storing energy harvested via the power harvesting circuitry 310. In various embodiments, the energy storage device 312 includes one or more batteries (e.g., battery 130, FIG. 1A), one or more capacitors, one or more inductors, and the like.

As described above with reference to FIG. 1A, in some embodiments, the receiver 120 is internally or externally connected to an electronic device (e.g., electronic device 122a, FIG. 1A) via a connection 138 (e.g., a bus). In some embodiments, the energy storage device 312 is part of the electronic device.

In some embodiments, the power harvesting circuitry 310 includes one or more rectifying circuits and/or one or more power converters. In some embodiments, the power harvesting circuitry 310 includes one or more components (e.g., a power converter 126) configured to convert energy from power waves and/or energy pockets to electrical energy (e.g., electricity). In some embodiments, the power harvesting circuitry 310 is further configured to supply power to a coupled electronic device (e.g., an electronic device 122), such as a laptop or phone. In some embodiments, supplying power to a coupled electronic device include translating electrical energy from an AC form to a DC form (e.g., usable by the electronic device 122).

The communication component(s) 144 enable communication between the receiver 120 and the transmitter 102 (e.g., via one or more communication networks). In some embodiments, the communication component(s) 144 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some embodiments, the receiver 120 may utilize a built-in communication component (e.g., a Bluetooth radio) or an electronic device with which the receiver 120 is coupled, and therefore, in these embodiments, the receiver 120 may not include its own communication component. In some other embodiments, the receiver 120 does not include a distinct communication component 144. Rather, the receiver 120 may use an in-band communication technique to communicate with other devices, as explained below with reference to FIGS. 6A-6C and FIG. 7.

The memory 142 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 142, or alternatively the non-volatile memory within memory 142, includes a non-transitory computer-readable storage medium. In some embodiments, the memory 142, or the non-transitory computer-readable storage medium of the memory 142, stores the following programs, modules, and data structures, or a subset or superset thereof:

operating logic 314 including procedures for handling various basic system services and for performing hardware dependent tasks;
  communication module 316 for coupling to and/or communicating with remote devices (e.g., remote sensors, transmitters, other receivers, servers, electronic devices, mapping memories, etc.) in conjunction with the optional communication component(s) 144 and/or antenna(s) 124;
  sensor module 318 for obtaining and processing sensor data (e.g., in conjunction with sensor(s) 128) to, for example, determine the presence, velocity, and/or positioning of the receiver 120, a transmitter 102, or an object in the vicinity of the receiver 120;
  power receiving module 320 for receiving (e.g., in conjunction with antenna(s) 124 and/or power harvesting circuitry 310) and optionally converting (e.g., in conjunction with power harvesting circuitry 310) the energy (e.g., to direct current); transferring the energy to a coupled electronic device (e.g., an electronic device 122); and optionally storing the energy (e.g., in conjunction with energy storage device 312)
  power determining module 321 for determining (in conjunction with operation of the power receiving module 320) an amount of power received by the receiver based on energy extracted from power waves (or RF test signals) and/or pockets or energy at which the power waves converge (e.g., RF signals 116, FIG. 1A). In some embodiments, as discussed below with reference to FIGS. 5A-5B, after determining an amount of power received by the receiver, the receiver 120 transmits to the transmitter 102 information identifying the amount of power;
  a switch module 330 for signaling when to open a switch of the power harvesting circuity 310 in order to stop power surges from damaging sensitive components. In some embodiments, as discussed below with reference to FIGS. 5A-5B, the switch is a negative voltage switch that is in a default-closed state;
  A toggle module 332 for controlling the impedance mismatch in the system, which in turn can cause a portion of the incoming power to be reflected from the antenna of the wireless power receiver. By modulating the amount of power reflected by the antenna device can communicate with a wireless power transmitter without needing a dedicate communication component (e.g., ., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.). In some embodiments, as discussed with reference to FIGS. 6A-6C below, when the toggle 602 toggles it causes the adjustable load 601 to change the impedance of the receiver 120, which further causes incoming power to be reflected at antenna 413; and
  database 322, including but not limited to:
    sensor information 324 for storing and managing data received, detected, and/or transmitted by one or more sensors (e.g., sensors 128 and/or one or more remote sensors);
    device settings 326 for storing and managing operational settings for the receiver 120, a coupled electronic device (e.g., an electronic device 122), and/or one or more remote devices; and
    communication protocol information 328 for storing and managing protocol information for one or more protocols (e.g., custom or standard wireless protocols, such as ZigBee, Z-Wave, etc., and/or custom or standard wired protocols, such as Ethernet).

In some embodiments, the power receiving module 320 communicates the amount of power to the communication module 316, which communicates the amount of power to other remote devices (e.g., transmitter 102, FIGS. 1-2). Moreover, in some embodiments, the power receiving module 320 may communicate the amount of power to database 322 (e.g., the database 322 stores the amount of power derived from one or more power waves 116). In some embodiments, the power receiving module 321 instructs the communication module 316 to transmit distinct transmissions to the remote devices (e.g., a first communication signal that indicates a first amount of power received by the receiver (e.g., by a first test signal from the transmitter 102), a second communication signal that indicates a second amount of power received by the receiver (e.g., by a second test signal from the transmitter 102), and so on if needed). Alternatively, in some embodiments, the power receiving module 320 instructs the communication module 316 to transmit data packets to the remote devices (e.g., a respective data packet can include information for multiple test signals transmitted by the transmitter 102).

Each of the above identified elements (e.g., modules stored in memory 142 of the receiver 120) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 142, optionally, stores a subset of the modules and data structures identified above. Furthermore, the memory 142, optionally, stores additional modules and data structures not described above, such as an identifying module for identifying a device type of a connected device (e.g., a device type for an electronic device 122).

On-and-Off Power Detection

Figure 4A:
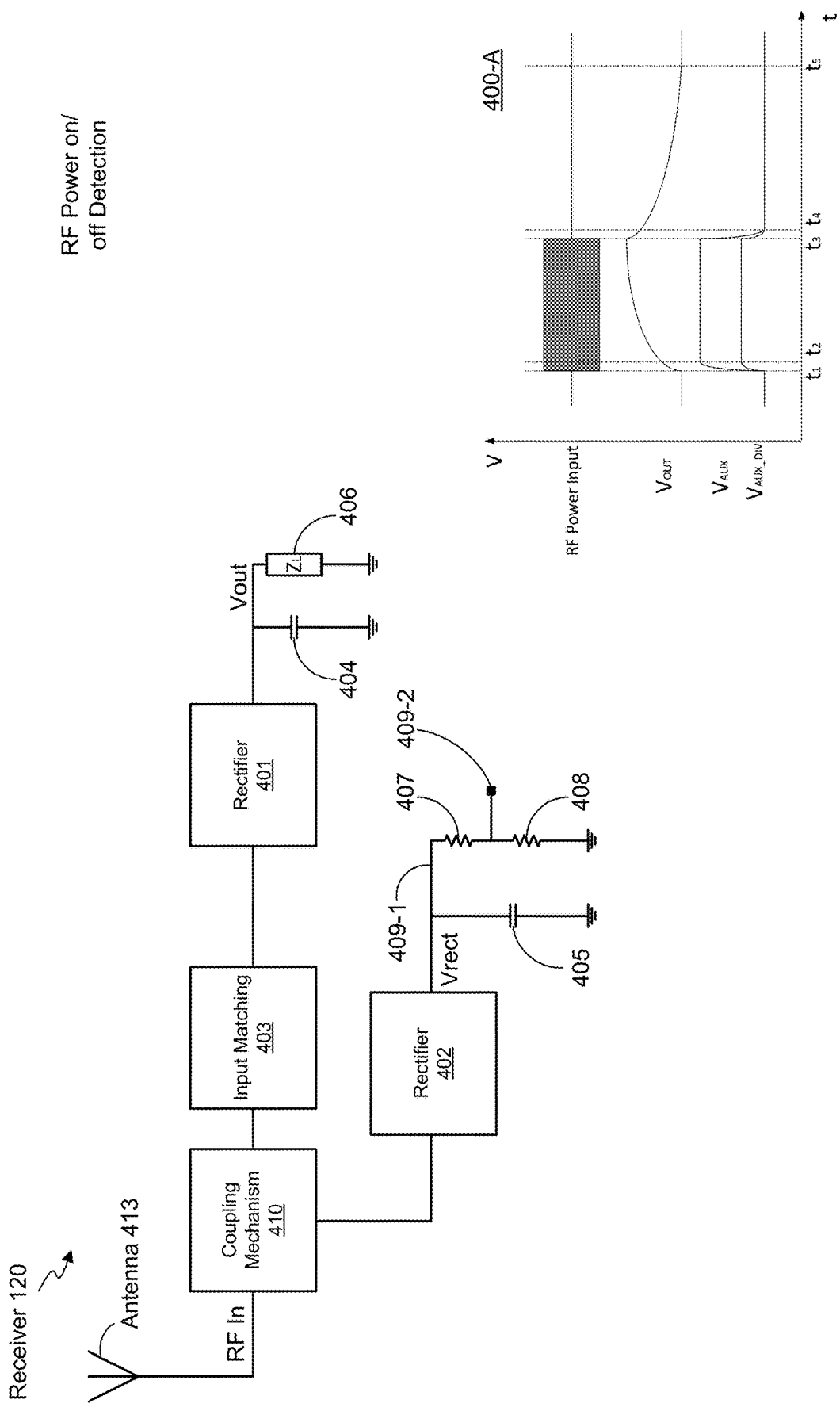
FIG. 4A is a circuit schematic illustrating an example RF receiver with two rectifiers for detecting changes in received RF power, in accordance with some embodiments.

FIG. 4A is a schematic of a representative receiver 120 in accordance with some embodiments. The representative receiver 120 is an example of the receiver 120 (FIG. 3). The components in FIG. 4A are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

In FIG. 4A, the receiver 120 includes an antenna 413 capable of receiving wireless power transmission signals (e.g., power waves 116). Once the wireless power transmission signals are received at the antenna 413 and converted to an alternating current, the alternating current is sent to an input of the coupling mechanism 410. Some examples of coupling mechanism 410 are illustrated in FIG. 4C. In some embodiments, the coupling mechanism 410 has two outputs (a first output that supplies AC alternating current the first rectifier 401, and a second output that supplies the alternating current to the second rectifier), and each output receives a portion of the alternating current received at the input of the coupling mechanism. In some embodiments, the coupling mechanism is configured to send all but −30 dB to −40 dB of the alternating current to the first output of the coupling mechanism 410, and sending the remaining −30 to −40 dB of the alternating current to the second output of the coupling mechanism 410.

The first output of the coupling mechanism 410 is coupled to an input of an input matching network 403, which is configured to match the impedance of the first rectifier with the impedance of the antenna 413. Although one matching network 403 is shown, it is possible to have multiple input matching networks, as illustrated by numeral 403-$n$ in FIG. 4B. The matching network is designed to match the impedance between the source (e.g., the antenna 413) and the load (e.g., the rectifier 401). The output of the matching network(s) is (are) coupled to the first rectifier 401. The first rectifier is configured to convert all but −30 dB to −40 dB of the alternating current to direct current. Some examples of rectifiers are shown in FIG. 4D. The output of the first rectifier 401 is coupled in parallel to both a capacitor 404, and the charging components $Z_L$ 406. The capacitor 404, which is also coupled to the ground, is designed to reduce ripple in the direct current output by the first rectifier 401, and has a capacitance that matches a direct current of the output of the first rectifier. With larger loads (i.e., rectifier outputs), a larger capacitance may be required, and when there is a larger capacitance, the capacitor takes a longer time to charge and discharge (i.e., the voltage to reach a steady state), which slows the response time of detecting whether power is no longer being received at the antenna 413.

The second output of the coupling mechanism is coupled to the second rectifier 402. The second rectifier 402 converts the remaining −30 dB to −40 dB of the wireless power transmission signals into direct current. Since this −30 dB to −40 dB is roughly less than 1% of the amount of wireless power transmission signals received at the antenna 413, the capacitor 405 associated with the second rectifier 402 has a lower capacitance (relative to the capacitance of the capacitor 404). Consequently, the capacitor 405 in FIG. 4A can charge up and discharge rapidly in comparison to the capacitor 404 coupled to the output of the first rectifier 401. As a result, the direct current and/or voltage measuring components ("$V_{AUX}$") 409-1 detect changes in direct current power levels and/or voltage levels in a shorter time span than the measuring components included in the charging components $Z_L$ 406. The measuring components ("$V_{AUX}$") 409-1 detect the change in wireless power transmission signals by either a change in voltage and/or direct current, and can then instruct the charging components $Z_L$ 406 components to prepare for a change in power once the capacitor 404 is either discharging or fully charged.

The second rectifier 402 is also optionally coupled with two resistors in series (resistor 407 and resistor 408). Between these two resistors, a voltage measurement can also be taken, which acts as another measurement component ("$V_{AUX\_DIV}$") 409-2. Such an arrangement of resistors is capable of stepping down the voltage, which allows for measuring components to have a lower voltage threshold to determine whether power is increasing or no longer being received. The resistance of these resistors can be varied depending on the acceptable voltage level of the direct current measuring components. In some embodiments, these resistors are variable resistors and are adjusted by a control. Furthermore, resistor 408 is also coupled to the ground.

To help illustrate the benefits of a dual rectifier receiver, graph 400-A compares a single rectifier system against a dual rectifier system. The graph shows at time "$t_1$" that the RF power (i.e. the wireless power transmission signals) starts to be received at the antenna 413. "$V_{OUT}$" shows the output of direct current at the output of the first rectifier. "$V_{AUX}$" shows the measuring component 409-1, which shows the output of the second rectifier 402. And, "$V_{AUX\_DIV}$" shows a second measurement point 409-2 that has had its voltage stepped down by the two resistors, which can be used to activate a measuring component that has a lower voltage threshold.

Moving to time "$t_2$" the received RF power input remains constant and does not change. At time "$t_2$," the "$V_{OUT}$" measuring components are still seeing a rise in voltage, as opposed to a constant voltage. Only once the voltage has settled can the system utilize the converted direct current (DC) (power). While the system is waiting for the voltage to settle, it is not aware that incoming power is going to the charging components $Z_L$ 406. To counteract this undesirable effect of not preparing the charging components $Z_L$ 406 for the incoming power, a second rectifier 402 is used in conjunction with a capacitor 405 with a smaller capacitance (relative to capacitor 404) that allows the voltage to settle at time "$t_2$." Once the voltage has settled at measuring components 409-1 and 409-2, then the system can communicate with the charging components $Z_L$ 406, (e.g., warn those components that incoming power is coming despite "$V_{OUT}$" not yet being settled).

Only at time "$t_3$" does the first rectifier and capacitor 404 produce a settled voltage that can be used by the system. At time "$t_3$," the RF power is no longer being received at the antenna 413. At time "$t_4$," the smaller capacitance capacitor 405 is able to settle to a voltage level that indicates that there is no longer any RF power being received at the antenna 413 (e.g., 0 volts). Once this lower voltage settles, the control system can notify the charging components $Z_L$ 406 that they should prepare for powering down. In contrast, at time "$t_5$" (i.e., long after time "$t_4$"), the larger capacitance capacitor 404 fully discharges and settles to the lower voltage indicating the system is no longer receiving RF power at the antenna 413. In sum, the charging components of the wireless power receiver benefit from an early warning from the smaller capacitor 405 that power is no longer being received because the charging components avoid having to wait on the capacitor's 404 long discharge time before beginning shutdown. Consequently, the early warning from the smaller capacitor 405 allows the charging components to prepare for a power down in anticipation of a loss of power, thus prolonging a life of the wireless power receiver (and potentially components in the device to be charged).

Thus, FIG. 4A at bottom describes a receiver 120 that can apportion a small amount of its received wireless power for the purpose of improving reliability of the main components of the circuit (i.e., $Z_L$ 406 components) by warning these components that a change in power is occurring. This improved reliability is achieved by anticipating a shutdown, which is discussed in detail in the preceding paragraph.

Figure 4B:
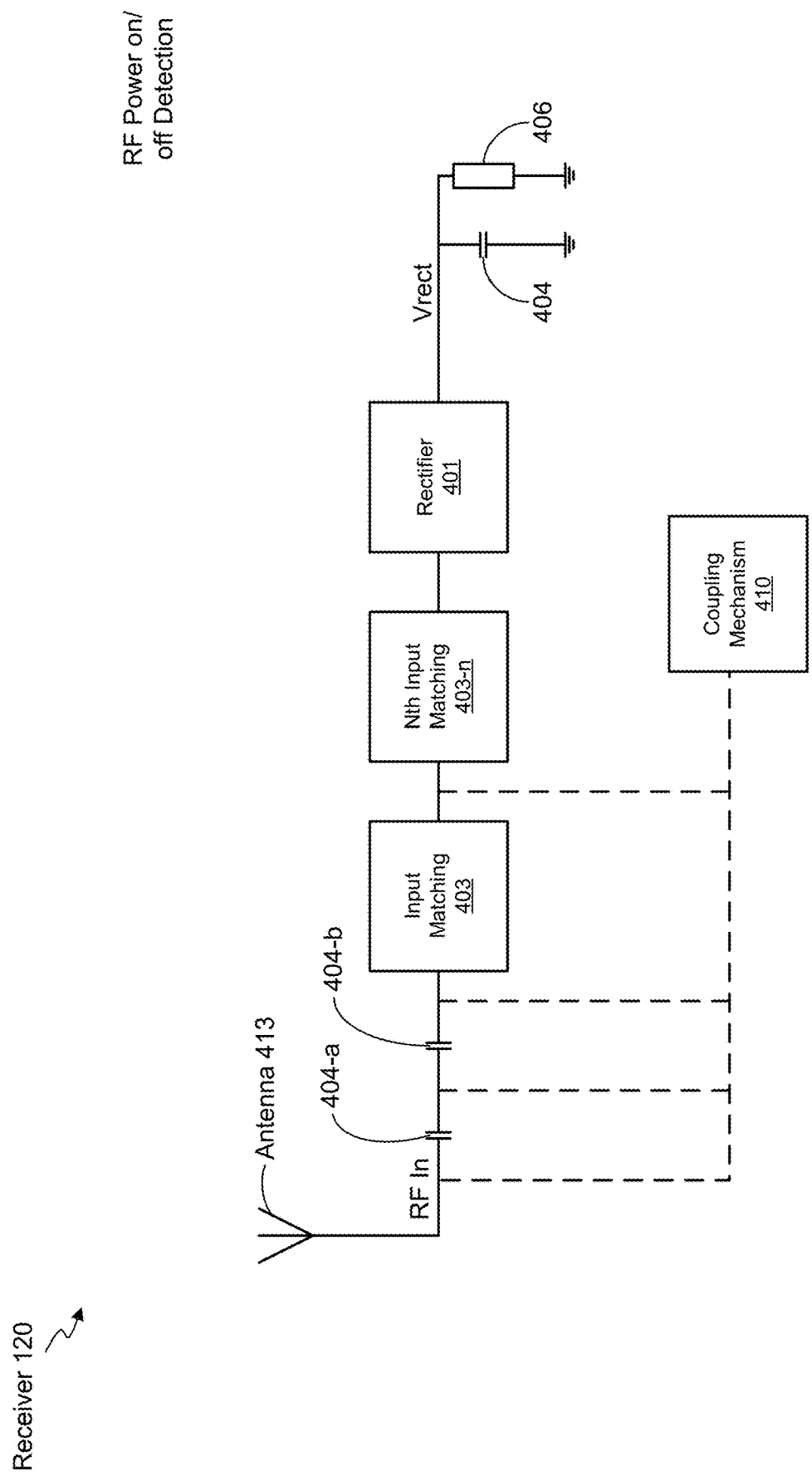
FIG. 4B is a circuit schematic illustrating points at which a coupling mechanism may be added to the circuit, in accordance with some embodiments.
Figure 4C:
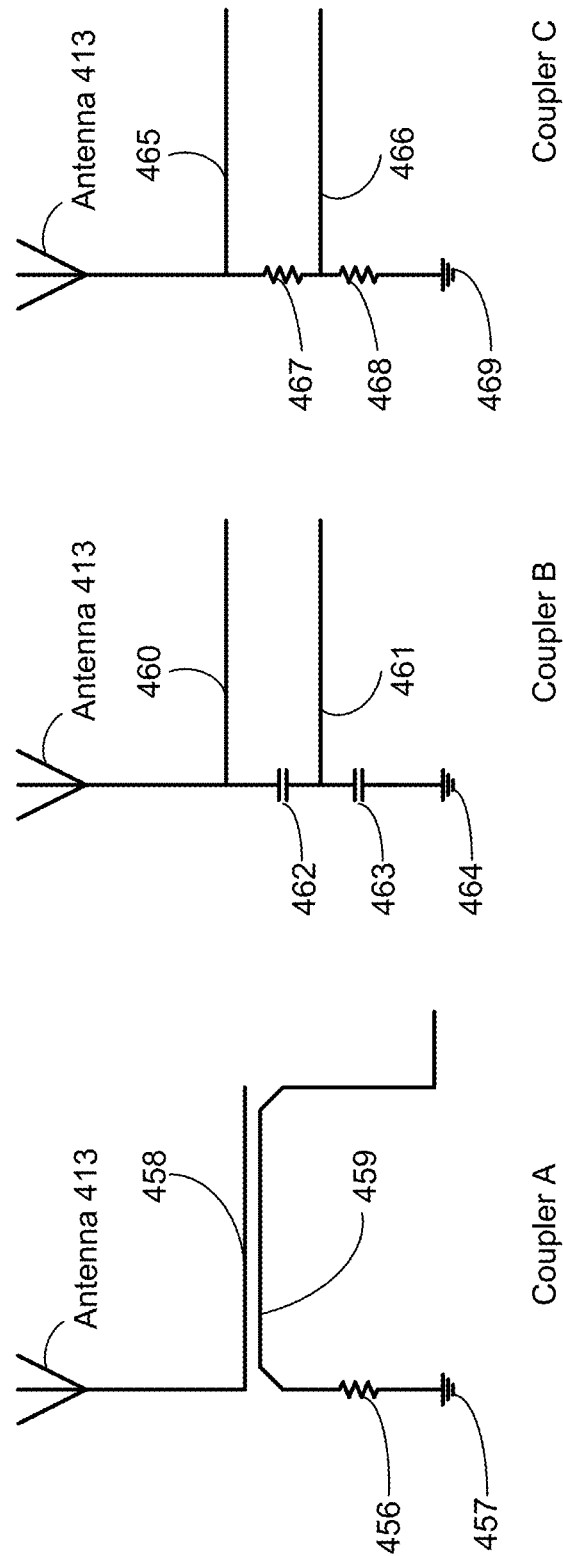
FIG. 4C illustrates circuit schematics for exemplary coupling mechanisms, in accordance with some embodiments, in accordance with some embodiments.
Figure 4D:
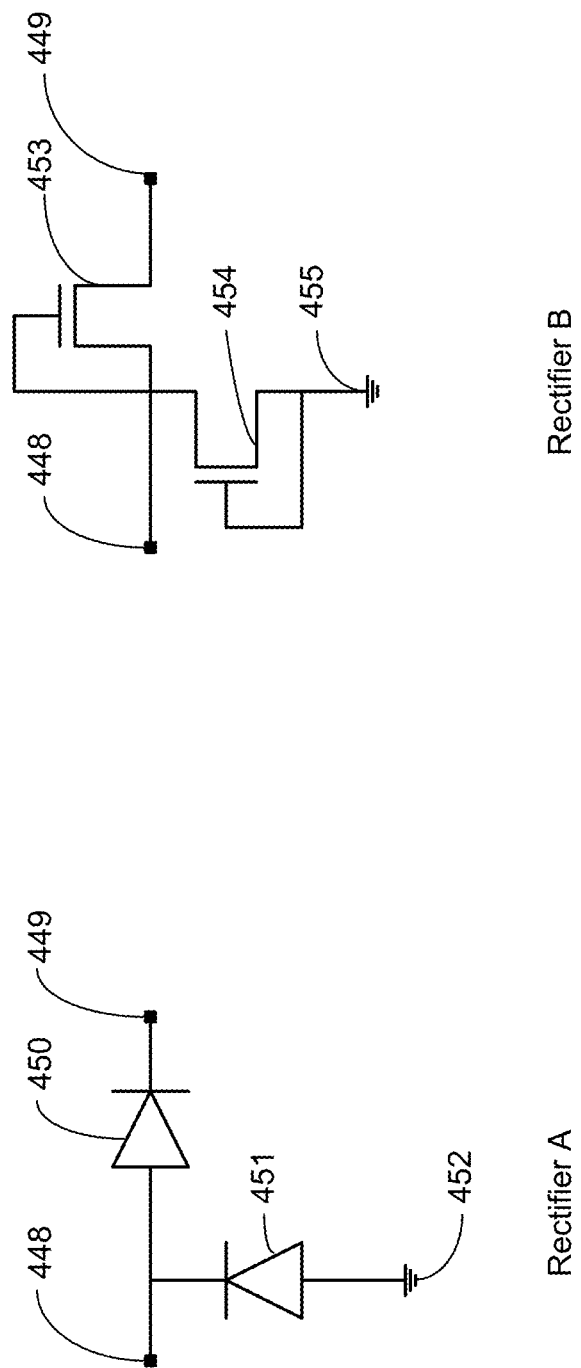
FIG. 4D illustrates circuit schematics for exemplary rectifiers, in accordance with some embodiments, in accordance with some embodiments.

FIG. 4B is a schematic that illustrates alternative embodiments to those discussed with reference to FIG. 4A. Namely, FIG. 4B shows alternative locations at which the coupling mechanism 410 can be coupled to the circuit, and still perform the same on-and-off detection as discussed in detail with respect to FIG. 4A. While some example features are illustrated, various other features, which were shown in FIG. 4A, have not been illustrated in FIG. 4D for the sake of brevity and so as not to obscure pertinent aspects of the example implementations disclosed herein.

The differences between FIG. 4A and FIG. 4B include the addition of first capacitor 404-a and second capacitor 404-b, and at least a second matching network identified as $N^{th}$ input matching network 403-n. Additionally, four vertical dotted lines represent the different locations that the coupling mechanism 410 can be coupled to the circuit. As shown, the coupling mechanism can be coupled to the circuit at a point before a first capacitor 404-a. Alternatively, the coupling mechanism 410 may also be coupled after the first capacitor 404-a, but before the second capacitor 404-b. The next location at which the coupling mechanism 410 can be coupled to the circuit is the same location as the one shown in FIG. 4A. Finally, the coupling mechanism 410 can be coupled to the circuit between any of the input matching networks. This is illustrated by the coupling mechanism 410 being placed after the input matching network 403, but before the coupling mechanism 4'0 being placed before the $N^{th}$ input matching network 403-n. In this example, the $N^{th}$ input matching network 403-n represents the last input matching network.

FIG. 4C is schematic illustrating three separate coupling mechanism embodiments. In some embodiments, the coupling mechanism 410 is a directional coupler, shown in FIG. 4C as "Coupler A." The directional coupler consists of two separate paths, the first path 458 and the second path 459. With reference to both FIG. 4A and FIG. 4B, the first path 458 is the path that is coupled to the antenna 413. Path 458 is also ultimately connected to the first rectifier 401. The second path 459 is placed within a certain proximity to the first path 458 so as to allow a portion of the RF signals to bleed off to the second path 459. The second path 459 is ultimately coupled to the second rectifier 402, as shown in FIG. 4A. Additionally, the second path 459 includes a resistor 456 that is coupled to a ground 457.

FIG. 4C also includes schematics for illustrating a capacitive coupler, shown in FIG. 4C as "Coupler B." The capacitive coupler consists of two separate paths, the first path 460 and the second path 461. With reference to both FIG. 4A and FIG. 4B, the first path 460 is the path that is coupled to the antenna 413. Path 460 is also ultimately connected to the first rectifier 401. The second path 461 is coupled between the first capacitor 462 and second capacitor 463. The second path 461 is ultimately coupled to the second rectifier 402, as shown in FIG. 4A. Additionally, the second capacitor 463 is also coupled to a ground 464.

FIG. 4C also includes schematics for illustrating a resistive coupler, shown in FIG. 4C as "Coupler C." The capacitive coupler consists of two separate paths, the first path 465 and the second path 466. With reference to both FIG. 4A and FIG. 4B, the first path 465 is the path that is coupled to the antenna 413. Path 465 is also ultimately connected to the first rectifier 401. The second path 466 is coupled between the first resistor 467 and second resistor 468. The second path 466 is ultimately coupled to the second rectifier 402, as shown in FIG. 4A. Additionally, the second resistor 486 is also coupled to a ground 469.

FIG. 4D shows two schematics for rectifiers. Rectifier "A" illustrates a diode based rectifier. With respect to the diode based rectifier, the input to the rectifier system is shown as input 448, which is coupled to an anode of a diode 450, and coupled in parallel to the cathode of a diode 451. The cathode of the diode 450 is coupled to the output of the rectifier system, as shown as output 449, while the anode of the diode 451 is coupled to the ground 452.

FIG. 4D also shows a schematic for a second rectifier, rectifier "B." Rectifier "B" is a diode connected transistor based rectifier. With respect to diode connected transistor based rectifier, the input to the rectifier system is shown as input 448, which is coupled, in parallel, to a first diode connected transistor 453, and a second diode connected transistor 454. The first diode connected transistor 453 is coupled to the output of the rectifier system, as shown as output 449, while the second diode connected transistor 454 is coupled to the ground 455.

Figure 4E:
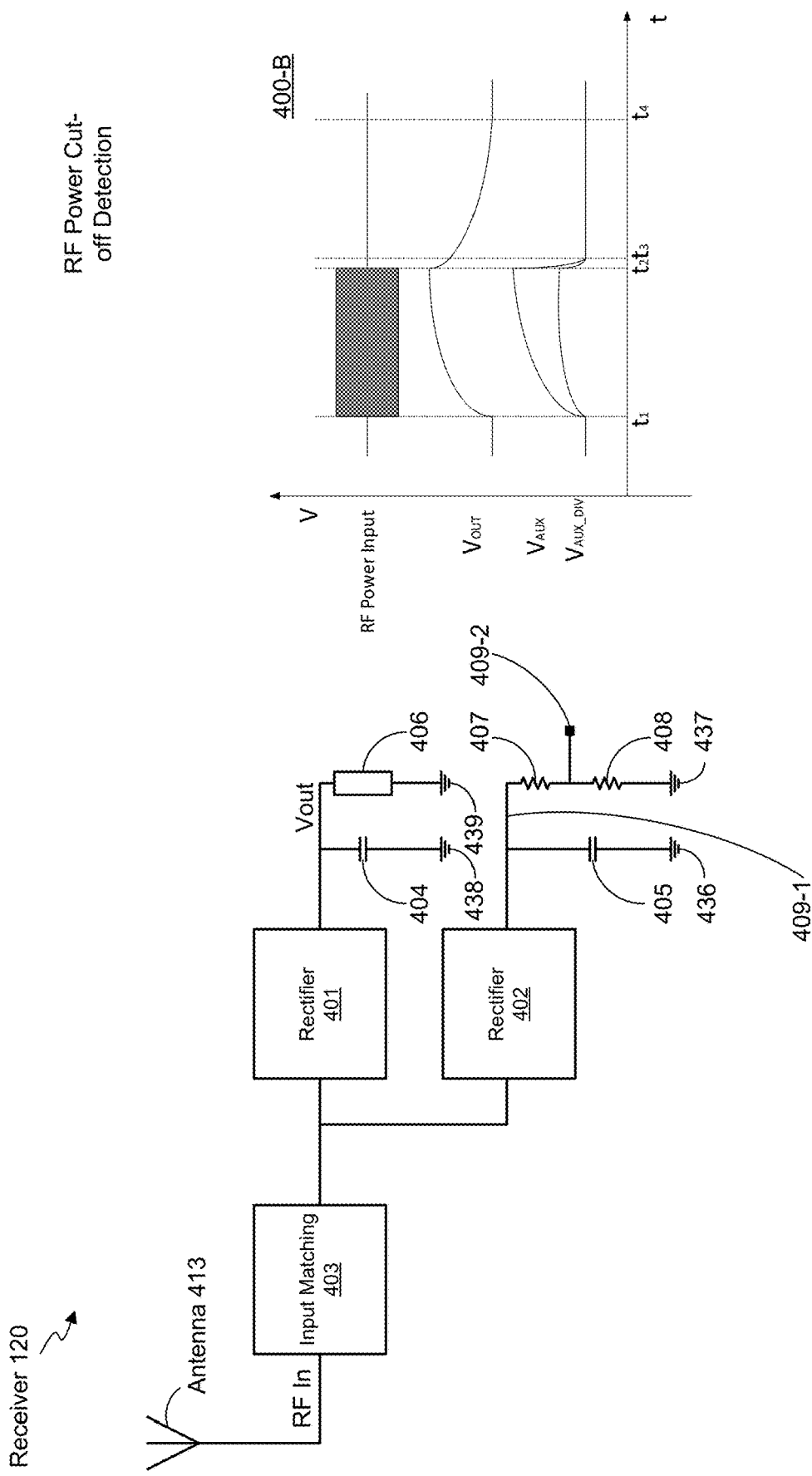
FIG. 4E illustrates a circuit schematics for detecting when RF power is no longer received at the antenna, in accordance with some embodiments.

FIG. 4E shows a schematic of a receiver 120 that is similar to the receiver shown in FIG. 4A. The receiver shown in FIG. 4E, however, does not include a coupling mechanism. The purpose of the circuit shown in FIG. 4E is for detecting when the wireless power transmission signals are no longer being received at the antenna 413, without the use of a coupling mechanism. When the power is no longer detected the receiver can warn components that are coupled to the output of the first rectifier 401 that the charging components 406 need to prepare for shutdown.

Figure 4F:
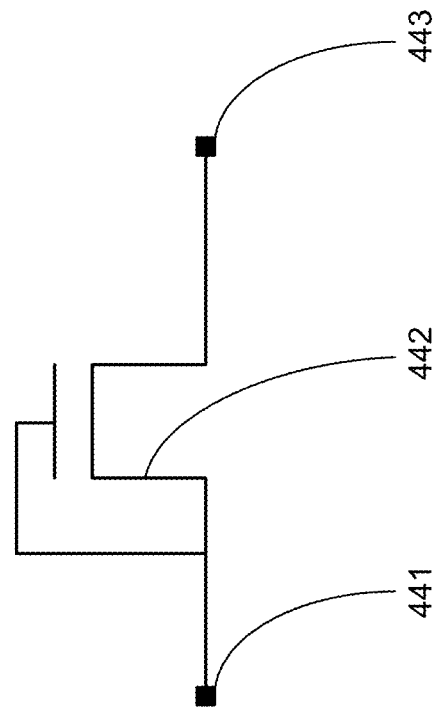
FIG. 4F illustrates circuit schematics of simplified rectifiers, in accordance with some embodiments.
Figure 4F:
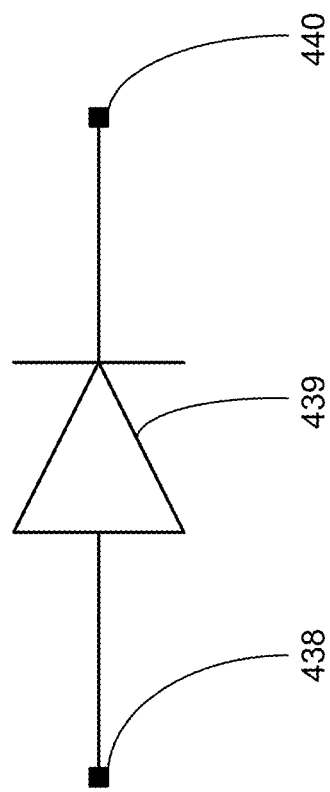

The schematic itself shows an antenna 413 that is coupled to an input of an input matching network 403. The output of the input matching network 403 is coupled to two rectifiers 401, 402 in parallel. Some examples of more simplified rectifiers are shown in FIG. 4F. The output of the rectifier 401 is coupled in parallel to the both a capacitor 404 and charging components "$Z_L$" 406. The capacitor 404, which is also coupled to the ground 438, is designed to reduce ripple in the DC output by the first rectifier 401, and has a capacitance that matches the DC load of the output of the first rectifier 401. With larger loads, a larger capacitance is required, and with the larger capacitance, the capacitor 404 takes a longer time to charge and discharge (i.e., for the voltage to reach a steady state), which slows the response time of detecting whether power is no longer being received at the antenna 413.

The second output of the input matching network 403 is coupled to the second rectifier 402. The capacitor 405 in FIG. 4E can charge up and discharge more rapidly in comparison to the capacitor 404 coupled to the output of the first rectifier 401. With respect to the ripple from the output of the rectifier 402, the components coupled to the output of the rectifier 402 require a less drastic ripple reduction as compared to the components coupled to the output of the rectifier 401. As a result, a smaller capacitance capacitor 405 can be used that allows for faster discharge times and, consequently, the DC and/or voltage measuring components ("$V_{AUX}$") 409-1 detect changes in DC power levels and/or voltage levels in a shorter time span than the measuring components included in the charging components $Z_L$ 406. The measuring components ("$V_{AUX}$") 409-1 detect the change in wireless power transmission signals by a change in voltage and/or DC current, and can then instruct the charging components $Z_L$ 406 to prepare for a change in power once the capacitor 405 either starts discharging or is fully discharged.

In some embodiments, the second rectifier 402 is also optionally coupled to two resistors in series (resistor 407 and resistor 408, which are coupled to the ground 437). Between these two resistors a voltage measurement can also be taken, which acts as another measurement component ("$V_{AUX\_DIV}$") 409-2. Such an arrangement of resistors is capable of stepping down the voltage, which allows for measuring components to have a lower voltage threshold to determine whether power is no longer being received. The resistance of these resistors can be varied depending on the acceptable voltage level of the DC measuring components. In some embodiments, these resistors are variable resistors and are adjusted by a control.

To help illustrate the benefits of a dual rectifier receiver, graph 400-B compares a single rectifier system to a dual rectifier system. The graph shows at time "$t_1$" that RF power (i.e. wireless power transmission signals) are received at the antenna 413. "$V_{OUT}$" shows the output of DC at the output of the first rectifier. "$V_{AUX}$" shows the measuring component 409-1, which shows the output of the second rectifier 402. And, "$V_{AUX\_DIV}$" shows a second measurement point 409-2 that has had its voltage stepped down by the two resistors, which can be used to activate a measuring component that has a lower voltage threshold.

At time "$t_2$", the first rectifier 401 and capacitor 404 produce a settled voltage that can be used by the charging components $Z_L$ 406. Also at time "$t_2$", the RF power is no longer being received at the antenna 413. At time "$t_3$", the smaller capacitance capacitor 405 is able to settle to a voltage level that indicates that there is no longer any RF power being received at the antenna 413. Once this lower voltage settles (e.g., at 0 volts), the system can notify the charging components $Z_L$ 406 that they should prepare for powering down. In contrast, it is not until time "$t_4$" that the larger capacitor 404 fully discharges and settles to the lower voltage indicating the system is no longer receiving RF power at the antenna 413. Warning (i.e., signaling) the charging components that RF power is no longer being received is beneficial so that those components can prepare for a shutdown in anticipation of a loss of power. Without the second rectifier 402, the charging components would have to rely solely on the first rectifier 401 and the larger capacitor 404 to prepare for shutdown, which as explained above is not ideal because the larger capacitor 404 takes a significant amount of time to fully discharge (i.e., an adequate warning cannot be given to the charging components when the larger capacitance capacitor 404 is solely relied upon).

In sum, FIG. 4E ultimately describes a receiver 120 that can apportion a small amount of its received wireless power for the purpose of improving reliability of the main components of the circuit (i.e., $Z_L$ 406 components) by warning these components that the RF power is no longer being received at the antenna 413.

Transitioning to FIG. 4F, FIG. 4F illustrates two simplified rectifiers that are optionally used in rectifiers 401 and 402 in FIG. 4E. These simplified rectifiers are similar to those shown in FIG. 4D, however, since the input of the first rectifier is couple to the input of the second rectifier, the second rectifier can be made simpler. Although FIG. 4F shows examples of some rectifiers, any possible diode connected configuration which has reverse bias cut-off characteristics can be used instead. With respect to the second rectifier 402, in some embodiments the second rectifier 402 is on the same or separate integrated circuit as the first rectifier (i.e., main rectifier) 401. The second rectifier (i.e., auxiliary rectifier) 402, in some embodiments, is a discrete system on a printed circuit board, package, and/or module.

Power Surge Protection

Figure 5A:
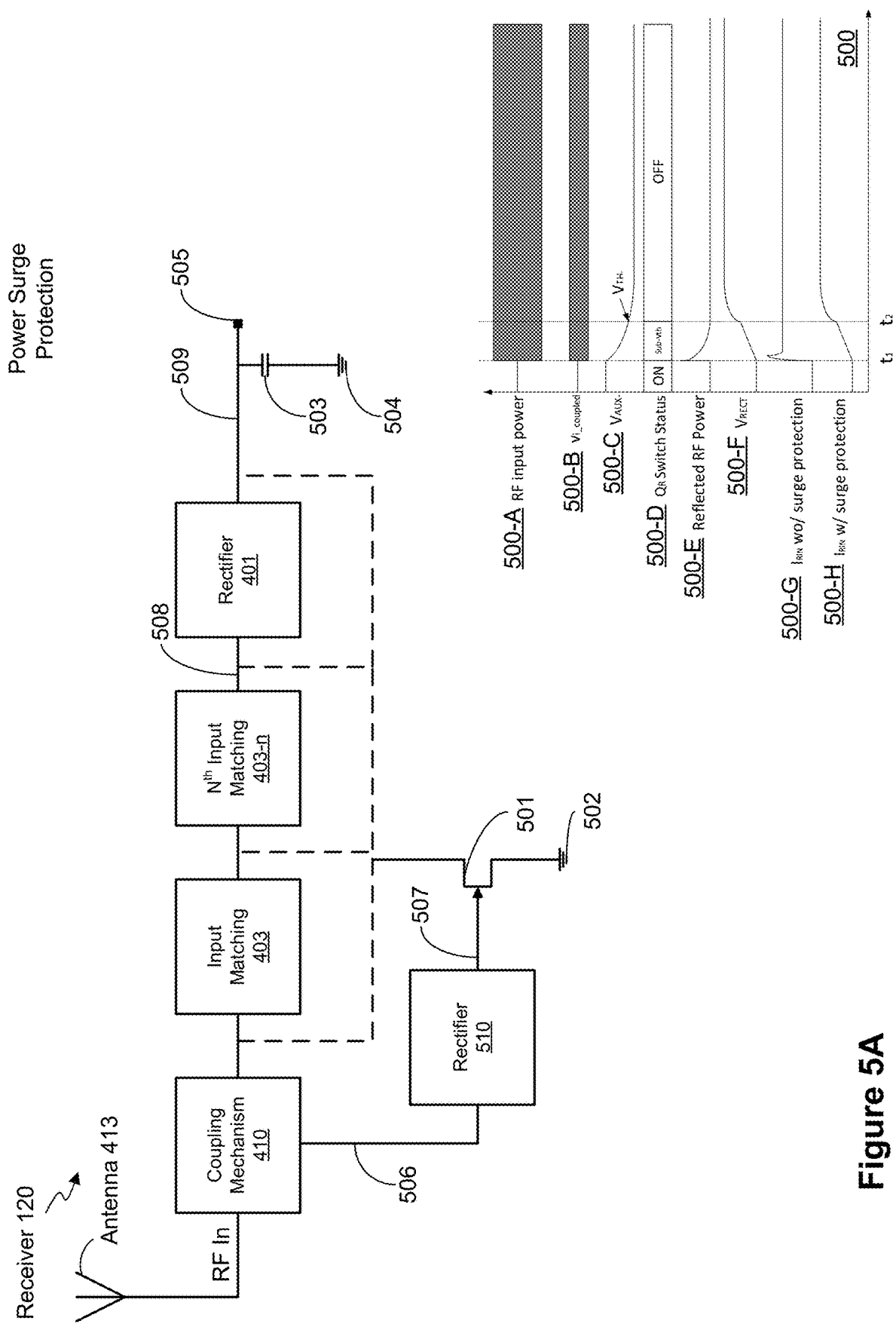
FIG. 5A depicts a circuit schematic illustrating a system for protecting sensitive electrical components from power surges, in accordance with some embodiments.

FIG. 5A is a schematic of a representative receiver 120 in accordance with some embodiments. The representative receiver 120 is an example of the receiver 120 (FIG. 3). The components in FIG. 5A are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

In FIG. 5A, the receiver 120 includes an antenna 413 capable of receiving wireless power transmission signals (also referred to as RF power). Once the wireless power transmission signals are received at the antenna 413 and converted to an alternating current, the alternating current is sent to an input of the coupling mechanism 410. Some examples of coupling mechanism 410 are illustrated in FIG. 4C. In some embodiments, the coupling mechanism 410 has two outputs (a first output that supplies the alternating current to the first rectifier, and a second output that supplies the alternating current to the second rectifier), and each output receives a portion of the alternating current received at the input of the coupling mechanism 410. In some embodiments, the coupling mechanism 410 is optionally configured to send all but −30 dB to −40 dB of the alternating current to the first output of the coupling mechanism 410, and sending the remaining −30 to −40 dB of the alternating current to the second output of the coupling mechanism 410.

A first output of the coupling mechanism 410 is coupled to an input of an input matching network 403, which is configured to match the impedance of the rectifier 401 with the impedance of the antenna 413. Additionally, it is possible to have multiple input matching networks, as illustrated by numeral 403-n. The matching network is designed to match the impedance between the source (e.g., the antenna) and the load (e.g., the rectifier). The output of the matching network(s) is coupled to the first (i.e., primary) rectifier 401. The output of the rectifier 401 is coupled to a capacitor 503. The capacitor 503, which is also coupled to the ground 504, is designed to reduce ripple in the system, and has a capacitance that matches the DC load of the output of the first rectifier 401. With larger loads, a larger capacitance is required to reduce the ripple, so as to not damage the charging components represented by numeral 505.

A second output of the coupling mechanism 410 is coupled to the second rectifier 510 (also referred to as an auxiliary or secondary rectifier). The second rectifier 510 (also referred to as the negative voltage generator) converts its received wireless power transmission signals into negative voltage. The output of the second rectifier 510 is coupled to a "normally on" active switch 501 that has a gate voltage of 0 volts when turned on (i.e., a switch that is in a normally closed state that couples the circuit to the ground 502, which causes an impedance mismatch between the rectifier 401 and the antenna 413, which in turn causes the wireless power transmission signals to be reflected by the antenna). The switch 501, when coupled to the ground 502, pulls the output of the rectifier 510 to 0 volts. In other words, when the voltage falls below 0 volts, the switch 501 will gradually begin to open, which causes some of the negative voltage to not be directed to the ground 502, but instead back to the first output of the coupling mechanism 410. Optionally, as depicted by FIG. 5A, the output of the rectifier 510 can be coupled either to the first output of the coupling mechanism 410, before or after the input matching network, between two or more matching networks, or before or after the first rectifier 401. When the switch 501 allows for some of the current to be directed to the ground 502, an impedance mismatch is created between the antenna and the first rectifier 401. Once the gate 501 is fully opened and the current with the negative voltage is no longer being directed to the ground, then the first rectifier 401 can match the impedance of the antenna 413, and the wireless power transmission signals will not be reflected by the antenna 413.

To illustrate the discussion above, graph 500 shows the gradual opening of the switch 501 stopping the rectifier 401 from receiving a power surge. As shown in the first top row 500-A of the graph 500, the RF input power (i.e., the wireless power transmission signals that are converted to an alternating current) is received at the antenna 413. The wireless power transmission signals are constant beginning at time "$t_1$." The second row 500-B, "Vi_coupled," illustrates the amount of wireless power transmission signals harvested by the antenna 413 (and converted to the alternating current), and subsequently apportioned by the coupling mechanism 410. Numeral 506 illustrates the point at which "Vi_coupled" is measured. "Vi_coupled" is constant at time "$t_1$," which corresponds to the amount of wireless power transmission signals being received at the antenna 413. However, only a portion of the power is received at "Vi_coupled" because of the coupling mechanism 410. Even at time "$t_2$", the amount of the alternating current measured at "Vi-Coupled" remains constant, due to the coupling mechanism's 410 apportionment. In some embodiments, the coupling mechanism 410 can dynamically adjust the amount of power that is sent to the negative voltage rectifier 510.

The third row 500-C of graph 500 illustrates the negative voltage measured at point 507 in the circuit illustrated in FIG. 5A. At time "$t_1$," which is the same time that the antenna 413 started to receive the alternating current, the rectifier 510 (e.g., a negative voltage generator) begins converting the alternating current to a negative voltage. The negative voltage slowly starts to increase in magnitude until time "$t_2$," which at that point the negative voltage has reached a negative voltage threshold.

The fourth row 500-D illustrates the $Q_R$ switch's (i.e., the switch 501) status. In other words, the fourth row 500-D shows that, depending on the negative voltage produced by the negative voltage generator 510, the switch 501 can exist in an on state ("ON"), a partially-on state that is below the negative voltage threshold ("Sub_Vth"), and a completely off state ("OFF"). At any time where the receiver does not receive any wireless power transmission signals, the switch 501 will be in the "ON" state, and will direct incoming current to the ground 502 causing an impedance mismatch at the rectifier 401. This impedance mismatch causes the wireless power transmission signals to be reflected at the antenna 413. At time "$t_1$", the alternating current starts to be received at the negative voltage generator 510, and then the negative voltage generator 510 starts producing negative voltage, as discussed above with reference to the row 500-C. Once the negative voltage starts being produced, the switch 501 begins to open, which gradually uncouples the circuit at that point from the ground 502. At time "$t_2$", the negative voltage threshold is met, and the switch 501 is completely open and no longer couples the ground 502 to the circuit. This consequently reduces the impedance mismatch between the first rectifier 401 and the antenna 413, and results in less reflection of the wireless power transmission signals.

The fifth row 500-E of graph 500 illustrates the amount of power that is either reflected or received at the antenna 413 due to the impedance mismatch caused by the switch either being coupled, partially coupled, or uncoupled with the ground 502. Specifically, at time "$t_1$", the amount of the wireless power transmission signals reflected is at its highest, meaning that all but the wireless transmission signals apportioned by the coupling mechanism 410 to be sent to the negative voltage generator 510 are reflected at the antenna 413, which is caused by the impedance mismatch between the antenna 413 and the first rectifier 401. As the switch 501 begins to open between times "$t_1$" and "$t_2$", the impedance mismatch begins to decrease, and as the mismatch begins to decrease, the wireless power transmission signals are reflected at a lesser rate. When the wireless power transmission signals are no longer reflected, they are directed to the first rectifier 401. After time "$t_2$", the voltage threshold of the switch 501 is met the amount of reflected wireless transmission signals is decreased to its lowest state.

The sixth row 500-F of graph 500 illustrates the amount of wireless power transmission signals converted to direct current ("$V_{RECT}$") by the first rectifier 401. The measuring point of "$V_{RECT}$" occurs at point 509. At time "$t_1$", the rectifier 401 rectifies a portion of the alternating current received at the antenna 413 corresponding to the impedance mismatch caused the state of the switch 501. Additionally, at time "$t_1$", the switch 501 is still primarily coupled to the ground 502, and consequently, the impedance mismatch is still high, meaning that the wireless power transmission signals are reflected by the antenna 413. Since the majority of the wireless power signals are being reflected, the rectifier 401 is not capable of producing a large amount of rectified power. At time "$t_2$", when the switch 501 is no longer coupled to the ground 502, the impedance mismatch between the rectifier 401 and the antenna 413 is eliminated, thereby allowing the rectifier 401 to receive the alternating current from the antenna 413.

The seventh row 500-G of graph 500 illustrates measuring point 508 in FIG. 5A. Specifically, row 500-G illustrates what current would be received at the input of the rectifier 401 without the negative voltage generator 510 and switch 501 (i.e. the surge protector components). In the graph 500, the current that is received at the input of the rectifier 401 is referred to as "$I_{RIN}$ without surge protection." As shown in row 500-G, after time "$t_1$" a large current spike is shown, which can cause damage to the first rectifier 401, and other related charging components. After the current spike, the current plateaus and no longer has any large variations in magnitude.

The eighth row 500-H of graph 500 illustrates detected current at measuring point 508 in FIG. 5A. Specifically, row 500-G shows the measurement of the current that is received at the input of the rectifier 401, when the negative voltage generator 510 and switch 501 (i.e. the surge protector components coupled to the circuit) stop surges in power. This is shown to contrast row 500-G, which shows the current that would be flowing to the rectifier 401 if there was no surge protection. In the graph, the current with surge protection is referred to as "$I_{RIN}$ with surge protection." As shown in 500-H, after time "$t_1$" a gradual increase in current is shown, instead of a large spike as shown in 500-G, that reduces damage to the first rectifier 401 and other related components. After the switch 501 is fully opened the current plateaus and no longer has any large variations in its magnitude.

Figure 5B:
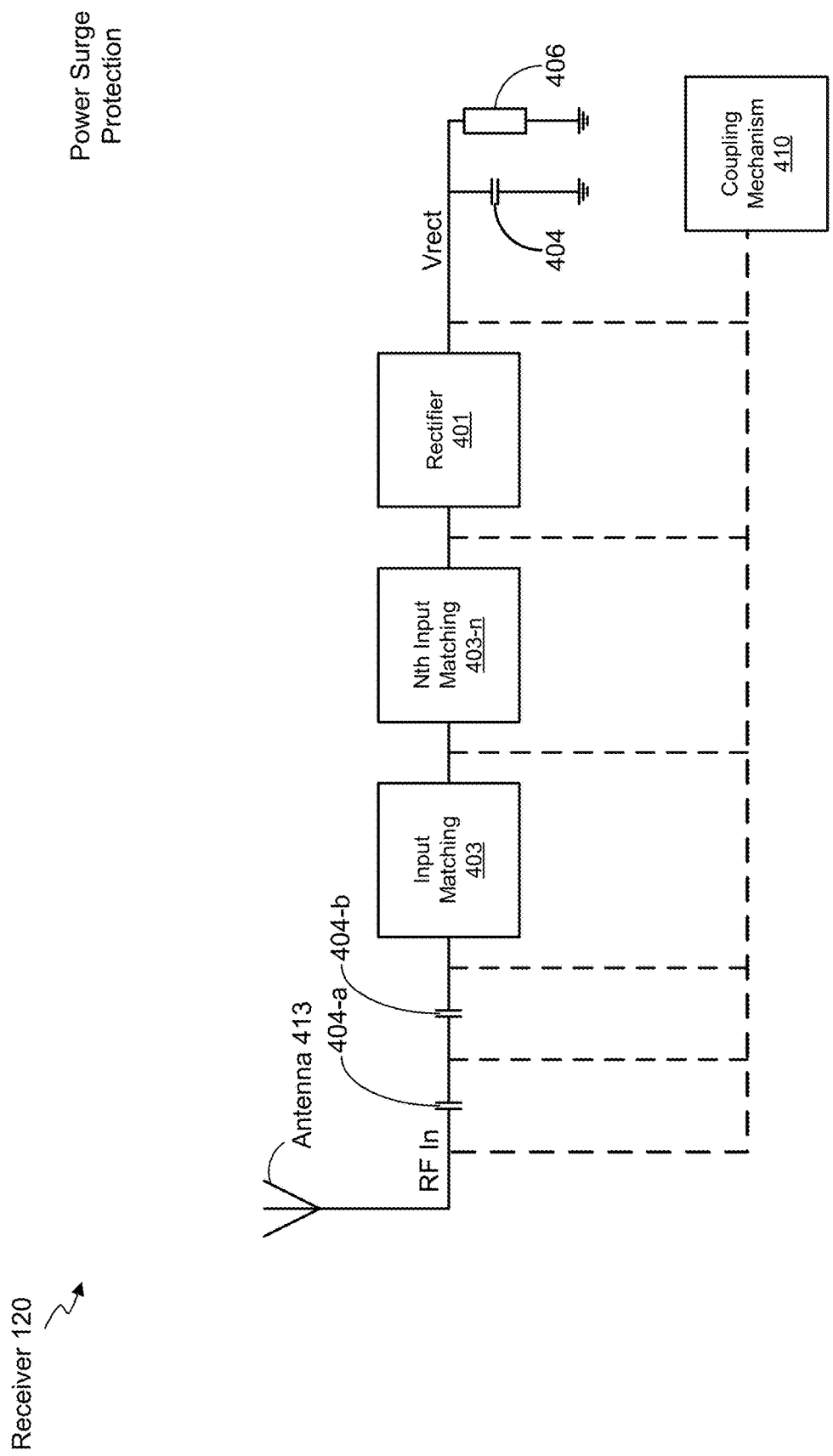
FIG. 5B depicts a circuit schematic illustrating points at which a coupling mechanism may be added to the circuit, in accordance with some embodiments.

FIG. 5B is a schematic that illustrates alternative embodiments to those presented in FIG. 5A. Namely, FIG. 5B shows alternative locations at which the coupling mechanism 410 can be coupled to the circuit, and still perform the same surge protection as discussed in detail with respect to FIG. 5A. While some example features are illustrated, various other features, which were shown in FIG. 5A, have not been illustrated in FIG. 5B for the sake of brevity and so as not to obscure pertinent aspects of the example implementations disclosed herein.

The differences between FIG. 5A and FIG. 5B include the addition of first capacitor 404-$a$ and second capacitor 404-$b$, and at least a second matching network identified as $N^{th}$ input matching network 403-$n$. Additionally, six vertical dotted lines represent the different locations that the coupling mechanism 410 can be coupled to the circuit. As shown, the coupling mechanism 410 can be coupled to the circuit at a point before a first capacitor 404-$a$. Alternatively, the coupling mechanism 410 may be coupled after the first capacitor 404-$a$, but before the second capacitor 404-$b$. The next location at which the coupling mechanism 410 can be coupled to the circuit is at the same location as the one shown in FIG. 5A. The coupling mechanism 410 can be coupled to the circuit between any of the input matching networks. This is illustrated by the coupling mechanism 410 being placed after the input matching network 403, but before the coupling mechanism 410 being placed before the $N^{th}$ input matching network 403-$n$. In this example, the $N^{th}$ input matching network 403-$n$ represents the last input matching network. The coupling mechanism 410 can also be placed after the last input matching network in the series of input matching networks, but before the first rectifier 401. Finally, the coupling mechanism 410 may also be placed after the rectifier 401, but before the capacitor 404 and $Z_L$ 406, which represent the charging components that the receiver is coupled to.

In-Band Communication

Figure 6A:
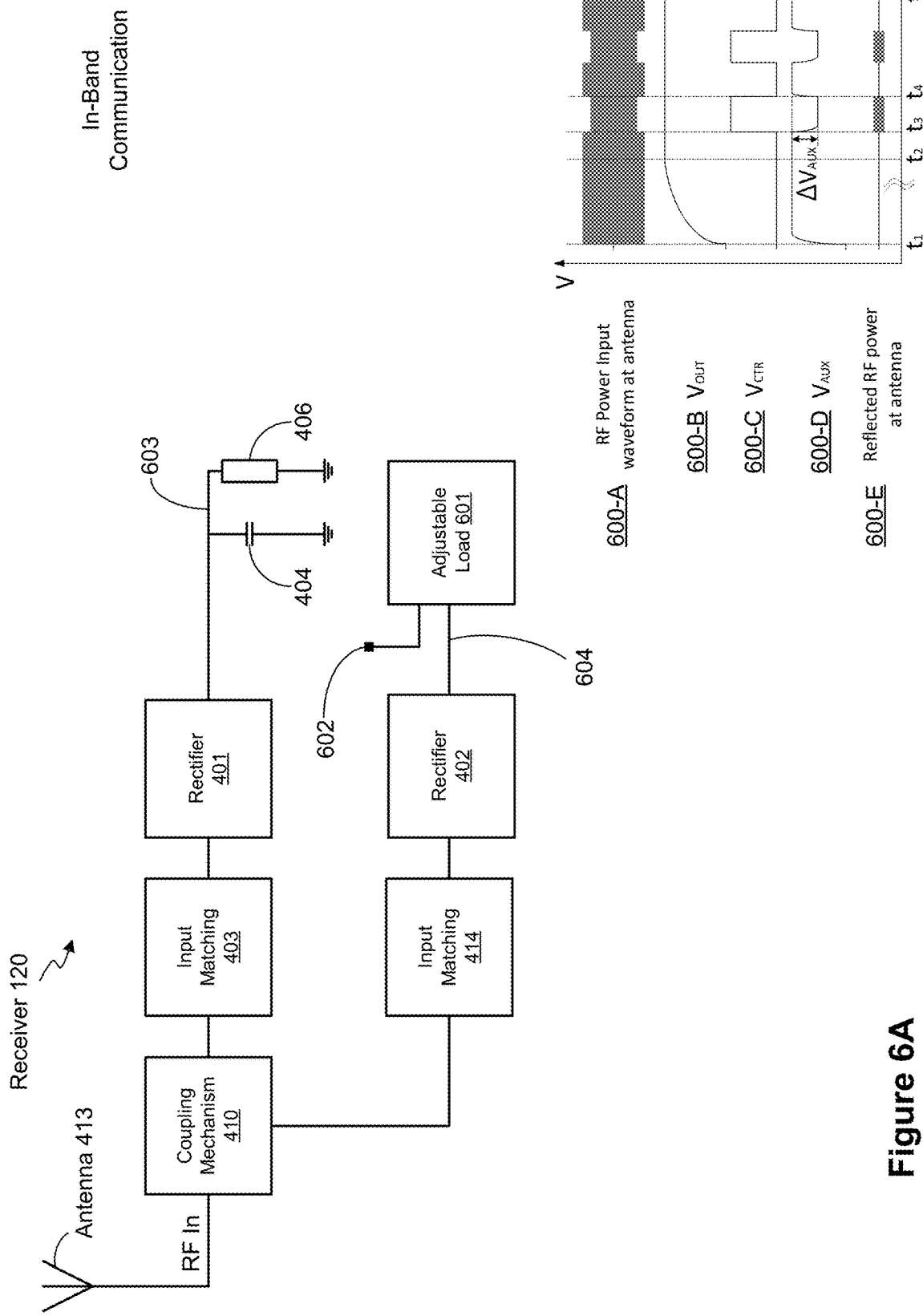
FIG. 6A depicts a circuit schematic illustrating a receiver capable of communicating with a transmitter, in accordance with some embodiments.

Transitioning to FIG. 6A, FIG. 6A illustrates a way for in-band communication between a wireless power receiver 120 and a wireless power transmitter 102 without a dedicated communication radio for controlling the power of the wireless power transmission signals. The components in FIG. 6A are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

FIG. 6A's schematic illustrates one embodiment of a receiver 120. Receiver 120 includes an antenna 413 capable of receiving wireless power transmission signals. Once the wireless power transmission signals are received at the antenna 413 and converted to an alternating current, the wireless power transmission signals are sent to an input of the coupling mechanism 410. Some examples of coupling mechanism 410 are illustrated in FIG. 4C. The coupling mechanism 410 has two outputs (a first output that supplies alternating current to the first rectifier 401, and a second output that supplies alternating current to the second rectifier 402), and each output receives a portion of the alternating current received at the input of the coupling mechanism 410. In some embodiments, the coupling mechanism 410 is optionally configured to send all but −30 dB to −40 dB of the alternating current to the first output of the coupling mechanism 410, and sending the remaining −30 to −40 dB of the alternating current to the second output of the coupling mechanism 410.

A first output of the coupling mechanism 410 is coupled to an input of an input matching network 403, which is configured to match the impedance of the rectifier 402 with the impedance of the antenna 413. Additionally, it is possible to have multiple input matching networks, as illustrated by 403-$n$ in FIG. 6B. The matching network is designed to match the impedance between the source (e.g., the antenna 4123) and the load (e.g., the rectifier 401). The output of the matching network(s) is (are) coupled to the first (i.e., primary) rectifier 401. The output of the first rectifier 401 is coupled in parallel to the both a capacitor 404 and $Z_L$ 406, which represent the charging components that the receiver is coupled to. The capacitor 404, which is also coupled to the ground, is designed to reduce ripple of the direct current output by the first rectifier 401 in the system, and has a capacitance that matches the direct-current load of the output of the first rectifier 401. With larger loads (i.e., the rectifier output), a larger capacitance is required, and when there is a larger capacitance, the capacitor takes a longer time to charge and discharge (i.e., for voltage to reach a steady state), which slows the response time of detecting whether power is no longer or is being received at the antenna 413.

A second output of the coupling mechanism 410 is coupled to another input matching network 414. A second rectifier 402 (also referred to as an auxiliary or secondary rectifier) is coupled to the output of the other (also referred to as the auxiliary input matching network) input matching network 414. The second rectifier 402 converts the apportioned alternating current received from the coupling mechanism 410 to direct current with a voltage component. The second rectifier 402 is coupled to an adjustable load 601 that can cause a slight impedance mismatch of the other matching network 414. This ultimately causes a portion of wireless transmission signals to be reflected by the antenna 413 back to the transmitter 102. The adjustable load 601 is coupled to a toggle 602, and when the toggle 602 is toggled, it causes the adjustable load 601 to be toggled between two different impedances. The purpose of such an adjustable load 601 is to modulate the amount of power reflected by the receiver 120 in order to communicate with the transmitter 102.

As previously discussed, input matching quality of an RF system determines the amount of power reflected from the antenna 413. In a perfectly matched system there is no reflected power. However, when there is an impedance mismatch, some of the wireless power transmission signals are reflected from the antenna 413. Reflected wireless power transmission signals can be detected with a RF signal receiving circuitry at the transmitter 102. These reflected signals can be used by the transmitter 102 to determine how much power to send to the receiver 120, or when to stop transmitting power to the receiver 120 (e.g., the battery is sufficiently charged and no longer needs to receive power). To communicate with the transmitter 102, the receiver 120 needs to modulate the impedance (i.e., so that the reflected signals convey information). This process will be further discussed in relation to the graph 600 in FIG. 6A.

FIG. 6A's graph 600 demonstrates how the receiver 120 is able to communicate with the transmitter 102 by modulating its impedance at the auxiliary matching network. FIG. 6A includes a first row 600-A illustrating the amount of RF power (also referred to as wireless power transmission signals) that the antenna 413 is receiving. Between time "$t_1$" and "$t_3$", there is no impedance mismatch, and the full amount of wireless power transmission signals is received by the antenna 413 (e.g., no signals are reflected at the antenna 413). However, at time "$t_3$" to "$t_4$", an impedance mismatch is introduced into the system, which results in the amount of RF power received by the antenna 413 to decrease (i.e., some signals are reflected at the antenna 413). As shown at times "$t_4$" and "$t_5$", the toggle 602 (also referred to as "$V_{CTR}$"), is switched on and off causing the reflection of wireless power transmission signals to be modulated from no reflection to partial reflection. Various aspects of the "$V_{CTR}$" such as frequency, duty cycle, pulse width and patterns can be used as a form of signal generation (e.g., modulation). This modulation can be used to communicate with the transmitter 102 by interpreting certain modulations as instructions regarding, e.g., how much power the transmitter 102 should be sending to the receiver 120. In some embodiments, as illustrated in row 600-A, the modulation received between times "$t_4$" to "$t_5$" causes the transmitter 102 to stop transmitting wireless transmission signals. As a result, after time "t5" the antenna 413 no longer receives wireless power transmission signals from the transmitter 102. In some embodiments, the transmitter 102 includes a demodulator that allows the transmitter 102 to demodulate and process the modulated signals generated by the receiver 120. The modulated signals can provide other information in addition to a power requirement for the receiver 120. For example, the modulated signals indicate a location of the receiver 120 relative to the transmitter 102. In another example, the modulated signals may be associated with an authorization key for the receiver 120 (i.e., once the transmitter 102 receives and processes the authorization key, the transmitter 102 initiates wireless charging of the receiver 120). Various other forms of information may conveyed using the modulated signals discussed herein.

In FIG. 6A's graph 600, the second row 600-B shows the voltage that rectifier 401 is outputting. This measurement point is taken after the capacitor 404, and is represented by numeral 603 in the circuit schematic in FIG. 6A. Between times "$t_1$" and "$t_2$", the capacitor 404 is charging up, and only once fully charged does the voltage plateau and remain at a constant magnitude. Between times "$t_3$" and "$t_4$", the impedance is adjusted. This impedance adjustment, however, is made only in relation to the other input matching network 414, which means that the alternating current sent to the first rectifier 401 by the coupling mechanism 410 remains the same. Therefore, between times "$t_3$" and "$t_5$", the rectifier 401 is able to output the same amount of rectified power despite toggle 602 toggling the impedance of the other input matching network 414.

In FIG. 6A's graph 600, the third row 600-C shows the toggle 602 (also referred to as the ("$V_{CTR}$")) toggling the load impedance of the input matching network 414. From times "$t_1$" to "$t_3$", the toggle 602 is in a first state causing a certain load impedance. In some embodiments, there is no load impedance between the antenna 413 and the other input matching network 414, and none of the wireless power transmission signals are reflected by the antenna 413. Between times "$t_3$" and "$t_4$", the toggle 602 is in a second state that causes a certain load impedence. The load impedance generated by the toggle 602 being toggled results in a mismatch with the antenna's 413 impedance, which causes a portion of the wireless power transmission signals to be reflected back to the transmitter 102. This reflected portion of the wireless power transmission signals is normally not reflected by the antenna 413 (e.g., when the toggle is in the first state).

In FIG. 6A's graph 600, the fourth row 600-D shows the output voltage by the second rectifier 402 in response to the toggling of the load impedance of the input matching network 414. The point at which the output voltage of the second rectifier 402 is demonstrated by numeral 604 in FIG. 6A's circuit schematic. Between times "$t_1$" and "$t_3$", the toggle 602 is in the first state (i.e., no impedance mismatch with antenna 413) while between times "$t_3$" to "$t_4$", the toggle 602 is in the second state. Again, when the toggle 602 is in the second state, the impedance mismatch is greater at the other input matching network 414, and when the impedance mismatch is greater, a greater percentage of the wireless power transmission signals are reflected by the antenna 413.

In FIG. 6A's graph 600, the fifth row 600-E shows the amount of wireless power transmission signals that are reflected by antenna 413 when the toggle 602 is in the second state. In some embodiments, when the toggle 602 is in the first state (discussed above), the toggle 602 causes the adjustable load 601 to be adjusted and cause a perfect impedance match between the other input matching network 414 and the antenna 413, which is illustrated by times "$t_1$" to "$t_3$" and portions of "$t_4$" to "$t_5$." At these times, an amount of wireless power transmission signals reflected by the antenna 413 is minimal (if any). At times "$t_3$" to "$t_4$" and portions of time "$t_4$" to "$t_5$," however, the toggle 602 is in the second state, which causes the adjustable load 601 to be adjusted, which ultimately causes an impedance mismatch between the antenna 413 and the other input matching network 414. When there is an impedance mismatch, at least some of the wireless transmission signals are reflected by the antenna 413, which is shown at times "$t_3$" to "$t_4$" and portions of time "$t_4$" to "$t_5$." Although two states of modulation are discussed, it is possible to modulate the toggles frequency, duty cycle, pulse, width, and patterns.

Figure 6B:
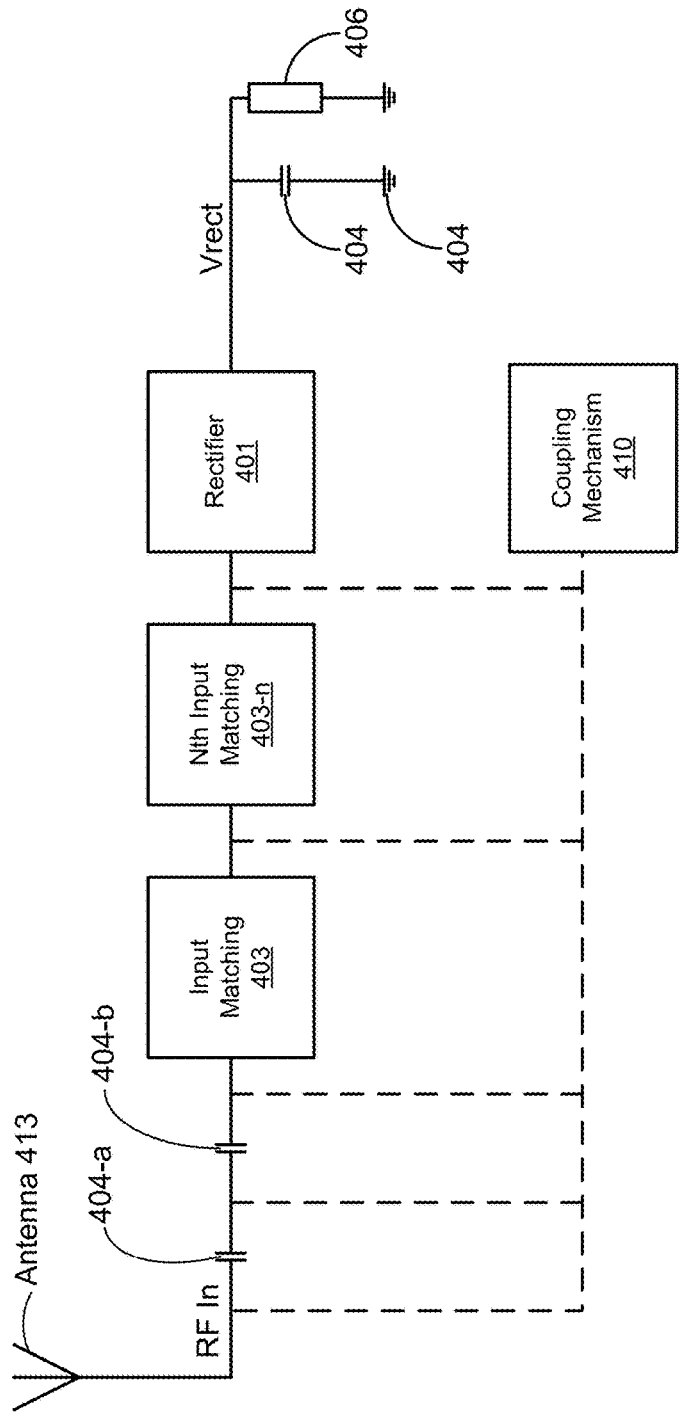
FIG. 6B depicts a circuit schematic illustrating points at which a coupling mechanism may be added to the circuit, in accordance with some embodiments.

FIG. 6B is a schematic that illustrates alternative embodiments to those presented in FIG. 6A. Namely, FIG. 6B shows alternative locations at which the coupling mechanism 410 can be coupled to the circuit and still perform the same in-band communication techniques discussed in detail with respect to FIG. 6A. While some example features are illustrated, various other features, which were shown in FIG. 6A, have not been illustrated in FIG. 6B for the sake of brevity and so as not to obscure pertinent aspects of the example implementations disclosed herein.

The differences between FIG. 6A and FIG. 6B include the addition of first capacitor 404-a and second capacitor 404-b, and at least a second matching network that is coupled to the first rectifier 401, which is identified as $N^{th}$ input matching network 403-n. Additionally, five vertical dotted lines represent different locations that the coupling mechanism 410 can be coupled to the circuit. As shown, the coupling mechanism 410 can be coupled to the circuit at a point before a first capacitor 404-a. Alternatively, the coupling mechanism 410 may be coupled after the first capacitor 404-a, but before the second capacitor 404-b. The next location at which the coupling mechanism 410 can be coupled to the circuit of receiver 120 is at the same location as the one shown in FIG. 6A. The coupling mechanism 410 can be coupled to the circuit between any of the input matching networks. This is illustrated by the coupling mechanism 410 being placed after the input matching network 403, but before the coupling mechanism 410 being placed before the $N^{th}$ input matching network 403-n. In this example, the $N^{th}$ input matching network 403-n represents the last input matching network. Finally, the coupling mechanism 410 can be placed after the last input matching network in the series of input matching networks, but before the first rectifier 401.

Figure 6C:
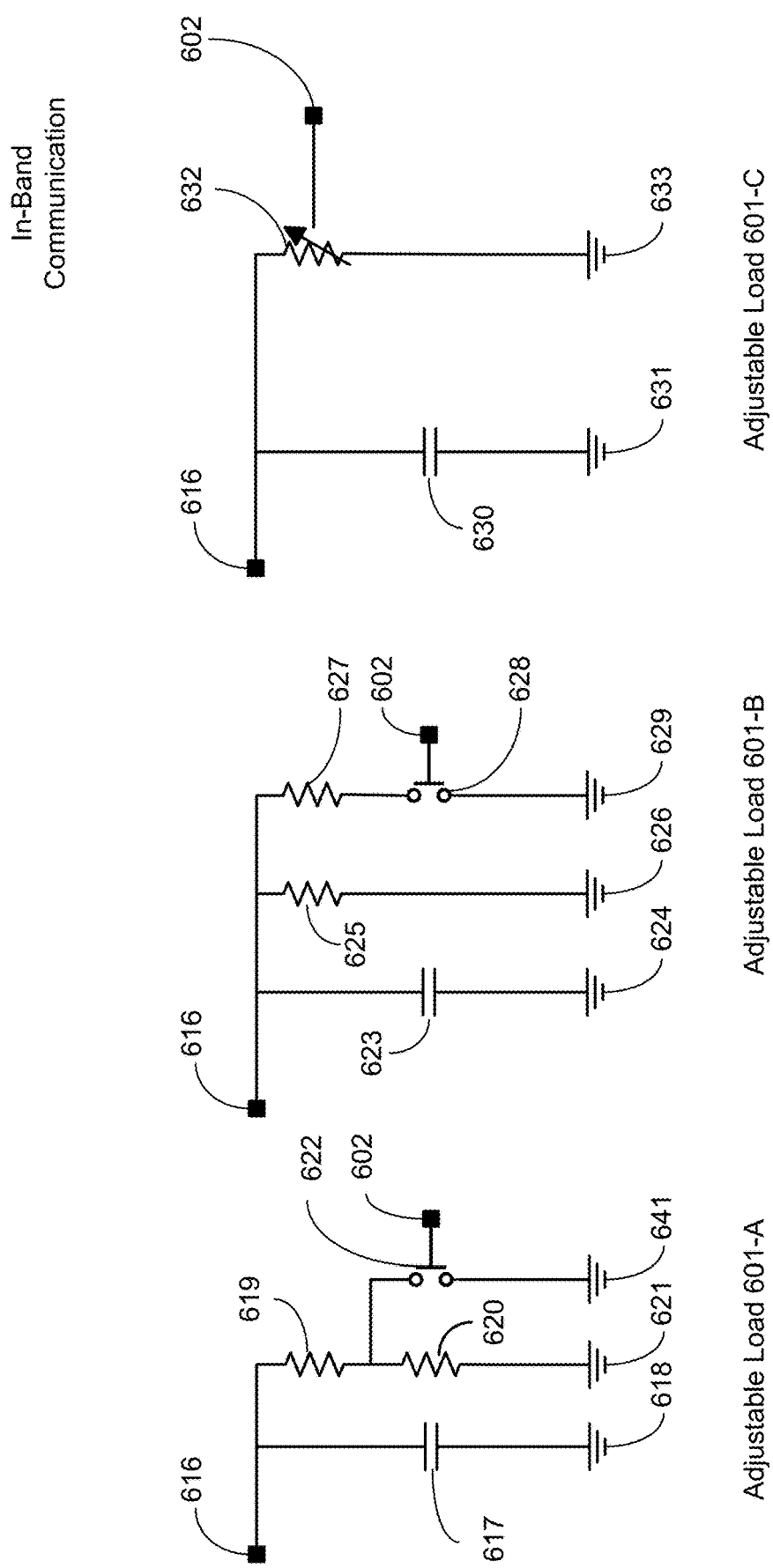
FIG. 6C illustrates is a circuit schematic illustrating exemplary components for adjusting the load of a rectifier to cause an impedance mismatch, in accordance with some embodiments.

Finally, FIG. 6C illustrates three separate embodiments for adjusting the load of the adjustable load 601, two of which are digital adjustable loads, and one of which that is an analog adjustable load. In some embodiments, a single bit digital control can be used. In some other embodiments, multiple bits can be utilized to increase the resolution/range of the signals that are being generated by the circuit (as shown in in the circuit schematic of FIG. 6A). Although three embodiments are shown, any equivalent means for adjusting the load can also be used instead. In some embodiments, the adjustable load is a tapped switch with a series of resistors, which is shown in the adjustable load 601-A. Looking at adjustable load 601-A, it includes an input point 616, which corresponds to the input of the adjustable load where the adjustable load 601-A receives rectified power from the second rectifier 402, as shown in FIG. 6A's circuit schematic. The input point 616 is coupled in parallel to the input of a capacitor 617 and an input of a resistor 619. The output of the capacitor 617 is coupled to the ground 618. The output of the resistor 619 is coupled in parallel to the input of a resistor 620 and the input to a switch 622. The output of the resistor 620 is coupled to the ground 621. The switch 622 switches when the toggle 602 toggles between its two states (e.g., connected to the ground, or unconnected from the ground), as discussed in detail in FIG. 6A. When the toggle 602 causes the switch 622 to connect to the ground 641, the impedance is subsequently changed, which can cause an impedance mismatch between the other input matching network 414 and the antenna 413, as shown in FIG. 6A.

In some embodiments, the adjustable load is a series switch with parallel resistors, which is shown in the adjustable load 601-B. This adjustable load in this example is a digital adjustable load. In some embodiments, a single bit digital control can be used. In some other embodiments, multiple bits can be utilized to increase the resolution/range of the signals that are being generated by the circuit (as shown in in the circuit schematic of FIG. 6A). Looking at adjustable load 601-B, it includes an input point 616, which corresponds to the input of the adjustable load where the adjustable load 601-B receives rectified power from the second rectifier 402, as shown in FIG. 6A's circuit schematic. The input point 616 is coupled in parallel with the input of a capacitor 623, the input of resistor 625, and the input of a resistor 627. The output of the capacitor 623 is coupled to the ground 624. The output of the resistor 625 is coupled to the ground 626. The output of the resistor 627 is coupled to a switch 628. The switch 628 switches when the toggle 602 toggles between its two states (e.g., connected to the ground 629, or unconnected from the ground 629), as discussed in detail in FIG. 6A. When the toggle 602 causes the switch 628 to connect to the ground 629, the impedance is subsequently changed. This causes an impedance mismatch between the other input matching network 414 and the antenna 413, as shown in FIG. 6A.

In some embodiments, the adjustable load is an analog control and load that allows for increased resolution/range of control of the load impedance, which is shown in the adjustable load 601-C schematic. Looking at adjustable load 601-C, it includes an input point 616, which corresponds to the input of the adjustable load where the adjustable load 601-C receives rectified power from the second rectifier 402, as shown in FIG. 6A's circuit schematic. The input point 616 is coupled in parallel to the input of a capacitor 630, the input of resistor of a variable resistor 632, and the input of a resistor 627. The output of the capacitor 623 is coupled to the ground 624. The output of the resistor 625 is coupled to the ground 626. The output of the resistor 627 is coupled to a switch 628. The switch 628 switches when the toggle 602 toggles between its two states (e.g., connected to the ground, or unconnected from the ground), as discussed in detail in FIG. 6A, and the ground 629. When the toggle 602 causes the switch 628 to connect to the ground 629, the impedance is subsequently changed, which can cause an impedance mismatch between the other input matching network 414 and the antenna 413, as shown in FIG. 6A.

Figure 7:
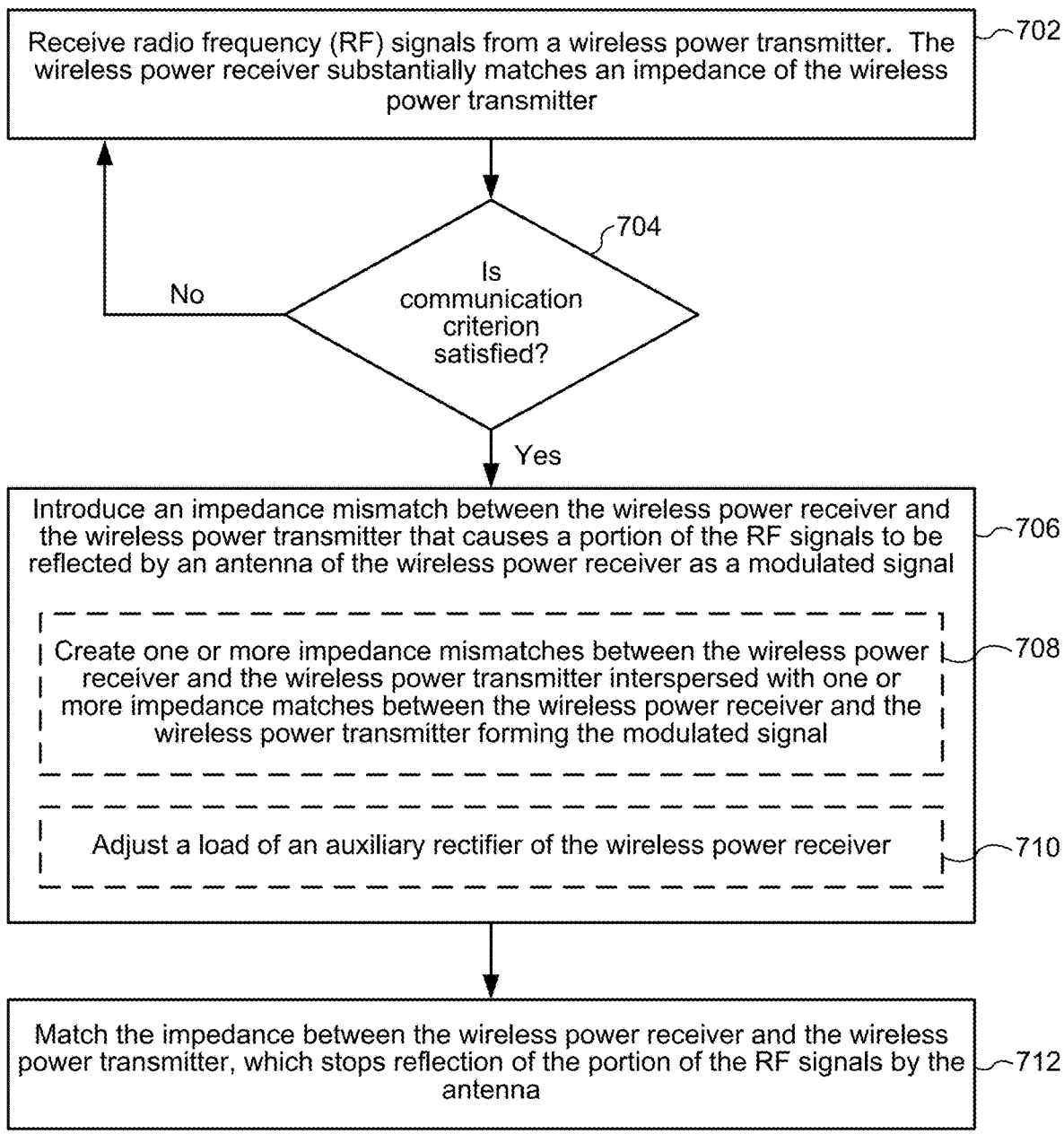
FIG. 7 is a flow diagram showing a process of a receiver communicating with a transmitter, in accordance with some embodiments.

FIG. 7 shows a method flowchart 700 that describes a process of communication between a wireless power receiver (e.g., receiver 120 in FIG. 6A) and a wireless power transmitter (e.g., transmitter 102). In FIG. 6A, the receiver 120 includes a rectifier 402 (sometimes called a secondary rectifier or an auxiliary rectifier) that is not used to directly power the main system (e.g., the components that allow the wireless power receiver to use the received energy). One or more operations of the method 700 may be performed by the wireless power receiver or by one or more components thereof (e.g., those described above with reference to FIG. 3). FIG. 7 corresponds to instructions stored in a computer memory or computer-readable storage medium (e.g., memory 142 of the receiver 120, FIG. 3).

In some embodiments, the method flowchart 700 includes receiving (702), by an antenna (e.g., antenna 413, FIG. 6A) of the wireless power receiver, radio frequency (RF) signals from the wireless power transmitter. During the receiving (702) (at least initially), the wireless power receiver substantially matches an impedance of the wireless power transmitter.

Moreover, while receiving the RF signals, the method 700 further includes determining (704) whether a communication criterion is satisfied. In some embodiments, the communication criterion is satisfied when an electronic device serviced by the wireless power receiver is fully charged. Alternatively or in addition, in some embodiments, the communication criterion is satisfied when there is no obstruction (or less than a predetermined level of obstruction) between the wireless power receiver and the wireless power transmitter, and the communication criteria is not satisfied when there is an obstruction (or more than a predetermined level of obstruction). In some instances, obstructions may include one or more of humans, pets, or other items that interfere with the wireless transmission of power, or cause harm to living things.

In some embodiments, in accordance with a determination that the communication criterion is not satisfied (704-No), the method 700 remains unchanged. In other words, the wireless power receiver continues to receive the RF signals from the wireless power transmitter.

In some embodiments, in accordance with a determination that the communication criterion is satisfied (704-Yes), the method 700 includes introducing (706) an impedance mismatch between the wireless power receiver and the wireless power transmitter that causes a portion of the RF signals to be reflected by the receiver's antenna as a modulated signal. In some instances, the wireless power transmitter receives and interprets the modulated signal without using a separate communication radio (e.g., a Bluetooth radio is not needed to interpret the modulated signal). Rather, the wireless power transmitter is able to receive and interpret the modulated signal using the same antenna(s) that transmitted the RF signals in the first place. In some embodiments, the portion can be capped at a certain threshold to stop the receiver from reflecting too much power back to the transmitter.

In some embodiments, introducing (706) the impedance mismatch includes creating (708) one or more impedance mismatches between the wireless power receiver and the wireless power transmitter interspersed with one or more impedance matches between the wireless power receiver and the wireless power transmitter forming the modulated signal. Interspersing impedance matches and mismatches to form a modulated signal is discussed in further detail above with reference to FIGS. 6A-6C.

In some embodiments, the wireless power receiver includes an auxiliary rectifier, coupled to the antenna, that receives some of the RF signals. In such embodiments, introducing (706) the impedance mismatch between the wireless power receiver and the wireless power transmitter includes adjusting a load of the auxiliary rectifier. The auxiliary rectifier may be a rectifier that is composed of: (i) an input configured to receive the second portion of the alternating current, (ii) a first diode, and (iii) a second diode, and the input of the secondary rectifier is coupled to: a cathode of a first diode, wherein an anode of the first diode is coupled to a ground; and an anode of a second diode, wherein a cathode of the second diode is coupled to an output of the secondary rectifier. Alternatively, the auxiliary rectifier may be a rectifier that is composed of: (i) an input configured to receive the second portion of the alternating current, (ii) a first diode-connected transistor, and (iii) a second diode-connected transistor, and the input of the secondary rectifier is coupled to: (a) a first diode-connected transistor, wherein the first diode-connected transistor is connected to a ground, and (b) a second diode-connected transistor, wherein the second diode-connected transistor is connected to an output of the secondary rectifier.

In some embodiments, the wireless power receiver includes an auxiliary matching network coupled to and positioned between the antenna and the auxiliary rectifier. Furthermore, adjusting the load of the auxiliary rectifier can cause a mismatch of the auxiliary matching network, which results the portion of the RF signals being reflected by the antenna. Moreover, the wireless power receiver may also include a toggle coupled to a load-adjusting mechanism (e.g., a portion of the circuit may be connected by a switch when then toggle is in one state, and disconnected when the toggle is in another state, which can change the impedance of the circuit, see also FIG. 6C illustrating three different types of mechanisms for adjusting the load), and the load-adjusting mechanism is coupled to the auxiliary rectifier (e.g., the adjustable loads components shown in FIG. 6C). Furthermore, toggling the switch (e.g., switch 602 as shown in FIG. 6C) causes a change within the load-adjusting mechanism that produces a change in the load of the receiver, which results in the impedance mismatch between the wireless power receiver and the wireless power transmitter. In some embodiments, adjusting the load of the auxiliary rectifier is done by coupling an output of the auxiliary rectifier to a load adjusting mechanism, in parallel, to (i) a capacitor, which is coupled to a ground, and (ii) a first resistor, where the first resistor is coupled, in parallel, to a second resistor in series, which is coupled to a ground, and a tapped switch coupled to the output of the first resistor in series, and a ground. The tapped switch is coupled to a toggle for opening and closing the tapped switch. In some embodiments, the load adjusting mechanism comprises (i) a capacitor, which is coupled to a ground, (ii) a first resistor, and (iii) a second resistor, where the second resistor is coupled to a series switch, which is coupled to a ground. The series switch is coupled to a toggle for opening and closing the series switch. In some embodiments, adjusting the load of the auxiliary rectifier is done by coupling the output of the auxiliary rectifier, in parallel, to (i) a capacitor, which is coupled to a ground, (ii) a variable resistor, which is coupled to a ground. The variable resistor is coupled to a toggle for adjusting the resistance of the variable resistor.

In some embodiments, in response to the wireless power receiver sending the modulated signal, the wireless power transmitter may interpret the modulated signal as an instruction to cease sending the RF signals to the wireless power receiver. In some other embodiments, in response to the wireless power receiver sending the modulated signal, the wireless power transmitter may interpret the modulated signal as an instruction to adjust transmission characteristics of the RF signals to the wireless power receiver (e.g., increase or decrease a power of the RF signals, among other adjustments). In some embodiments, the adjustment is dynamic and depends on the capabilities of the transmitter to handle reflected signals.

In some embodiments, after introducing the impedance mismatch and while continuing to receive the RF signals from the wireless power transmitter, the method further includes matching (710) the impedance between the wireless power receiver and the wireless power transmitter, which stops reflection of the portion of the RF signals by the antenna. In some embodiments, the wireless power transmitter ceases to transmit the RF signals to the wireless power receiver in response to receiving the modulated signal from the wireless power receiver. In some embodiments, in response to the wireless power receiver sending the modulated signal, the transmitter determines that a threshold amount of the reflected signal indicates that the receiver no longer requires RF signals, and as a result the wireless power transmitter stops transmitting RF signals to the wireless power receiver. In some embodiments, when a certain percentage is reflected back from the wireless power receiver, but does not exceed a threshold to stop sending power, the wireless power transmitter can adjust the amount of RF signals it is sending to the wireless power receiver.

In light of the principles discussed above, the following embodiments relate to converting energy from the received RF signals into an alternating current.

In some embodiments, a wireless power receiver is provided that comprises: a wireless-power-receiving antenna configured to receive radio frequency (RF) power signals, and convert energy from the received RF signals into an alternating current. In some embodiments, the coupler can be coupled to an output of a first capacitor, and the capacitors input is coupled to the antenna. In some embodiments, the coupler can be coupled to the output of a series of capacitors that are coupled to the antenna. In some embodiments, the coupler can be coupled to the output of the primary rectifier. In some embodiments, the coupler can be coupled after a series of capacitors. In such an embodiment, the capacitors are used to isolate the coupling point. In some embodiments, the coupler can be coupled to the output of a matching network, or the output of a series of matching networks. In some embodiments, a wireless power receiver comprises a primary rectifier configured to: (i) receive a first portion of the alternating current, and (ii) rectify the first portion of the alternating current into primary direct current having a first voltage and a first power level, the primary direct current used to provide power or charge to an electronic device. In some embodiments, the primary rectifier is coupled to a capacitor to reduce ripple (e.g., remove the variations in direct current). In some embodiments the RF coupler is not used, and the antenna is directly coupled (e.g., a diode) to the primary rectifier and the secondary rectifier. In such an embodiment, an input matching network may be placed between the antenna and the diode. In some embodiments, a wireless power receiver comprises a secondary rectifier configured to: (i) receive a second portion of the alternating current, and (ii) rectify the second portion of the alternating current into a secondary direct current having a second voltage and a second power level. In some embodiments, the direct current flows to a capacitor, and then flows to the ground. In some embodiments, the second power level of the secondary direct current is less than the first power level of the primary direct current. In some embodiments, the magnitude of the secondary direct current is a small amount of the received RF signals, either represented by a decibel value or a percentage of the incoming RF signals. For example, the power (i.e., voltage, or current) sent to the secondary rectifier can be −30 dB to −40 dB, or roughly less than 1% of the RF signals.

In some embodiments, the wireless power receiver's second voltage of the secondary direct current indicates whether the antenna is receiving RF signals from a wireless-power-transmitting device. In some embodiments, the magnitude of the secondary direct current can indicate that the secondary direct current is a minimum current necessary to indicate that the antenna is receiving the RF signals from the wireless-power-transmitting device, where the magnitude corresponds to a value of approximately −30 dB to −40 dB, or roughly 1% of the alternating current, or a voltage level of 1 volt to 40 volts. In some embodiments, the magnitude of the secondary direct current can be measured at multiple measurement points (e.g., at $V_{AUX}$ 409-1 and $V_{AUX\_DIV}$ 409-2 in FIGS. 4A and 4E), and an amount of voltage detected at each of the measurement points can be controlled by using one or more resistors (fixed and/or variable). For example, as shown in FIGS. 4A and 4E, a voltage detected at $V_{AUX}$ can be stepped down by using two in-series resistors, labelled as numerals 407 and 408. These measurement points (e.g., at $V_{AUX}$ 409-1 and $V_{AUX\_DIV}$ 409-2 in FIGS. 4A and 4E) may be set depending on the type of detection mechanism. A few example detection mechanisms are: digital logic detection mechanism, voltage comparator detection mechanism, and/or an analog to direct current converter (ADC) detection mechanism.

When using a digital logic as a detection mechanism, the threshold voltage is set to half of the digital logic supply voltage (i.e. when supply voltage of digital logic is 5 volts, the logic threshold voltage can be set to be 2.5 volts). When the input is higher than the logic threshold voltage, the digital logic can output a "low" state that indicates that the input is lower than the logic threshold voltage. When the input voltage is lower than the logic threshold voltage, the digital logic can output a "high" state that indicates that the input is higher than the logic threshold voltage.

When using a voltage comparator as a detection mechanism, the threshold voltage can be set to any desired voltage within the supply range by using a voltage generator (i.e. the threshold voltage can be set to any value within supply voltage of the voltage comparator). When the input voltage is higher than the desired threshold voltage, the voltage comparator can output a "low" state that indicates that the input is lower than the desired threshold voltage. When the input voltage is lower than the desired threshold voltage, the voltage comparator can output a "high" state indicating that the input voltage is higher than desired threshold voltage.

When using analog to direct current converter (ADC), the threshold can be set arbitrarily using an external reference voltage. The ADC also digitizes the analog voltage value, which is used to tell how far apart the input voltage is from desired threshold (reference) voltage.

In some embodiments, the wireless power receiver includes an RF coupler that is coupled to the antenna, the RF coupler comprises distinct first and second outputs, and the primary rectifier is coupled to the first output of the RF coupler, while the secondary rectifier is coupled to the second output of the RF coupler.

In some embodiments, the wireless power receiver comprises at least one impedance matching network positioned between and coupled to the first output of the RF coupler and the secondary rectifier. In some embodiments, a series of matching networks may be implemented, as shown as 403-$n$ in FIGS. 4B, 5B, and 6B. In some embodiments, the at least one matching network is configured to match an impedance of a source (e.g., a transmitter) of the RF signals.

In some embodiments, the wireless power receiver comprises at least one impedance matching network positioned between and coupled to an input of the RF coupler and the antenna, wherein the at least one matching network is configured to match an impedance of a source of the RF signals. In some embodiments, the wireless power receiver further comprises one or more additional electrical components (e.g., the one or more additional electrical components are capacitor 404, and $Z_L$ 406, which represent the charging components the receiver is coupled to, as shown in FIGS. 4A, 4B, 4E, 6A, and 6B) that are used to deliver the primary direct current that is used to power or charge to the electronic device; and a controller configured to: detect that the second voltage of the secondary direct current satisfies one or more power-detection thresholds that indicate that the antenna is receiving RF signals from a wireless-power-transmitting device; and in response to detecting that the second direct current satisfies the one or more power-detection thresholds, send a signal that causes each of the one or more additional electrical components to prepare for receiving the primary direct current. In some embodiments the power-detection threshold is met when: (i) the voltage meets a value that corresponds to a received amount of the RF power signals (e.g., −40 dB to −1 dB), (ii) the voltage meets a value that corresponds to a percentage of the RF power signals (e.g., 0.001% to 2%), or (iii) the voltage is within a specified range (e.g., 1 volt to 40 volts, 5 volts to 30 volts, 5 volts to 10 volts).

In some embodiments, the one or more power-detection thresholds are satisfied when the second voltage of the secondary direct current is in a range of approximately 5 volts to 30 volts.

In some embodiments, detecting that the second voltage of the secondary direct current satisfies one or more power-detection thresholds is performed by comparing the second voltage to a respective power-detection threshold of the one or more power-detection thresholds at a first measurement point, a second measurement point, or both the first and second measurement points.

In some embodiments, the wireless power receiver comprises a first measurement point that is located before a voltage divider that is configured to step down the second voltage, and the second measurement point is located after the voltage divider. In some embodiments, variable resistors are used to adjust the resistance, and consequently adjust the voltage step down.

In some embodiments, the second portion of the alternating current is approximately 0.01% to 0.1% of the alternating current. And, in other embodiments, this range can be expanded or retracted, e.g., so that the range is from approximately 0.001% to 10%. In some other embodiments, the second portion of the alternating current range is expanded to cover approximately less than 1% of the alternating current. In some embodiments, the wireless power receiver comprises: (i) a first storage component (e.g., a first capacitor, or a battery) and (ii) a second storage component (e.g., a first capacitor, or a battery) having a lower storage capacity than the first storage component (e.g., a first capacitor, or a battery); the first storage component (e.g., a first capacitor, or a battery) is coupled to an output of the primary rectifier; the second storage component (e.g., a first capacitor, or a battery) is coupled to an output of the secondary rectifier; the second storage component (e.g., a first capacitor, or a battery), due to its lower storage capacity, is configured to discharge faster than the first storage component (e.g., a first capacitor, or a battery), wherein discharge of the second storage component (e.g., a first capacitor, or a battery) indicates to the wireless power receiver that RF signals are no longer being received at the antenna, and to prepare components of the wireless power receiver for shutdown.

In some embodiments, the secondary rectifier that is composed of: (i) an input configured to receive the second portion of the alternating current, (ii) a first diode, and (iii) a second diode, and the input of the secondary rectifier is coupled to: a cathode of a first diode, wherein an anode of the first diode is coupled to a ground; and an anode of a second diode, wherein a cathode of the second diode is coupled to an output of the secondary rectifier. Although, this embodiment includes these components, it should be understood that other embodiments include these components in addition to other components.

In some embodiments, the secondary rectifier is composed of: (i) an input configured to receive the second portion of the alternating current, (ii) a first diode-connected transistor, and (iii) a second diode-connected transistor, and the input of the secondary rectifier is coupled to: (i) a first diode-connected transistor, wherein the first diode-connected transistor is connected to a ground; and (ii) a second diode-connected transistor, wherein the second diode-connected transistor is connected to an output of the secondary rectifier. Although, this embodiment includes these components, it should be understood that other embodiments include these components in addition to other components.

In some embodiments, the RF coupler is a directional coupler. In some embodiments, a directional coupler is a first path (e.g., a primary RF path) that is coupled to an antenna configured to receive RF signals and convert them to alternating current, and a second path (e.g., a secondary RF path) that is not coupled, but placed in parallel with the first path. In such an embodiment, the second path can be coupled to a resistor that is coupled to a ground.

In some embodiments, the RF coupler is a capacitive coupler. In some embodiments, a capacitive coupler includes an antenna coupled in parallel with a first capacitor, and a first path (e.g., a primary RF path). In such an embodiment, the first capacitor is coupled in parallel to a second capacitor, and a second path (e.g., a secondary RF path). In such embodiments, the second capacitor can be coupled to a ground.

In some embodiments, the RF coupler is a resistive coupler. In some embodiments, a resistive coupler includes an antenna coupled in parallel with a first resistor, and a first path (e.g., a primary RF path). In such an embodiment, the first resistor is coupled in parallel to a second resistor, and a second path (e.g., a secondary RF path). In such embodiments, the second resistor can be coupled to a ground.

In yet another aspect, the discussion below relates to power surge protection for a wireless power receiver. A method of power surge protection for a wireless power receiver, occurs at a wireless power receiver comprising: (i) an antenna, (ii) a rectifier coupled to the antenna, and (iii) a switch coupled to the rectifier, the switch configured to create an impedance mismatch or match before an input of the rectifier. While the switch is in a default-closed state that grounds the switch and creates an impedance mismatch before an input of the rectifier: receiving, by the antenna of the wireless power receiver, radio frequency (RF) signals as an alternating current, wherein a first portion of the alternating current is reflected away from the input of the rectifier due to the impedance mismatch, and a second portion of the alternating current flows through the switch and to ground; and while the switch is in an open state that creates an impedance match at the input of the rectifier: the first portion of the alternating current flows through the input of the rectifier, allowing the first portion of the alternating current to be converted into direct current that is used to charge or power an electronic device; and the second portion of the alternating current flows through the switch and to the input of the rectifier, allowing the second portion of the alternating current to be converted into direct current that is used to charge or power an electronic device. In this way, a switch can be employed to protect a sensitive component (e.g., rectifier) in a wireless-power-receiving circuit from initial surges of RF energy that may otherwise damage that sensitive component. In some embodiments, a capacitor may be placed between the antenna and the coupling mechanism. In some embodiments, an output of the rectifier is coupled to a capacitor that is coupled to a ground, which reduces ripple from the conversion of RF signals to direct current (DC) signals.

In some embodiments, a negative voltage generator is placed before the switch. In some embodiments, the negative voltage generator (i.e., a rectifier) rectifies RF signals to negative voltage, which causes the switch to enter an opened state by reaching a zero volt threshold.

In some embodiments, the switch transitions from the default-closed state to the open state gradually over a period of time, and during the period of time, a part of the first portion of the alternating current continues to be reflected away from the input of the rectifier. In some embodiments, over this period of time, the impedance mismatch gradually decreases, until the mismatch is substantially removed (e.g., less than 5% of the mismatch remains). In some embodiments, the period of time is determined by the specifications of the switch. In some embodiments, the switch may be a GaN switch or a depletion mode metal oxide semiconductor (MOS) switch that is designed to open after a set period of time. In some embodiments, the period of time can be dynamically adjusted based on a detected voltage of the alternating current.

In some embodiments, dynamically adjusting includes reducing the period of time based on a determination that the detected voltage does not satisfy (e.g., less than or equal to)

a defined threshold value (e.g., the defined threshold can be between 4-10 volts, or another appropriate value that is slightly above a voltage used to charge a power source of the electronic device coupled to the wireless power receiver).

In some embodiments, dynamically adjusting includes increasing the period of time based on a determination that the detected voltage satisfies (e.g., is greater than) a defined threshold value.

In some embodiments, the switch transitions from default-closed to open state by using a Gallium Nitride (GaN) switch or a depletion mode metal oxide semiconductor (MOS) switch. In some embodiments, the switch has a voltage threshold that is met before it enters the open fully open. In some embodiments, the voltage threshold is zero volts.

In some embodiments, while the switch is in the open state: ceasing to receive the RF signals by the antenna of the wireless power receiver. The ceasing to receive the RF signals causes the switch to transition back to the default-closed state from the open state (e.g., when the voltage falls below a threshold voltages for the switch, as a result of no longer receiving the RF signals} {In some embodiments, the switch changes to the normally closed state when the voltage falls below a zero volt threshold).

In some embodiments, the wireless power receiver includes a coupling mechanism that is coupled to the antenna, wherein the coupling mechanism includes a first output and a second output, and further wherein: the first output of the coupling mechanism is coupled to the rectifier; and the second output of the coupling mechanism is coupled to the switch.

In some embodiments, the coupling mechanism partitions the alternating current, wherein the coupling mechanism: directs a first portion of the alternating current to the first output of the coupling mechanism; and directs a second portion of the alternating current to the second output of the coupling mechanism.

In some embodiments, the switch is coupled to an output of the rectifier. In some embodiments, the wireless power receiver further comprises a matching network having (i) an input coupled to the first output of the coupling mechanism and (ii) an output coupled to the rectifier. In some embodiments, more than one matching network may be utilized to match the impedance of the system to the source.

In some embodiments, the switch is coupled to the matching network and the rectifier. In some embodiments, the switch can be coupled to the output of a plurality of matching networks in a series.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of power surge protection for a wireless-power receiver, the method comprising:
at a wireless-power receiver comprising: (i) an antenna, (ii) a rectifier coupled to the antenna, and (iii) a depletion-mode switch coupled to the rectifier, the depletion-mode switch being configured to create an impedance mismatch or an impedance match between the rectifier and the antenna:
while the depletion-mode switch is in a default-closed state that creates the impedance mismatch between the rectifier and the antenna:
receiving, by the antenna of the wireless-power receiver, radio frequency (RF) signals as an alternating current from a wireless power transmitter, wherein a first amount of the alternating current is reflected away from an input of the rectifier due to the impedance mismatch;
while the impedance mismatch is present, providing a second amount of the alternating current to the depletion-mode switch to cause the depletion-mode switch to begin transitioning to an open state that creates the impedance match between the rectifier and the antenna; and
while the depletion-mode switch is in the open state that creates the impedance match between the rectifier and the antenna:
receiving, by the antenna of the wireless-power receiver, additional RF signals as an additional alternating current from the wireless power transmitter, wherein the additional alternating current flows through the input of the rectifier to be converted into direct current that is used to charge or power an electronic device.

2. The method of claim 1 wherein a negative voltage generator is placed to drive the depletion-mode switch to transition from the default-closed state to the open state.

3. The method of claim 1, wherein the depletion-mode switch transitions from the default-closed state to the open state gradually over a period of time, and during the period of time, a part of the first amount of the alternating current continues to be reflected away from the input of the rectifier.

4. The method of claim 1, wherein the depletion-mode switch is a Gallium Nitride (GaN) switch or a metal oxide semiconductor (MOS) switch.

5. The method of claim 1, wherein a period of time is required for the depletion-mode switch to transition to the open state, and the method further comprises, dynamically adjusting the period of time based on a detected voltage of the alternating current.

6. The method of claim 5, wherein dynamically adjusting the period of time includes reducing the period of time based on a determination that the detected voltage does not satisfy a defined threshold value.

7. The method of claim 5, wherein dynamically adjusting the period of time includes increasing the period of time based on a determination that the detected voltage satisfies a defined threshold value.

8. The method of claim 1, wherein the depletion-mode switch has a voltage threshold that is met before it enters the open state.

9. The method of claim 8, wherein the voltage threshold is zero volts.

10. The method of claim 1, further comprising, while the depletion-mode switch is in the open state:
ceasing to receive the RF signals by the antenna of the wireless-power receiver,
wherein ceasing to receive the RF signals causes the depletion-mode switch to transition back to the default-closed state from the open state.

11. The method of claim 1, wherein:
the wireless-power receiver includes a coupling mechanism that is coupled to the antenna;
the coupling mechanism includes a first output and a second output;
the first output of the coupling mechanism is coupled to the rectifier; and
the second output of the coupling mechanism is coupled to the depletion-mode switch.

12. The method of claim 11, wherein the depletion-mode switch is coupled to an output of a second rectifier.

13. A system for power surge protection for a wireless-power receiver, comprising:
an antenna;
a rectifier coupled to the antenna;
a depletion-mode switch coupled to the rectifier, the depletion-mode switch being configured to create an impedance mismatch or an impedance match between the rectifier and the antenna;
one or more processors; and
memory storing one or more programs for execution by the one or more processors, the one or more programs including instructions for:
while the depletion-mode switch is in a default-closed state that creates an impedance mismatch between the rectifier and the antenna:
receiving, by the antenna of the wireless-power receiver, radio frequency (RF) signals as an alternating current from a wireless power transmitter, wherein a first amount of the alternating current is reflected away from an input of the rectifier due to the impedance mismatch;
while the impedance mismatch is present, providing a second amount of the alternating current to the depletion-mode switch to cause the depletion-mode switch to begin transitioning to an open state that creates the impedance match between the rectifier and the antenna; and
while the depletion-mode switch is in the open state that creates the impedance match between the rectifier and the antenna:
receiving, by the antenna of the wireless-power receiver, additional RF signals as an additional alternating current from the wireless power transmitter, wherein the additional alternating current flows through the input of the rectifier to be converted into direct current that is used to charge or power an electronic device.

14. The system of claim 13, further comprising a negative voltage generator configured to drive the depletion-mode switch to transition from the default-closed state to the open state.

15. The system of claim 13, wherein the depletion-mode switch is configured to transition from the default-closed state to the open state gradually over a period of time, and during the period of time, a part of the first amount of the alternating current continues to be reflected away from the input of the rectifier.

16. The system of claim 13, wherein a period of time is required for the depletion- mode switch to transition to the open state, and the period of time is configured to be dynamically adjusted based on a detected voltage of the alternating current.

17. The system of claim 13, wherein:
the depletion-mode switch has a voltage threshold that is met before it enters the open state; and
the voltage threshold is zero volts.

18. The system of claim 13, further comprising, while the depletion-mode switch is in the open state, the system is configured to:
cease receiving RF signals by the antenna of the wireless-power receiver,
wherein ceasing to receive the RF signals causes the depletion-mode switch to transition back to the default-closed state from the open state.

19. The system of claim 13, wherein the depletion-mode switch is coupled to an output of a second rectifier.

20. A non-transitory computer-readable storage medium storing one or more programs, the one or more programs comprising instructions, that when executed by a system with an antenna of a wireless-power receiver, a rectifier coupled to the antenna, and a depletion-mode switch coupled to the rectifier, the depletion-mode switch being configured to create an impedance mismatch or an impedance match between the rectifier and the antenna, cause the system to:
while the depletion-mode switch is in a default-closed state that creates an impedance mismatch between the rectifier and the antenna:
receive, by the antenna of the wireless-power receiver, radio frequency (RF) signals as an alternating current from a wireless power transmitter, wherein a first amount of the alternating current is reflected away from an input of the rectifier due to the impedance mismatch;
while the impedance mismatch is present, provide a second amount of the alternating current to the depletion-mode switch to cause the depletion-mode switch to begin transitioning to an open state that creates the impedance match between the rectifier and the antenna; and
while the depletion-mode switch is in the open state that creates the impedance match between the rectifier and the antenna:
receive, by the antenna of the wireless-power receiver, additional RF signals as an additional alternating current from the wireless power transmitter, wherein the additional alternating current flows through the input of the rectifier to be converted into direct current that is used to charge or power an electronic device.

21. The non-transitory computer-readable storage medium of claim 20, wherein the system that executes the instructions stored on the non-transitory computer-readable storage medium further comprises a negative voltage generator configured to drive the depletion-mode switch to transition from the default-closed state to the open state.

22. The non-transitory computer-readable storage medium of claim 20, wherein the depletion-mode switch is configured to transition from the default-closed state to the open state gradually over a period of time, and during the period of time, a part of the first amount of the alternating current continues to be reflected away from the input of the rectifier.

23. The non-transitory computer-readable storage medium of claim 20, wherein a period of time is required for the depletion-mode switch to transition to the open state, and the period of time is configured to be dynamically adjusted based on a detected voltage of the alternating current.

24. The non-transitory computer-readable storage medium of claim 20, wherein:
   the depletion-mode switch has a voltage threshold that is met before it enters the open state; and
   the voltage threshold is zero volts.

25. The non-transitory computer-readable storage medium of claim 20, further comprising instructions that, when executed by the system, cause the system to:
   while the depletion-mode switch is in the open state, cease receiving RF signals by the antenna of the wireless-power receiver,
   wherein ceasing to receive the RF signals causes the depletion-mode switch to transition back to the default-closed state from the open state.

26. The non-transitory computer-readable storage medium of claim 20, wherein the depletion-mode switch is coupled to an output of a second rectifier.

\* \* \* \* \*